US012701489B2

(12) United States Patent
Liu et al.

(10) Patent No.: US 12,701,489 B2
(45) Date of Patent: Aug. 4, 2026

(54) TRAFFIC MIGRATION BETWEEN NETWORK TOPOLOGY

(71) Applicant: HUAWEI TECHNOLOGIES CO., LTD., Shenzhen (CN)

(72) Inventors: Jing Liu, Shenzhen (CN); Yuanping Zhu, Shanghai (CN); Yulong Shi, Beijing (CN); Zhenzhen Cao, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/476,218

(22) Filed: Sep. 27, 2023

(65) Prior Publication Data

US 2024/0022990 A1      Jan. 18, 2024

Related U.S. Application Data

(63) Continuation of application No. PCT/CN2022/077847, filed on Feb. 25, 2022.

(30) Foreign Application Priority Data

Apr. 1, 2021    (CN) .......................... 202110358294.5

(51) Int. Cl.
*H04W 40/02*        (2009.01)
*H04W 28/24*        (2009.01)
(52) U.S. Cl.
CPC ........... *H04W 40/02* (2013.01); *H04W 28/24* (2013.01)

(58) Field of Classification Search
None
See application file for complete search history.

(56) References Cited

U.S. PATENT DOCUMENTS

2020/0351749 A1 * 11/2020 Tesanovic ............. H04W 40/22
2023/0328625 A1 * 10/2023 Xu ......................... H04W 36/08

OTHER PUBLICATIONS

3GPP TS 38.423 V17.0.0, "3rd Generation Partnership Project; Technical Specification Group Radio Access Network; NG-RAN; Xn application protocol (XnAP)(Release 17)," Apr. 2022, 609 pages.
3GPP TS 38.340 V16.4.0, "3rd Generation Partnership Project; Technical Specification Group Radio Access Network; NR; Backhaul Adaptation Protocol (BAP) specification(Release 16)," Mar. 2021, 22 pages.
3GPP TS 38.473 V17.0.0, "3rd Generation Partnership Project; Technical Specification Group Radio Access Network; NG-RAN; F1 application protocol (F1AP)(Release 17)," Apr. 2022, 645 pages.

(Continued)

*Primary Examiner* — Anh Ngoc M Nguyen
(74) *Attorney, Agent, or Firm* — Fish & Richardson P.C.

(57) ABSTRACT

This application provides an information transmission method and an apparatus. The method includes: A first IAB donor CU determines a type of signaling and/or first QoS information of data, where the first QoS information is used to determine transmission of the data in a second network topology managed by a second IAB donor CU, and the signaling type is used to determine transmission of the signaling in the second network topology; and the first IAB donor CU sends the first QoS information and/or indication information of the signaling type to the second IAB donor CU.

20 Claims, 12 Drawing Sheets

(a)

(b)

(56)       References Cited

OTHER PUBLICATIONS

3GPP TS 38.300 V15.12.0, "3rd Generation Partnership Project; Technical Specification Group Radio Access Network; NR; NR and NG-RAN Overall Description; Stage 2(Release 15)," Mar. 2021, 120 pages.

Samsung, "Summary of offline discussion on topology redundancy," 3GPP TSG-RAN WG3 #111-e, R3-211202, Online, Jan. 25-Feb. 4, 2021, 38 pages.

ZTE et al., "Discussion on inter-Donor IAB Node Migration procedure," 3GPP TSG-RAN WG3 Meeting #110-e, R3-206559, Online, Nov. 2-12, 2020, 11 pages.

Extended European Search Report in European Appln No. 22778419. 6, dated Jul. 16, 2024, 12 pages.

* cited by examiner (a)                                                (b)

(a)                         (b)

TRAFFIC MIGRATION BETWEEN NETWORK TOPOLOGY

CROSS-REFERENCE TO RELATED APPLICATION

This application is a continuation of International Application No. PCT/CN2022/077847, filed on Feb. 25, 2022, which claims priority to Chinese Patent Application No. 202110358294.5, filed on Apr. 1, 2021. The disclosures of the aforementioned applications are incorporated herein by reference in its entireties.

TECHNICAL FIELD

This application relates to an integrated access and backhaul IAB network, and in particular, to an information transmission method and an apparatus.

BACKGROUND

To meet an ultra-high capacity requirement of a 5th generation (5th generation, 5G) mobile communication system, high-frequency small cell networking becomes a mainstream. A high-frequency carrier has a poor propagation characteristic, is severely attenuated due to blocking, and has a small coverage area. Therefore, a large quantity of small cells need to be densely deployed. Correspondingly, providing optical fiber backhaul for the large quantity of densely deployed small cells requires high costs, and is difficult to be implemented. Therefore, an economical and convenient backhaul solution is required. In addition, to meet a wide coverage requirement, network coverage is provided in some remote areas, but deployment of optical fibers is difficult and costly. Therefore, a flexible and convenient access and backhaul solution also needs to be designed. An integrated access and backhaul (integrated access and backhaul, IAB) technology provides an idea to resolve the foregoing problems. A wireless transmission solution is used for both an access link (access link) and a backhaul link (backhaul link) of an IAB network, to avoid deployment of optical fibers.

With development of the IAB technology, transmission of information (including data and signaling) between a terminal device and an integrated access and backhaul donor central unit (integrated access and backhaul donor central unit, IAB donor CU) may be controlled by different IAB donor CUs. That is, the information may need to be communicated across network topologies. However, currently, in the IAB network, the information transmission between the terminal device and the IAB donor CU is controlled by the IAB donor CU in a unified manner, and the information cannot be communicated in an inter-network topology scenario, affecting performance (for example, a long information interruption delay and unbalanced network load) of the information transmission in the inter-network topology scenario. Therefore, how to implement the information transmission in the inter-network topology scenario and improve the performance of the information transmission becomes an urgent problem to be resolved.

SUMMARY

This application provides an information transmission method and an apparatus, to implement information transmission in an inter-network topology scenario.

According to a first aspect, this application provides an information transmission method. The information transmission method may be performed by a first integrated access and backhaul donor central unit (integrated access and backhaul donor central unit, IAB donor CU), or may be performed by a chip or a circuit disposed in the first IAB donor CU. This is not limited in this application.

The information transmission method includes the following steps.

The first integrated access and backhaul donor central unit IAB donor CU determines first quality of service QoS information of data and/or a signaling type of signaling. The first QoS information is used to determine transmission of the data in a second network topology managed by a second IAB donor CU, and the signaling type is used to determine transmission of the signaling in the second network topology. The first IAB donor CU sends a first message to the second IAB donor CU. The first message includes the first QoS information and/or indication information of the signaling type. The data and/or the signaling are/is communicated across the second network topology and a first network topology managed by the first IAB donor CU.

According to the information transmission method provided in this embodiment of this application, in a scenario in which the data and/or the signaling need/needs to be communicated across network topologies, the QoS information and/or the signaling type of the signaling that are/is required by the second IAB donor CU are/is determined by the first IAB donor CU, and sent to the second IAB donor CU, to ensure that the data and/or the signaling can be communicated across the network topologies, and transmission performance can be improved during inter-network topology transmission of the data and/or the signaling.

For example, in some inter-network topology transmission scenarios (for example, a scenario in which migration occurs between a first IAB donor and a second IAB donor), a service interruption delay may be reduced. For example, if quality of a link between a boundary node and a parent node in the first network topology is poor, the boundary node may continue to perform service transmission with a parent node in the second network topology.

For another example, in some inter-network topology transmission scenarios, (for example, in a scenario in which the first IAB donor and the second IAB donor constitute dual-connectivity), the information transmission method may be used for load balancing. For example, if a boundary node is connected to two parent nodes in different network topologies at the same time, the first IAB donor can determine, based on a load status, a parent node via which data transmission of a service is performed with the boundary node. In this way, the data service is transmitted on different paths, to achieve network load balancing.

With reference to the first aspect, in some implementations of the first aspect, that the first IAB donor CU determines first QoS information of data includes: The first IAB donor CU determines second QoS information and the first QoS information based on QoS corresponding to the data. The method further includes: The first IAB donor CU determines transmission of the data in the first network topology based on the second QoS information, and/or the first IAB donor CU determines transmission of the signaling in the first network topology based on the signaling type.

According to the information transmission method provided in this embodiment of this application, the first IAB donor CU can determine, based on the QoS information corresponding to the data, the second QoS information required by the first IAB donor CU and the first QoS information required by the second IAB donor CU. On a premise that the data can be communicated across network topologies, QoS guarantee is implemented in a transmission process.

With reference to the first aspect, in some implementations of the first aspect, the first message further includes a first routing identifier and/or a first backhaul radio link control channel BH RLC CH identifier. The first network topology includes a first node and a second node. The first routing identifier identifies a first path for transmission of the data and/or the signaling between the first node and the second node. The first BH RLC CH identifier identifies a first BH RLC CH for transmission of the data and/or the signaling between the first node and a child node of the first node. The first node is a boundary node, and the second node is an access node of a terminal device.

With reference to the first aspect, in some implementations of the first aspect, the first message further includes general packet radio service tunneling protocol (general packet radio service tunneling protocol, GTP) tunnel information, and the GTP tunnel information identifies the data.

With reference to the first aspect, in some implementations of the first aspect, the first message further includes QoS of the first BH RLC CH identifier.

With reference to the first aspect, in some implementations of the first aspect, the first message further includes first indication information. The first indication information indicates that the first path and/or the first BH RLC CH are/is used for uplink transmission or downlink transmission.

With reference to the first aspect, in some implementations of the first aspect, the second network topology includes the first node and a third node. The method further includes: The first IAB donor CU receives a second message from the second IAB donor CU. The second message includes a second routing identifier corresponding to the first routing identifier, and/or a second BH RLC CH identifier corresponding to the first BH RLC CH identifier.

With reference to the first aspect, in some implementations of the first aspect, the second message further includes second indication information. The second indication information indicates that a second path and/or a second BH RLC CH are/is used for uplink transmission or downlink transmission.

With reference to the first aspect, in some implementations of the first aspect, the method further includes: The first IAB donor CU sends a third message to the first node. The third message includes the first routing identifier and the second routing identifier, and/or the first BH RLC CH identifier and the second BH RLC CH identifier. The second routing identifier identifies the second path for transmission of the data and/or the signaling between the first node and the third node. The second BH RLC CH identifier identifies the second BH RLC CH for transmission of the data and/or the signaling between the first node and a parent node of the first node. The third node is a second IAB donor DU.

According to the information transmission method provided in this embodiment of this application, information transmission includes a transmission path and a BH RLC CH. Information transmission in a network topology can be accurately determined by determining a routing identifier identifying the path and an identifier identifying the BH RLC CH.

With reference to the first aspect, in some implementations of the first aspect, the third message further includes third indication information. The third indication information indicates that the first path and the second path are used for uplink transmission or downlink transmission, and/or indicates that the first BH RLC CH and the second BH RLC CH are used for uplink transmission or downlink transmission.

With reference to the first aspect, in some implementations of the first aspect, the method further includes: The first IAB donor CU receives a second message from the second IAB donor CU. The second message includes a second routing identifier and/or a second BH RLC CH identifier. The second network topology includes a first node and a third node. The second routing identifier identifies a second path for transmission of the data and/or the signaling between the first node and the third node. The second BH RLC CH identifier identifies a second BH RLC CH for transmission of the data and/or the signaling between the first node and a parent node of the first node. The first node is a boundary node, and the third node is a second IAB donor DU.

With reference to the first aspect, in some implementations of the first aspect, the second message further includes second indication information. The second indication information indicates that the second path and/or the second BH RLC CH are/is used for uplink transmission or downlink transmission.

With reference to the first aspect, in some implementations of the first aspect, the first network topology includes the first node and a second node. The method further includes: The first IAB donor CU determines a first routing identifier corresponding to the second routing identifier, and/or a first BH RLC CH identifier corresponding to the second BH RLC CH identifier.

With reference to the first aspect, in some implementations of the first aspect, the method further includes: The first IAB donor CU sends a third message to the first node. The third message includes the first routing identifier and the second routing identifier, and/or the first BH RLC CH identifier and the second BH RLC CH identifier. The first routing identifier identifies a path for transmission of the data and/or the signaling between the first node and the second node. The first BH RLC CH identifier identifies a first BH RLC CH for transmission of the data and/or the signaling between the first node and a child node of the first node. The second node is an access node of a terminal device.

With reference to the first aspect, in some implementations of the first aspect, the third message further includes third indication information. The third indication information indicates that the first path and the second path are used for uplink transmission or downlink transmission, and/or indicates that the first BH RLC CH and the second BH RLC CH are used for uplink transmission or downlink transmission.

According to a second aspect, an information transmission method is provided. The information transmission method may be performed by a second IAB donor CU, or may be performed by a chip or a circuit disposed in the second IAB donor CU. This is not limited in this application.

The information transmission method includes the following steps.

The second IAB donor CU receives a first message from a first IAB donor CU. The first message includes first quality of service QoS information and/or indication information of a signaling type. The second IAB donor CU determines, based on the first QoS information, transmission of data in a second network topology managed by the second IAB donor CU, and/or the second IAB donor CU determines transmission of signaling in the second network topology based on the signaling type.

According to the information transmission method provided in this embodiment of this application, in a scenario in which the data and/or the signaling need/needs to be communicated across network topologies, the QoS information and/or the signaling type of the signaling that are/is required by the second IAB donor CU are/is determined by the first IAB donor CU, and sent to the second IAB donor CU, to ensure that the data and/or the signaling can be communicated across the network topologies.

With reference to the second aspect, in some implementations of the second aspect, the first message further includes a first routing identifier and/or a first backhaul radio link control channel BH RLC CH identifier. A first network topology managed by the first IAB donor CU includes a first node and a second node. The first routing identifier identifies a first path for transmission of the data and/or the signaling between the first node and the second node. The first BH RLC CH identifier identifies a first BH RLC CH for transmission of the data and/or the signaling between the first node and a child node of the first node. The first node is a boundary node, and the second node is an access node of a terminal device.

With reference to the second aspect, in some implementations of the second aspect, the first message further includes GTP tunnel information. The GTP tunnel information identifies the data.

With reference to the second aspect, in some implementations of the second aspect, the first message further includes QoS of the first BH RLC CH identifier.

With reference to the second aspect, in some implementations of the second aspect, the first message further includes first indication information. The first indication information indicates that the first path and/or the first BH RLC CH are/is used for uplink transmission or downlink transmission.

With reference to the second aspect, in some implementations of the second aspect, the method further includes: The second IAB donor CU sends a second message to the first IAB donor CU. The second message includes a second routing identifier corresponding to the first routing identifier, and/or a second BH RLC CH identifier corresponding to the first BH RLC CH identifier. The second network topology includes the first node and a third node. The second routing identifier identifies a second path for transmission of the data and/or the signaling between the first node and the third node. The second BH RLC CH identifier identifies a second BH RLC CH for transmission of the data and/or the signaling between the first node and a parent node of the first node. The third node is a second IAB donor DU.

With reference to the second aspect, in some implementations of the second aspect, the method further includes: The second IAB donor CU sends a second message to the first IAB donor CU. The second message includes a second routing identifier and/or a second BH RLC CH identifier. The second network topology includes a first node and a third node. The second routing identifier identifies a second path for transmission of the data and/or the signaling between the first node and the third node. The second BH RLC CH identifier identifies a second BH RLC CH for transmission of the data and/or the signaling between the first node and a parent node of the first node. The first node is a boundary node, and the third node is a second IAB donor DU.

With reference to the second aspect, in some implementations of the second aspect, the second message further includes second indication information. The second indication information indicates that the second path and/or the second BH RLC CH are/is used for uplink transmission or downlink transmission.

According to a third aspect, an information transmission method is provided. The information transmission method may be performed by a first node, or may be performed by a chip or a circuit disposed in the first node. This is not limited in this application.

The information transmission method includes the following steps.

The first node receives a third message from a first IAB donor CU. The third message includes a first routing identifier and a second routing identifier, and/or a first BH RLC CH identifier and a second BH RLC CH identifier. The first node determines, based on the first routing identifier and the second routing identifier, routing conversion between transmission of data and/or signaling in a first network topology managed by the first IAB donor CU and transmission of the data and/or the signaling in a second network topology managed by a second IAB donor CU. The first node determines, based on the first BH RLC CH identifier and the second BH RLC CH identifier, bearer mapping conversion between the transmission of the data and/or the signaling in the first network topology and the transmission of the data and/or the signaling in the second network topology. The first network topology includes the first node and a second node. The first routing identifier identifies a first path for transmission of the data and/or the signaling between the first node and the second node. The first BH RLC CH identifier identifies a first BH RLC CH for transmission of the data and/or the signaling between the first node and a child node of the first node. The first node is a boundary node, and the second node is an access node of a terminal device. The second network topology includes the first node and a third node. The second routing identifier identifies a second path for transmission of the data and/or the signaling between the first node and the third node. The second BH RLC CH identifier identifies a second BH RLC CH for transmission of the data and/or the signaling between the first node and a parent node of the first node. The third node is a second IAB donor DU.

According to the information transmission method provided in this embodiment of this application, in a scenario in which the data and/or the signaling need/needs to be communicated across network topologies, the first IAB donor CU sends, to the first node, information required by transmission of the data and/or the signaling in the first network topology and the second network topology, to ensure that inter-network topology transmission can be implemented.

With reference to the third aspect, in some implementations of the third aspect, the third message further includes third indication information. The third indication information indicates that the first path and the second path are used for uplink transmission or downlink transmission, and/or indicates that the first BH RLC CH and the second BH RLC CH are used for uplink transmission or downlink transmission.

According to a fourth aspect, an information transmission apparatus is provided. The information transmission apparatus includes:

a processing unit, configured to determine first quality of service QoS information of data and/or a signaling type of signaling, where the first QoS information is used to determine transmission of the data in a second network topology managed by a second IAB donor CU, and the signaling type is used to determine transmission of the signaling in the second network topology; and a sending unit, configured to send a first message to the second IAB donor CU, where the first message includes the first QoS information and/or indication information of the signaling type, where the data and/or the signaling are/is communicated across the second network topology and a first network topology managed by the first IAB donor CU.

With reference to the fourth aspect, in some implementations of the fourth aspect, that the processing unit determines the first quality of service QoS information of the data includes:

determining, by the processing unit, second QoS information and the first QoS information based on QoS corresponding to the data; and the processing unit is further configured to: determine, based on the second QoS information, transmission of the data in the first network topology; and/or determine, based on the signaling type, transmission of the signaling in the first network topology.

With reference to the fourth aspect, in some implementations of the fourth aspect, the first message further includes a first routing identifier and/or a first backhaul radio link control channel BH RLC CH identifier, where the first network topology includes a first node and a second node, the first routing identifier identifies a first path for transmission of the data and/or the signaling between the first node and the second node, the first BH RLC CH identifier identifies a first BH RLC CH for transmission of the data and/or the signaling between the first node and a child node of the first node, the first node is a boundary node, and the second node is an access node of a terminal device.

With reference to the fourth aspect, in some implementations of the fourth aspect, the first message further includes first indication information. The first indication information indicates that the first path and/or the first BH RLC CH are/is used for uplink transmission or downlink transmission.

With reference to the fourth aspect, in some implementations of the fourth aspect, the apparatus further includes:

a receiving unit, configured to receive a second message from the second IAB donor CU, where the second message includes a second routing identifier corresponding to the first routing identifier, and/or a second BH RLC CH identifier corresponding to the first BH RLC CH identifier; and the sending unit is further configured to send a third message to the first node, where the third message includes the first routing identifier and the second routing identifier, and/or the first BH RLC CH identifier and the second BH RLC CH identifier, where the second network topology includes the first node and a third node, the second routing identifier identifies a second path for transmission of the data and/or the signaling between the first node and the third node, the second BH RLC CH identifier identifies a second BH RLC CH for transmission of the data and/or the signaling between the first node and a parent node of the first node, and the third node is a second IAB donor DU.

With reference to the fourth aspect, in some implementations of the fourth aspect, the second message further includes second indication information, where the second indication information indicates that the second path and/or the second BH RLC CH are/is used for uplink transmission or downlink transmission; and the third message further includes third indication information, where the third indication information indicates that the first path and the second path are used for uplink transmission or downlink transmission, and/or indicates that the first BH RLC CH and the second BH RLC CH are used for uplink transmission or downlink transmission.

With reference to the fourth aspect, in some implementations of the fourth aspect, the apparatus further includes:

a receiving unit, configured to receive a second message from the second IAB donor CU, where the second message includes a second routing identifier and/or a second BH RLC CH identifier, where the second network topology includes a first node and a third node, the second routing identifier identifies a second path for transmission of the data and/or the signaling between the first node and the third node, the second BH RLC CH identifier identifies a second BH RLC CH for transmission of the data and/or the signaling between the first node and a parent node of the first node, the first node is a boundary node, and the third node is a second IAB donor DU.

With reference to the fourth aspect, in some implementations of the fourth aspect, the first network topology includes the first node and a second node;

the processing unit is further configured to determine a first routing identifier corresponding to the second routing identifier and a first BH RLC CH identifier corresponding to the second BH RLC CH identifier; and the sending unit is further configured to send a third message to the first node, where the third message includes the first routing identifier and the second routing identifier, and/or the first BH RLC CH identifier and the second BH RLC CH identifier, where the first routing identifier identifies a first path for transmission of the data and/or the signaling between the first node and the second node, the first BH RLC CH identifier identifies a first BH RLC CH for transmission of the data and/or the signaling between the first node and a child node of the first node, and the second node is an access node of a terminal device.

With reference to the fourth aspect, in some implementations of the fourth aspect, the second message further includes second indication information, where the second indication information indicates that the second path and/or the second BH RLC CH are/is used for uplink transmission or downlink transmission; and the third message further includes third indication information, where the third indication information indicates that the first path and the second path are used for uplink transmission or downlink transmission, and/or indicates that the first BH RLC CH and the second BH RLC CH are used for uplink transmission or downlink transmission.

According to a fifth aspect, an information transmission apparatus is provided. The information transmission apparatus includes:

a receiving unit, configured to receive a first message from a first IAB donor CU, where the first message includes first quality of service QoS information and/or indication information of a signaling type; and a processing unit, configured to: determine, based on the first QoS information, transmission of data in a second network topology managed by a second IAB donor CU; and/or determine, based on the signaling type, transmission of signaling in the second network topology.

With reference to the fifth aspect, in some implementations of the fifth aspect, the first message further includes a first routing identifier and/or a first backhaul radio link control channel BH RLC CH identifier, where a first network topology managed by the first IAB donor CU includes a first node and a second node, the first routing identifier identifies a first path for transmission of the data and/or the signaling between the first node and the second node, the first BH RLC CH identifier identifies a first BH RLC CH for transmission of the data and/or the signaling between the first node and a child node of the first node, the first node is a boundary node, and the second node is an access node of a terminal device.

With reference to the fifth aspect, in some implementations of the fifth aspect, the first message further includes first indication information. The first indication information indicates that the first path and/or the first BH RLC CH are/is used for uplink transmission or downlink transmission.

With reference to the fifth aspect, in some implementations of the fifth aspect, the apparatus further includes:

a sending unit, configured to send a second message to the first IAB donor CU, where the second message includes a second routing identifier corresponding to the first routing identifier, and/or a second BH RLC CH identifier corresponding to the first BH RLC CH identifier, where the second network topology includes the first node and a third node, the second routing identifier identifies a second path for transmission of the data and/or the signaling between the first node and the third node, the second BH RLC CH identifier identifies a second BH RLC CH for transmission of the data and/or the signaling between the first node and a parent node of the first node, and the third node is a second IAB donor DU.

With reference to the fifth aspect, in some implementations of the fifth aspect, the first message further includes first indication information, where the first indication information indicates that the first path and/or the first BH RLC CH are/is used for uplink transmission or downlink transmission; and the second message further includes second indication information, where the second indication information indicates that the second path and/or the second BH RLC CH are/is used for uplink transmission or downlink transmission.

With reference to the fifth aspect, in some implementations of the fifth aspect, the apparatus further includes:

a sending unit, configured to send a second message to the first IAB donor CU, where the second message includes a second routing identifier and/or a second BH RLC CH identifier, where the second network topology includes a first node and a third node, the second routing identifier identifies a second path for transmission of the data and/or the signaling between the first node and the third node, the second BH RLC CH identifier identifies a second BH RLC CH for transmission of the data and/or the signaling between the first node and a parent node of the first node, the first node is a boundary node, and the third node is a second IAB donor DU.

With reference to the fifth aspect, in some implementations of the fifth aspect, the second message further includes second indication information, where the second indication information indicates that the second path and/or the second BH RLC CH are/is used for uplink transmission or downlink transmission.

According to a sixth aspect, an information transmission apparatus is provided. The information transmission apparatus includes:

a receiving unit, configured to receive a third message from a first IAB donor CU, where the third message includes a first routing identifier and a second routing identifier, and/or a first BH RLC CH identifier and a second BH RLC CH identifier; and a processing unit, configured to determine, based on the first routing identifier and the second routing identifier, routing conversion between transmission of data and/or signaling in a first network topology managed by the first IAB donor CU and transmission of the data and/or the signaling in a second network topology managed by a second IAB donor CU; and the processing unit is further configured to determine, based on the first BH RLC CH identifier and the second BH RLC CH identifier, bearer mapping conversion between the transmission of the data and/or the signaling in the first network topology and the transmission of the data and/or the signaling in the second network topology, where the first network topology includes the apparatus and a second node, the first routing identifier identifies a first path for transmission of the data and/or the signaling between the apparatus and the second node, the first BH RLC CH identifier identifies a first BH RLC CH for transmission of the data and/or the signaling between the apparatus and a child node of the first node, the apparatus is a boundary node, and the second node is an access node of a terminal device; and the second network topology includes the apparatus and a third node, the second routing identifier identifies a second path for transmission of the data and/or the signaling between the apparatus and the third node, the second BH RLC CH identifier identifies a second BH RLC CH for transmission of the data and/or the signaling between the apparatus and a parent node of the first node, and the third node is a second IAB donor DU.

With reference to the sixth aspect, in some implementations of the sixth aspect, the third message further includes third indication information. The third indication information indicates that the first path and the second path are used for uplink transmission or downlink transmission, and/or indicates that the first BH RLC CH and the second BH RLC CH are used for uplink transmission or downlink transmission.

According to a seventh aspect, an information transmission apparatus is provided. The information transmission apparatus includes a processor, configured to implement a function of the first IAB donor CU in the method described in the first aspect.

Optionally, the information transmission apparatus may further include a memory. The memory is coupled to the processor. The processor is configured to implement the function of the first IAB donor CU in the method described in the first aspect.

In a possible implementation, the memory is configured to store program instructions and data. The memory is coupled to the processor. The processor may invoke and execute the program instructions stored in the memory, to implement the function of the first IAB donor CU in the method described in the first aspect.

Optionally, the information transmission apparatus may further include a communication interface. The communication interface is used by the information transmission apparatus to communicate with another device. When the information transmission apparatus is the first IAB donor CU, the communication interface may be a transceiver, an input/output interface, a circuit, or the like.

In a possible design, the information transmission apparatus includes a processor and a communication interface.

The processor is configured to run a computer program, to enable the information transmission apparatus to implement any method described in the first aspect.

The processor communicates with outside through the communication interface.

It may be understood that the outside may be an object other than the processor or an object outside the apparatus.

In another possible design, the information transmission apparatus is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, an information transmission apparatus is provided. The information transmission apparatus includes a processor, configured to implement a function of the second IAB donor CU in the method described in the second aspect.

Optionally, the information transmission apparatus may further include a memory. The memory is coupled to the processor. The processor is configured to implement the function of the second IAB donor CU in the method described in the second aspect.

In a possible implementation, the memory is configured to store program instructions and data. The memory is coupled to the processor. The processor may invoke and execute the program instructions stored in the memory, to implement the function of the second IAB donor CU in the method described in the second aspect.

Optionally, the information transmission apparatus may further include a communication interface. The communication interface is used by the information transmission apparatus to communicate with another device. When the information transmission apparatus is the second IAB donor CU, the communication interface may be a transceiver, an input/output interface, a circuit, or the like.

In a possible design, the information transmission apparatus includes a processor and a communication interface.

The processor communicates with outside through the communication interface.

The processor is configured to run a computer program, to enable the information transmission apparatus to implement any method described in the second aspect.

It may be understood that the outside may be an object other than the processor or an object outside the apparatus.

In another possible design, the information transmission apparatus is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, an information transmission apparatus is provided. The information transmission apparatus includes a processor, configured to implement a function of the first node in the method described in the third aspect.

Optionally, the information transmission apparatus may further include a memory. The memory is coupled to the processor. The processor is configured to implement the function of the first node in the method described in the third aspect.

In a possible implementation, the memory is configured to store program instructions and data. The memory is coupled to the processor. The processor may invoke and execute the program instructions stored in the memory, to implement the function of the first node in the method described in the third aspect.

Optionally, the information transmission apparatus may further include a communication interface. The communication interface is used by the information transmission apparatus to communicate with another device. When the information transmission apparatus is the first node, the communication interface may be a transceiver, an input/output interface, a circuit, or the like.

In a possible design, the information transmission apparatus includes a processor and a communication interface.

The processor communicates with outside through the communication interface.

The processor is configured to run a computer program, to enable the information transmission apparatus to implement any method described in the third aspect.

It may be understood that the outside may be an object other than the processor or an object outside the apparatus.

In another possible design, the information transmission apparatus is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a tenth aspect, this application provides a computer-readable storage medium. The computer-readable storage medium stores instructions. When the instructions are run on a computer, the computer is enabled to perform the method according to any one of the foregoing aspects.

According to an eleventh aspect, this application provides a computer program product including instructions. When the instructions are run on a computer, the computer is enabled to perform the method according to any one of the foregoing aspects.

According to a twelfth aspect, a communication system is provided, and includes the information transmission apparatus shown in the fourth aspect, the information transmission apparatus shown in the fifth aspect, and the information transmission apparatus shown in the sixth aspect.

According to a thirteenth aspect, a chip apparatus is provided, and includes a processing circuit. The processing circuit is configured to invoke a program from a memory and run the program, to enable a communication device provided with the chip apparatus to perform the method according to any one of possible implementations of the first to third aspects.

Figure 3:
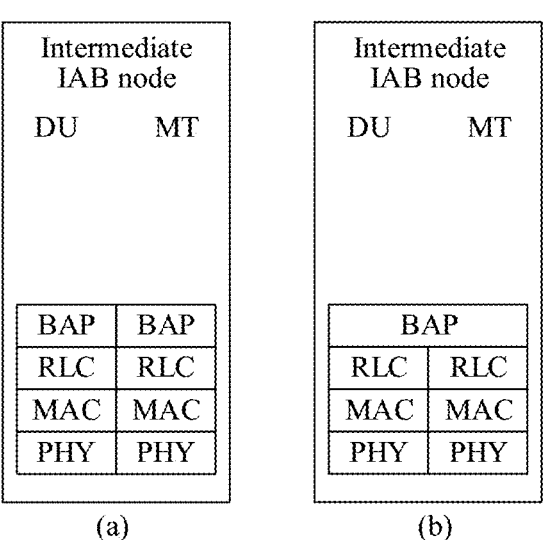
Figure 4:
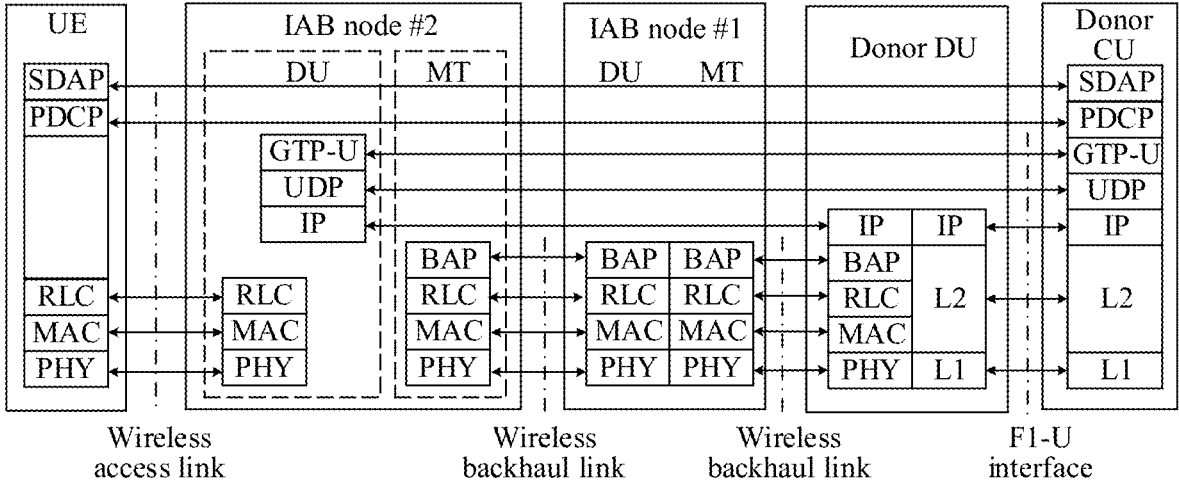
Figure 5:
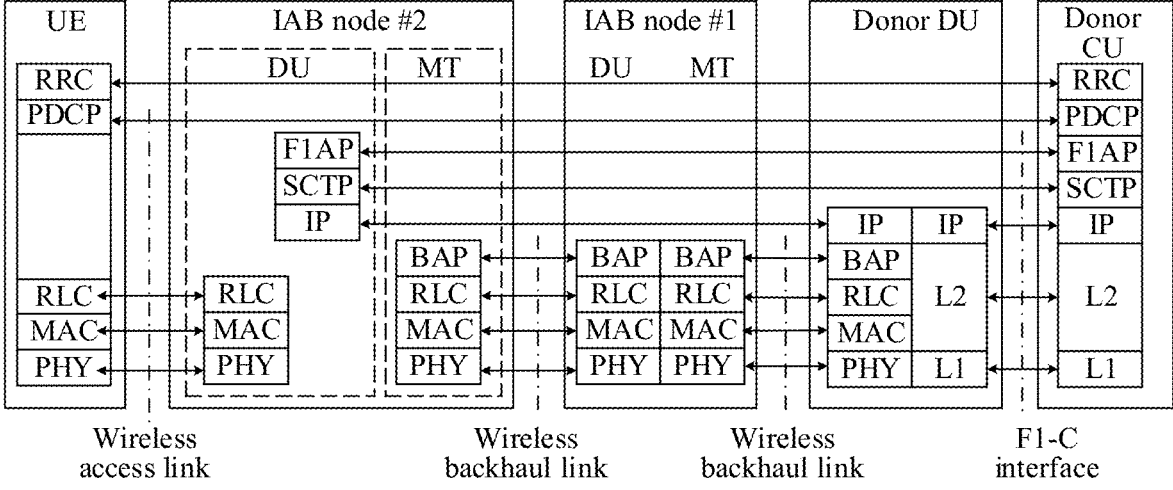
Figure 6:
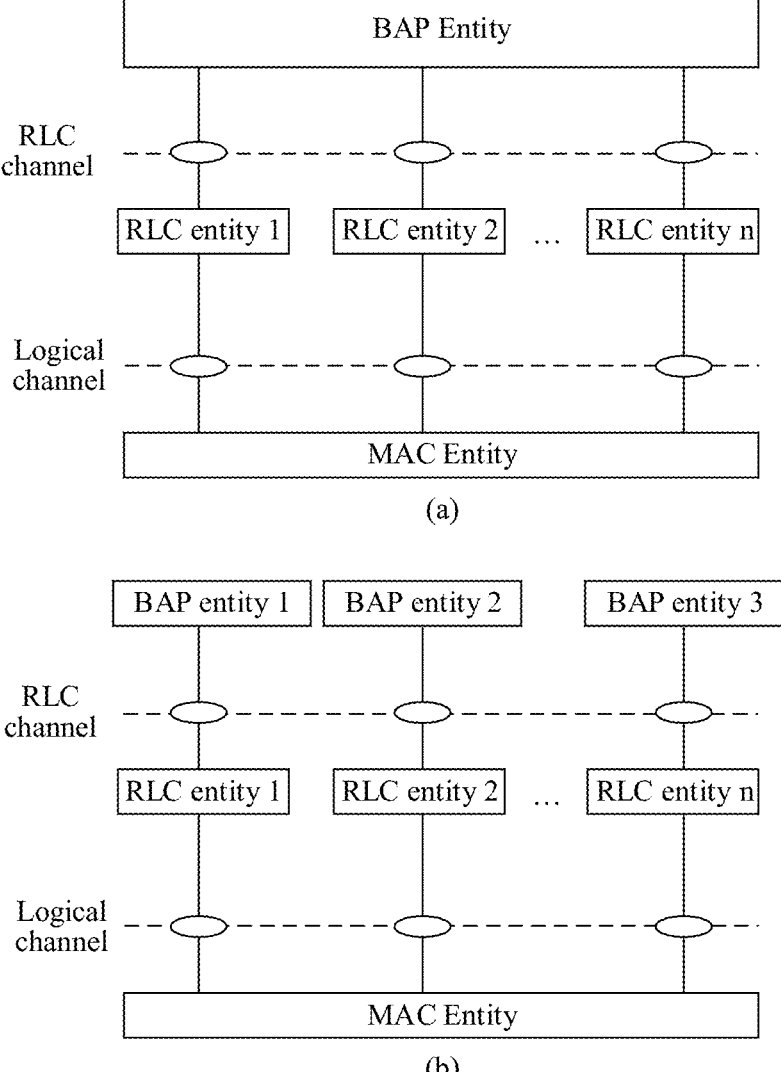
Figure 7:
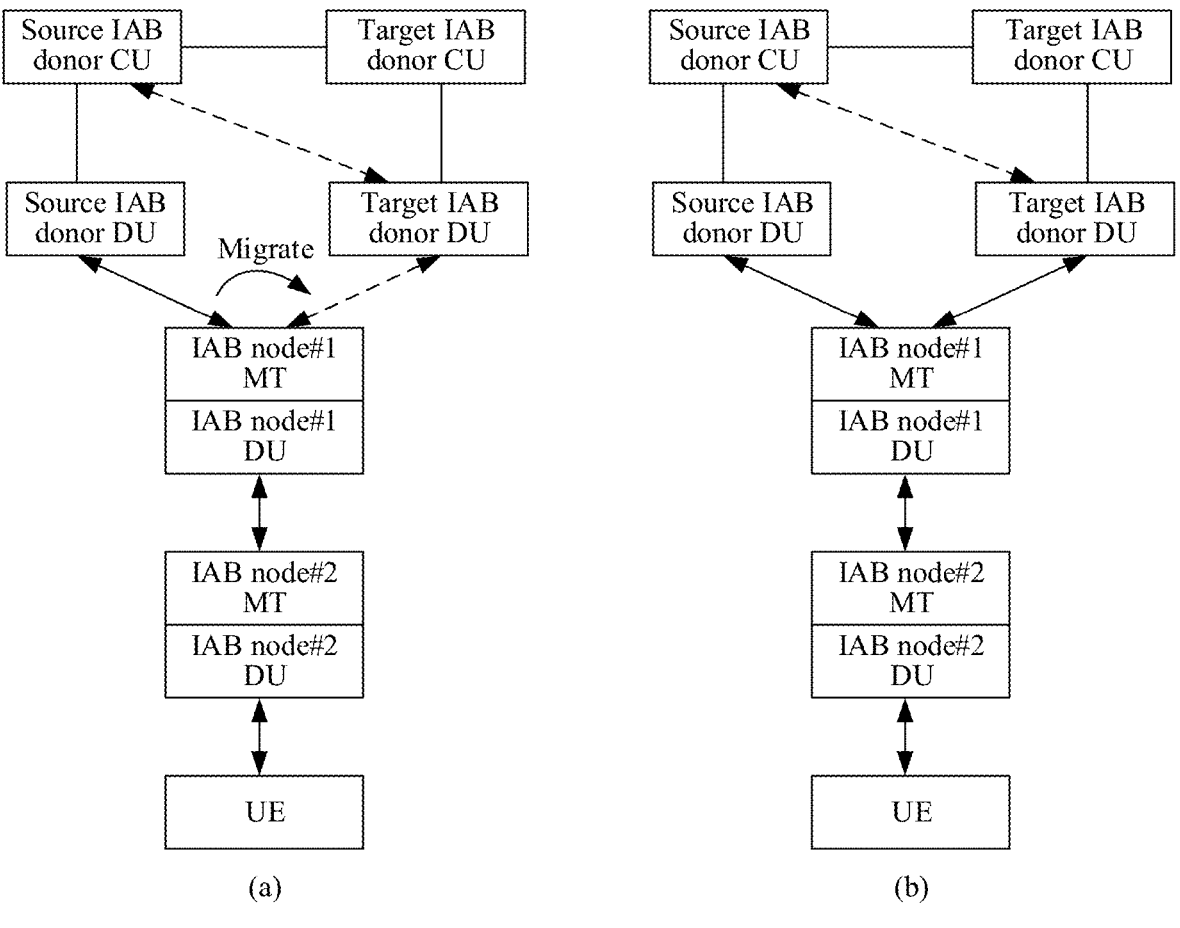
Figure 8:
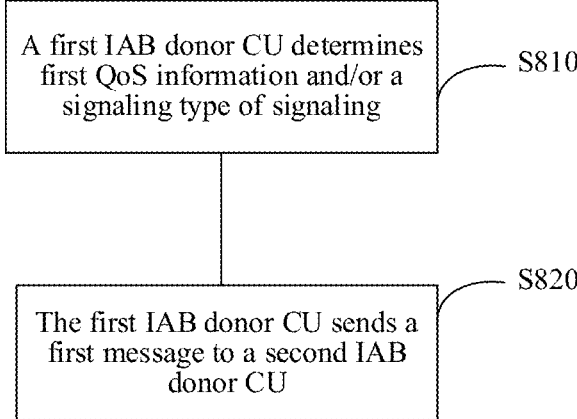
Figure 9:
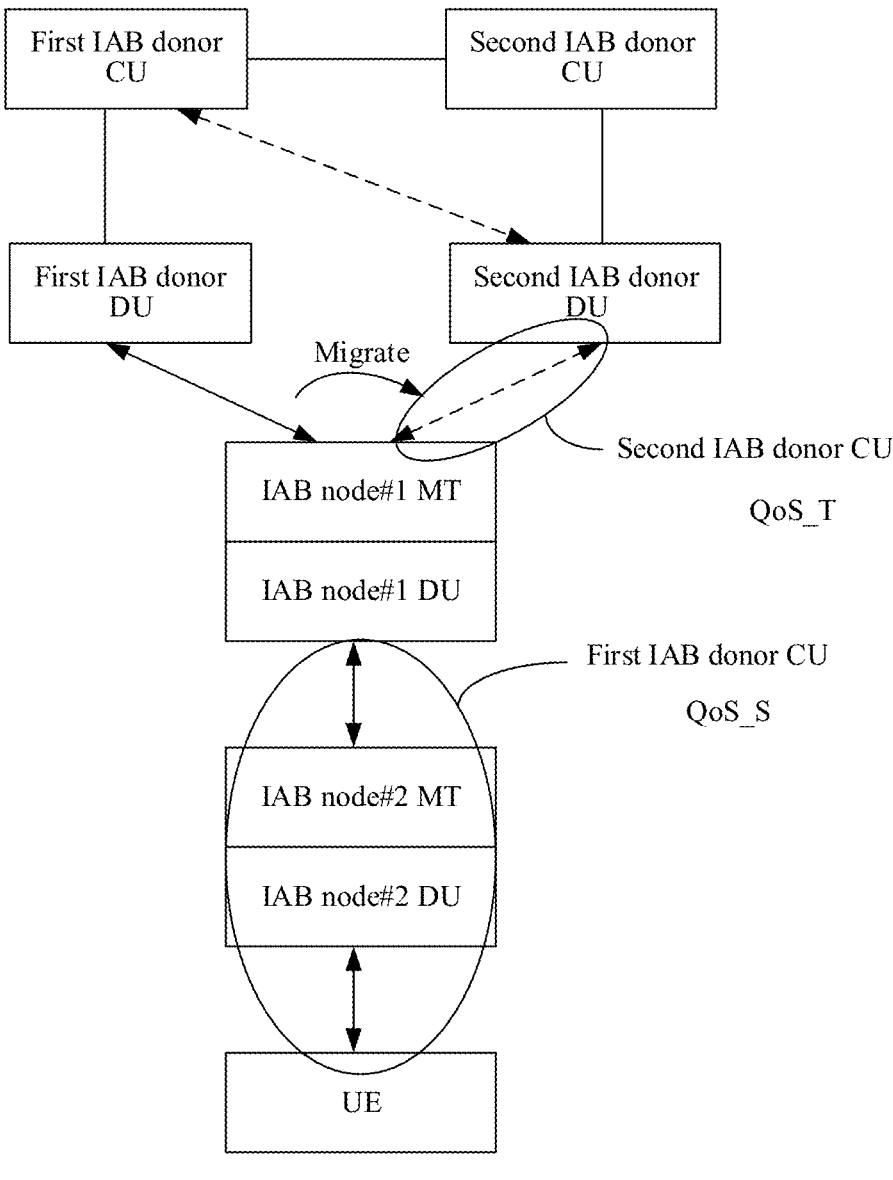
Figure 10:
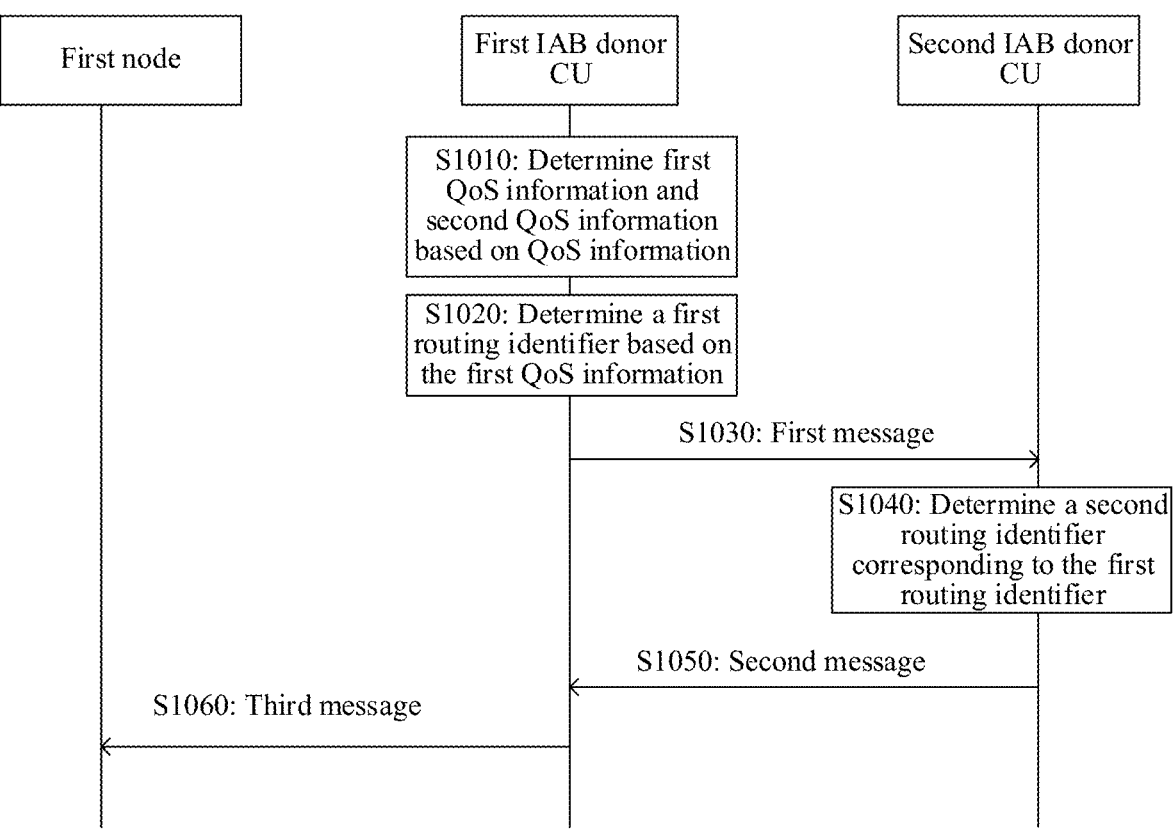
Figure 11:
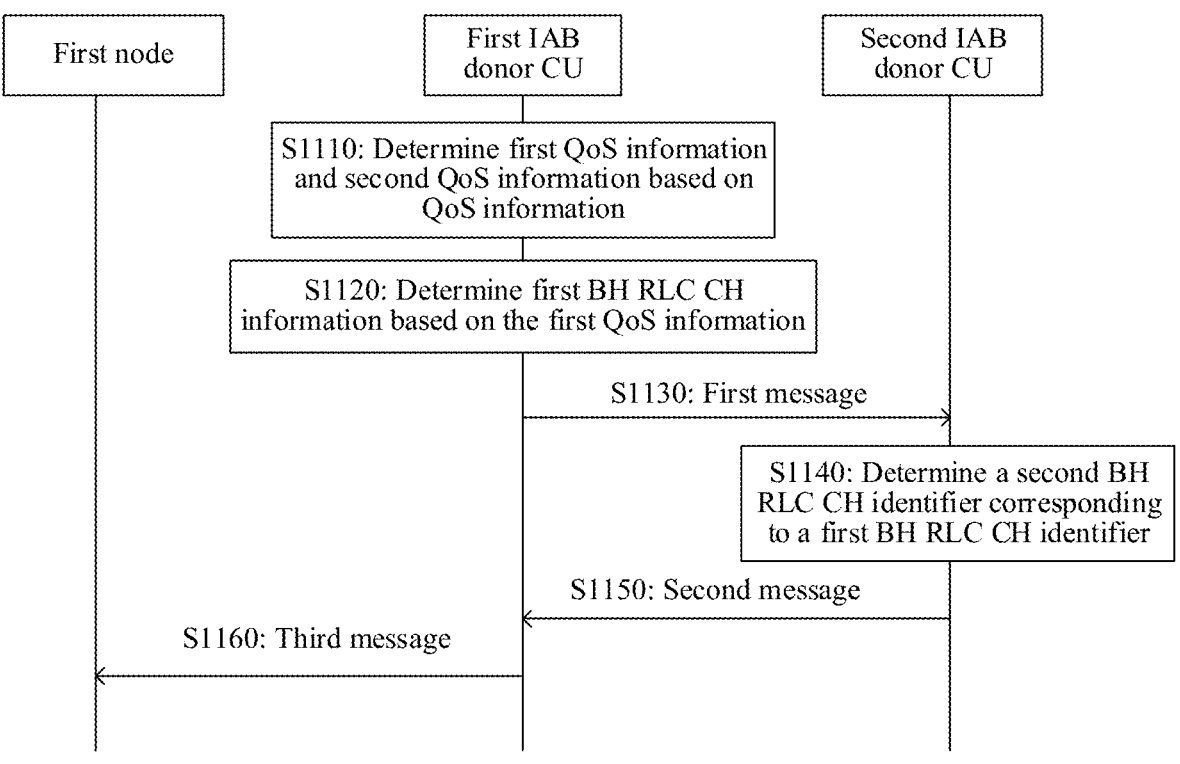
Figure 12:
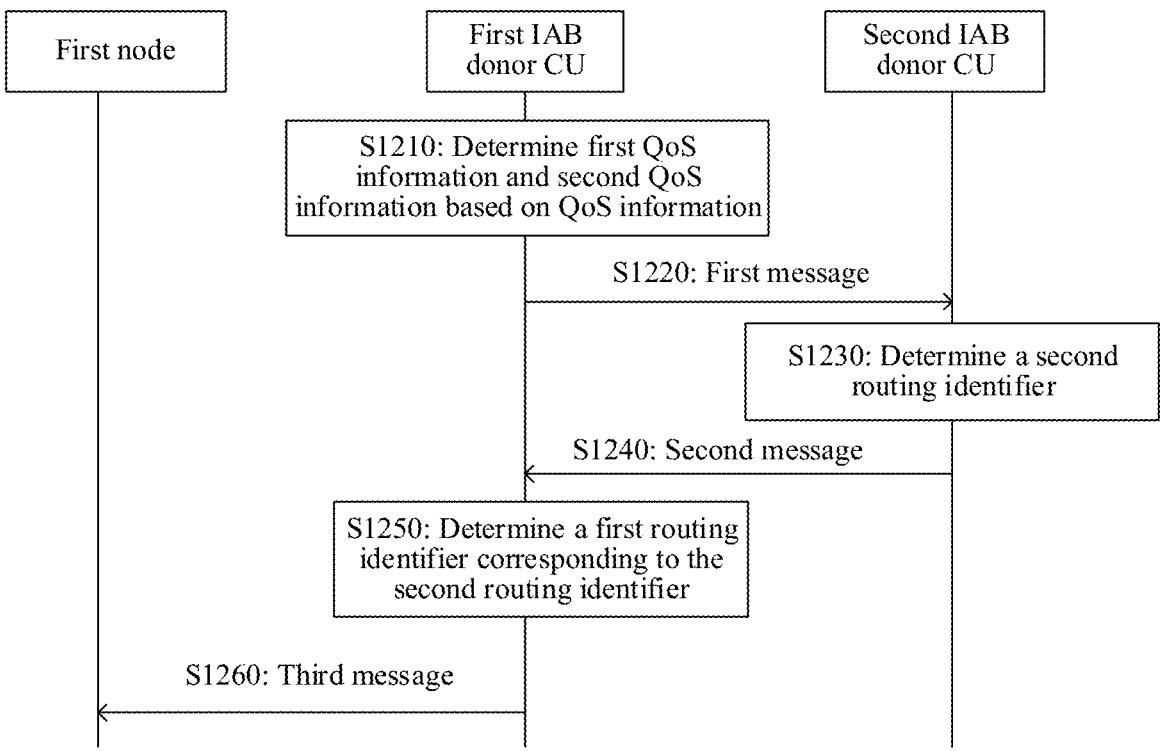
Figure 13:
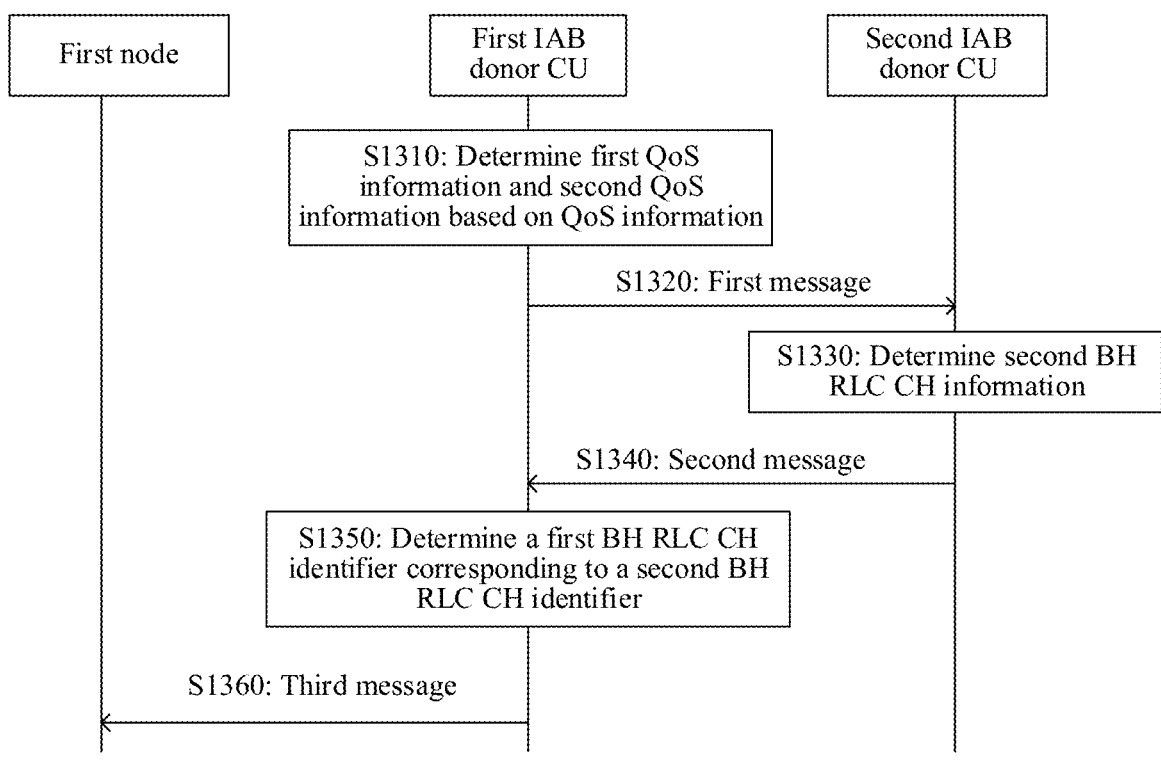
Figure 14:
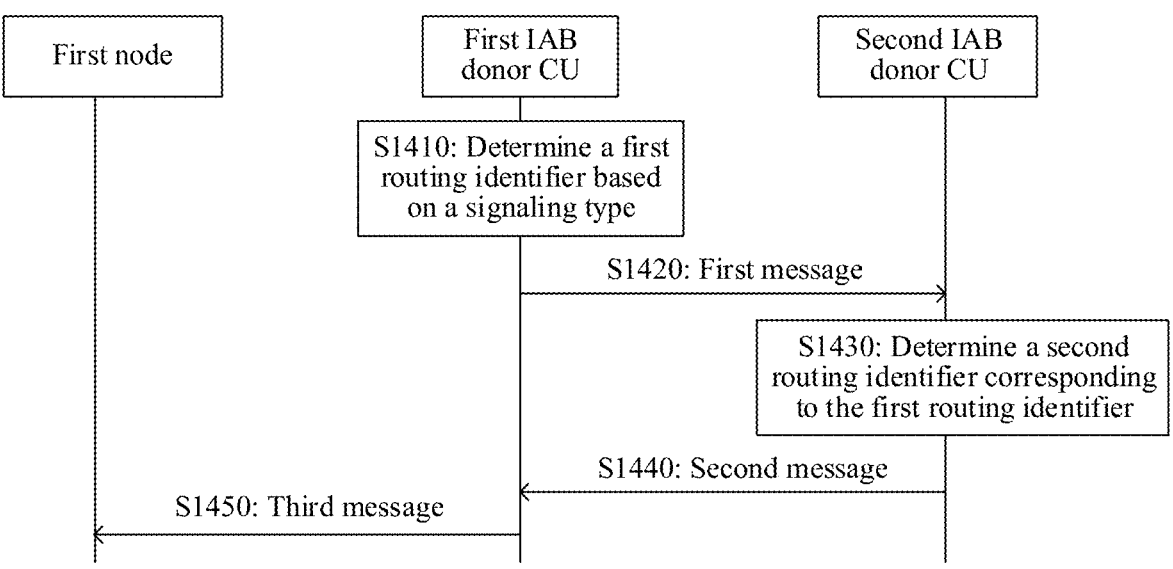
Figure 15:
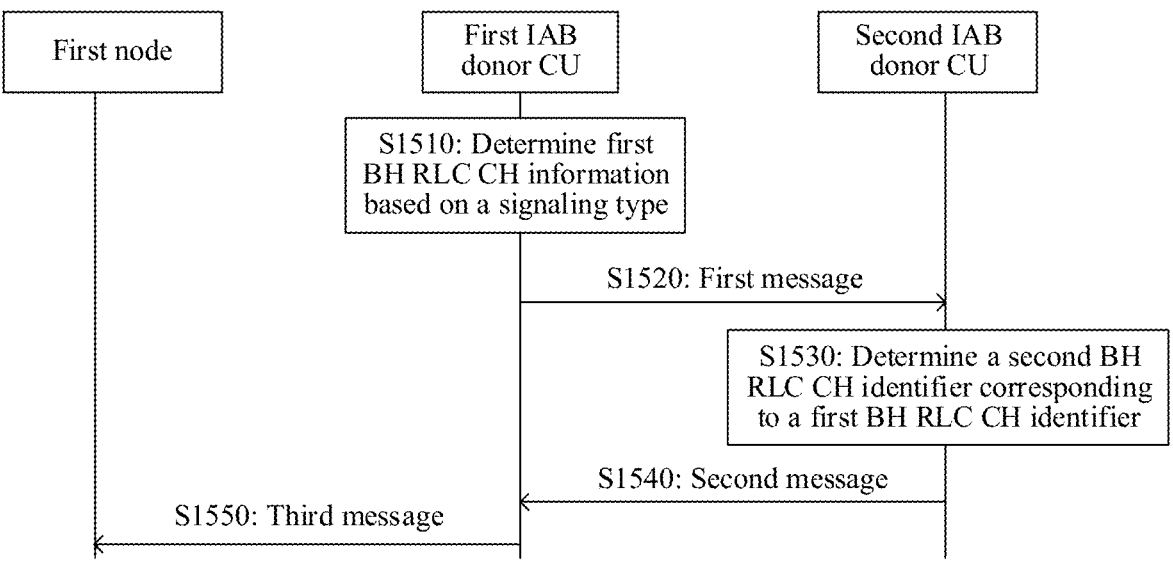
Figure 16:
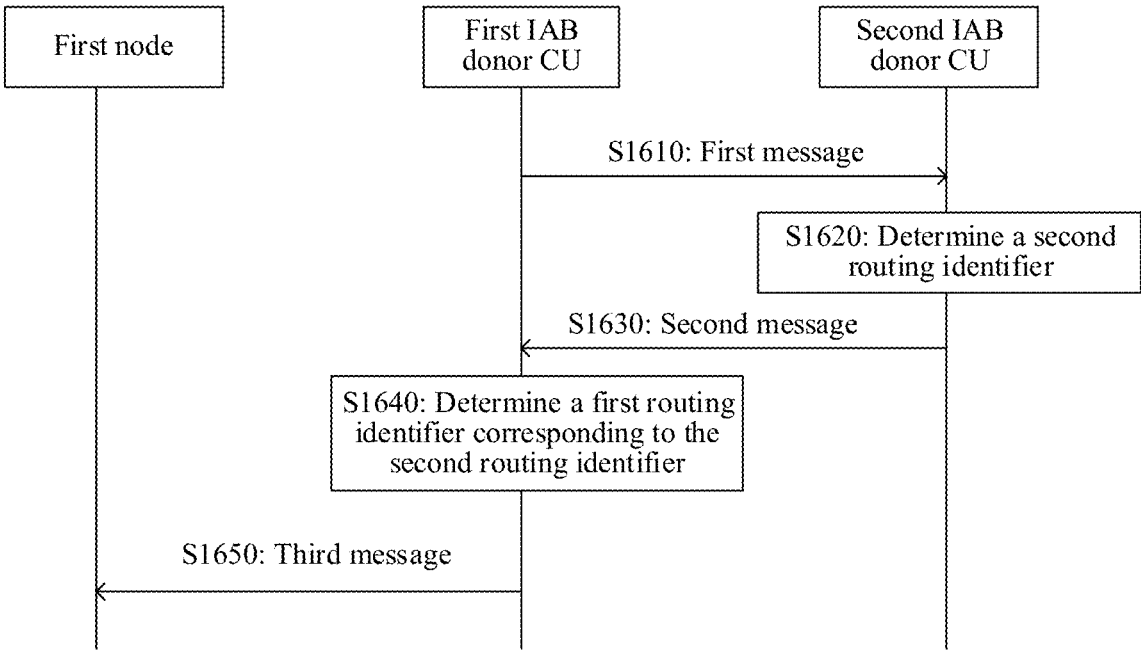
Figure 17:
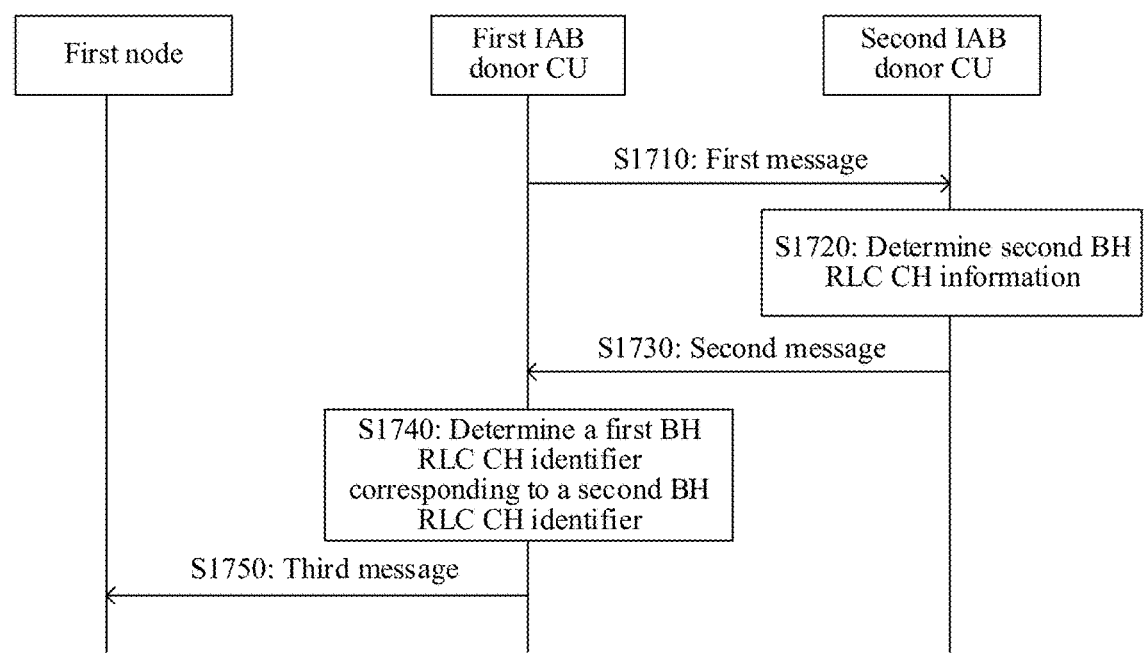
Figure 18:
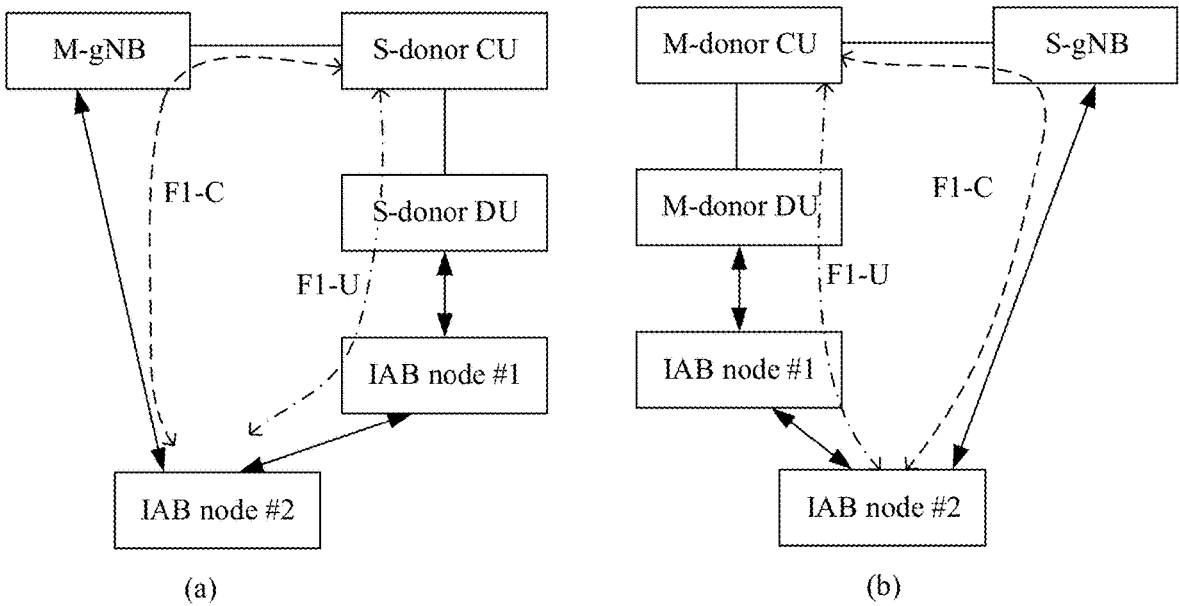
Figure 19:
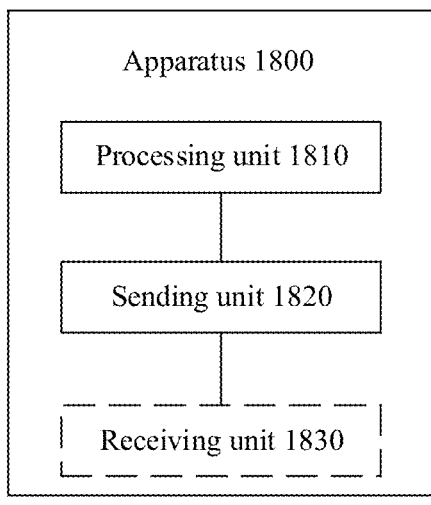
Figure 20:
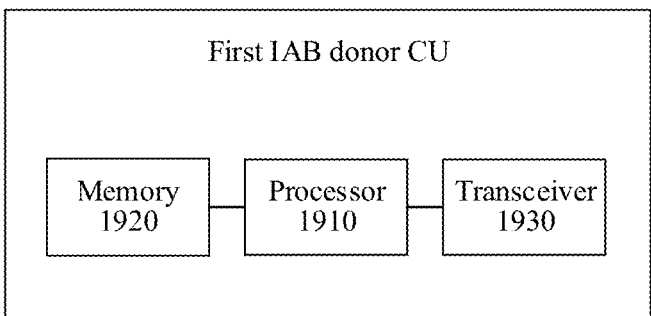
Figure 21:
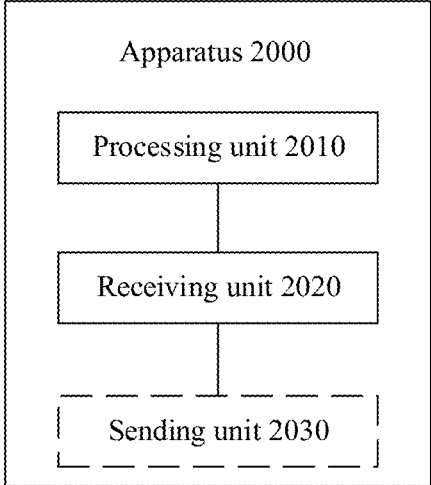
Figure 22:
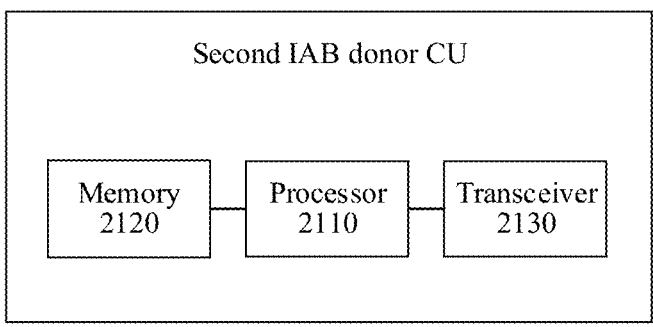
Figure 23:
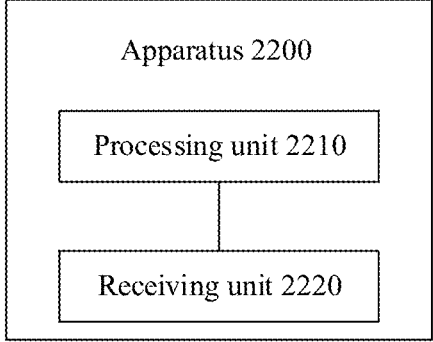
Figure 24:
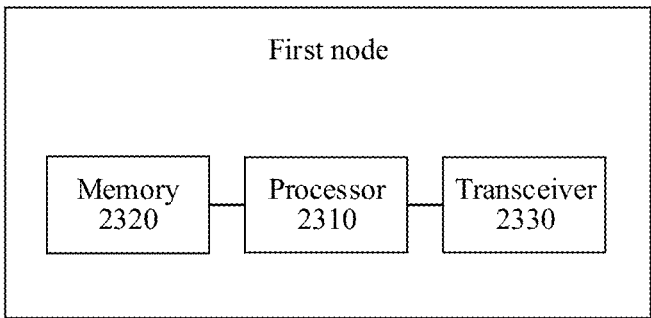

(a) and (b) in FIG. 3 are examples of a protocol stack architecture of an intermediate IAB node;

FIG. 4 is an example of a user plane protocol stack architecture of a multi-hop IAB network;

FIG. 5 is an example of a control plane protocol stack architecture of a multi-hop IAB network;

FIG. 6 is a schematic diagram of a mapping relationship among RLC channels, logical channels, and protocol entities;

(a) and (b) in FIG. 7 are scenarios that may be related to an information transmission method provided in embodiments of this application;

FIG. 8 is a schematic flowchart of an information transmission method according to an embodiment of this application;

FIG. 9 is a schematic diagram of QoS information division according to an embodiment of this application;

FIG. 10 is a schematic flowchart of determining routing mapping according to this application;

FIG. 11 is a schematic flowchart of determining bearer mapping according to this application;

FIG. 12 is another schematic flowchart of determining routing mapping according to this application;

FIG. 13 is another schematic flowchart of determining bearer mapping according to this application;

FIG. 14 is still another schematic flowchart of determining routing mapping according to this application;

FIG. 15 is still another schematic flowchart of determining bearer mapping according to this application;

FIG. 16 is still another schematic flowchart of determining routing mapping according to this application;

FIG. 17 is still another schematic flowchart of determining bearer mapping according to this application;

(a) and (b) in FIG. 18 are schematic diagrams of CP-UP split scenarios of an IAB donor according to an embodiment of this application;

FIG. 19 is a schematic diagram of an information transmission apparatus 1800 according to this application;

FIG. 20 is a schematic diagram of a structure of a first IAB donor CU applicable to an embodiment of this application;

FIG. 21 is a schematic diagram of an information transmission apparatus 2000 according to this application;

FIG. 22 is a schematic diagram of a structure of a second IAB donor CU applicable to an embodiment of this application;

FIG. 23 is a schematic diagram of an information transmission apparatus 2200 according to this application; and FIG. 24 is a schematic diagram of a structure of a first node applicable to an embodiment of this application.

DESCRIPTION OF EMBODIMENTS

The following describes technical solutions of this application with reference to the accompanying drawings.

In descriptions of this application, unless otherwise stated, "/" means "or". For example, A/B may represent A or B. A term "and/or" in this specification describes only an association relationship between associated objects and indicates that there may be three relationships. For example, A and/or B may indicate the following three cases: Only A exists, both A and B exist, and only B exists. In addition, in the descriptions of this application, "a plurality of" means two or more than two unless otherwise specified. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Names of all nodes and messages in this application are merely names that are set for ease of description, and the names in an actual network may be different. It should not be understood that names of various nodes and messages are limited in this application. Any name having a function that is the same as or similar to a node or a message used in this application is considered as a method or an equivalent replacement of this application, and shall fall within the protection scope of this application. Details are not described below.

A communication system mentioned in embodiments of this application includes but is not limited to a narrowband internet of things (narrowband internet of things, NB-IoT) system, a wireless local area network (wireless local access network, WLAN) system, a long term evolution (long term evolution, LTE) system, an LTE frequency division duplex (frequency division duplex, FDD) system, an LTE time division duplex (time division duplex, TDD) system, a 5G mobile communication system, or a communication system after 5G, for example, NR, a device-to-device (device-to-device, D2D) communication system, a machine-to-machine (machine-to-machine, M2M) communication system, an Internet of things (Internet of Things, IoT) communication system, or another communication system.

A terminal device (terminal equipment) in embodiments of this application may be an unmanned aerial vehicle (unmanned aerial vehicle, UAV), an access terminal, a subscriber unit, a subscriber station, a mobile station, a relay station, a remote station, a remote terminal, a mobile device, a user terminal (user terminal), user equipment (user equipment, UE), a terminal (terminal), a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), a terminal device in a future internet of vehicles, or the like. This is not limited in embodiments of this application.

As an example rather than a limitation, in embodiments of this application, the wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices, such as smart watches or smart glasses, that can implement complete or partial functions without depending on smartphones, and devices, such as various smart bands or smart jewelry for monitoring physical signs, that focus on only one type of application functions and need to work with other devices such as smartphones.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network of human-machine interconnection and machine-to-machine interconnection. In embodiments of this application, the IoT technology can implement massive connections, deep coverage, and power saving for terminals by using, for example, a narrowband (narrowband, NB) technology.

In addition, in embodiments of this application, the terminal device may further include a sensor such as an intelligent printer, a train detector, or a gas station. Main functions of the terminal device include collecting data (some terminal devices), receiving control information and downlink data of a base station or node, sending an electromagnetic wave, and transmitting uplink data to the base station or node.

The base station in embodiments of this application may be any communication device that has a wireless transceiver function and that is configured to communicate with the terminal device. The base station includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (home evolved NodeB, HeNB, or home NodeB, HNB), a baseband unit (baseband unit, BBU), or an access point (access point, AP), a wireless relay node, a wireless backhaul node, a transmission point (transmission point, TP), or a transmission reception point (transmission reception point, TRP) in a wireless fidelity (wireless fidelity, Wi-Fi) system, may be a gNB or a transmission point (a TRP or a TP) in a 5G system such as an NR system, may be one or a group of antenna panels (including a plurality of antenna panels) of a base station in the 5G system, or may be a network node included in the gNB or transmission point, for example, a baseband unit (BBU) or a distributed unit (distributed unit, DU).

In some deployments, the base station in embodiments of this application may be a central unit (central unit, CU) or a DU. Alternatively, the base station includes the CU and the DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU performs some physical layer processing functions, radio frequency processing, and a function related to an active antenna. Information at the RRC layer is eventually converted into information at the PHY layer, or is converted from information at the PHY layer. Therefore, in this architecture, higher layer signaling, for example, RRC layer signaling, may also be considered as being sent by the DU, or sent by the DU and the AAU. It may be understood that the base station may be a device including one or more of a CU node, a DU node, and an AAU node. In addition, the CU may be classified into a base station in an access network (radio access network, RAN), or the CU may be classified into a base station in a core network (core network, CN). This is not limited in this application.

Further, the CU may be further divided into a control plane central unit (CU-CP) and a user plane central unit (CU-UP). Alternatively, the CU-CP and the CU-UP may be deployed on different physical devices. The CU-CP is responsible for a control plane function, and mainly includes the RRC layer and a PDCP-C layer. The PDCP-C layer is mainly responsible for encryption and decryption of control plane data, integrity protection, data transmission, and the like. The CU-UP is responsible for a user plane function, and mainly includes the SDAP layer and a PDCP-U layer. The SDAP layer is mainly responsible for processing data of the core network and mapping a flow (flow) to a bearer. The PDCP-U layer is mainly responsible for at least one function of encryption and decryption on a data plane, integrity protection, header compression, sequence number maintenance, and data transmission. Specifically, the CU-CP is connected to the CU-UP through a communication interface (for example, an E1 interface). The CU-CP represents that the base station is connected to a core network device through a communication interface (for example, an Ng interface), and is connected to the DU through a communication interface (for example, an F1-C (control plane) interface). The CU-UP is connected to the DU through a communication interface (for example, an F1-U (user plane) interface).

In another possible implementation, the PDCP-C layer is further included in the CU-UP.

It may be understood that the foregoing protocol layer division of the CU and the DU, and the protocol layer division of the CU-CP and the CU-UP are merely examples, and there may be other division manners. This is not limited in embodiments of this application.

The base station mentioned in embodiments of this application may be a device including a CU or a DU, a device including the CU and the DU, or a device including a control plane CU node (a CU-CP node), a user plane CU node (a CU-UP node), and a DU node.

In addition to the foregoing base station and terminal device, in embodiments of this application, a wireless backhaul node (which may also be referred to as an IAB node) is configured to provide a wireless backhaul (backhaul, BH) service for a device (for example, a terminal device) that accesses a wireless backhaul network. The wireless backhaul service is a data and/or signaling backhaul service provided through a wireless backhaul link. The IAB node is a specific name of the relay node, and constitutes no limitation on the solutions of this application. The IAB node may be one of the foregoing base station or terminal device having a forwarding function, or may be an independent device form. In a network including the IAB node (an IAB network for short), the IAB node may provide a wireless access service for a terminal device, and is connected to a donor base station (donor gNB) through a wireless backhaul link to perform transmission of service data of a user.

For example, the IAB node may alternatively be a device such as a customer premises equipment (customer premises equipment, CPE) or a home gateway (residential gateway, RG). In this case, the method provided in embodiments of this application may further be applied to a home access (home access) scenario.

The following describes the IAB node in detail with reference to the accompanying drawings. Details are not described herein.

The base station, the terminal device, and the IAB node may be deployed on land, including indoor, outdoor, handheld, or vehicle-mounted; or may be deployed on water; or may be deployed on an airplane, a balloon, or a satellite in the air. Scenarios in which the base station and the terminal device are located are not limited in embodiments of this application.

In embodiments of this application, the terminal device, the base station, or the IAB node includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software.

In addition, aspects or features of this application may be implemented as a method, an apparatus, or a product that uses standard programming and/or engineering technologies. The term "product" used in this application covers a computer program that can be accessed from any computer-readable component, a carrier, or a medium. For example, a computer-readable medium may include but is not limited to, a magnetic storage component (for example, a hard disk, a floppy disk, or a magnetic tape), an optical disc (for example, a compact disc (compact disc, CD) or a digital versatile disc (digital versatile disc, DVD)), and a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable storage media" may include but is not limited to a wireless channel, and various other media that can store, contain, and/or carry instructions and/or data.

Figure 1:
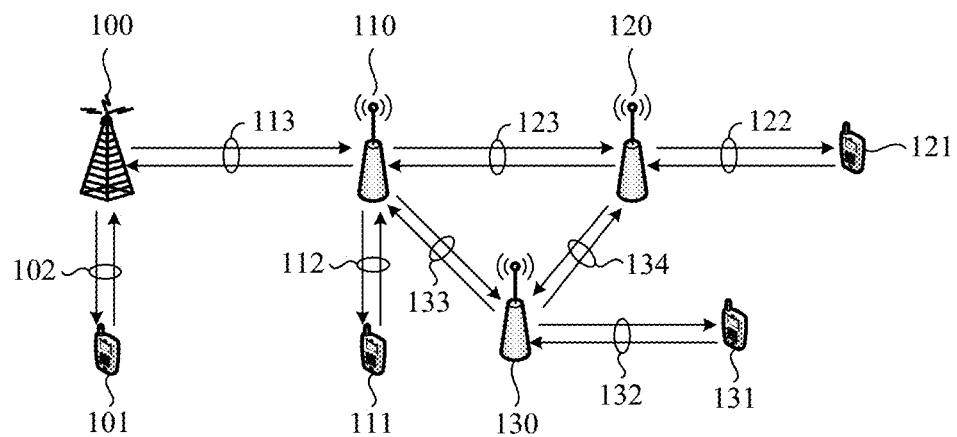
FIG. 1 is an architectural diagram of an IAB system to which technical solutions of this application are applicable.

FIG. 1 is an architectural diagram of an IAB system to which technical solutions of this application are applicable. As shown in FIG. 1, an IAB system includes: at least one base station 100, one or more terminal devices 101 served by the base station 100, one or more relay nodes (namely, IAB nodes) 110, and one or more terminal devices 111 served by the IAB nodes 110. The IAB node 110 is connected to the base station 100 through a wireless backhaul link 113. The base station 100 is usually referred to as a donor base station. Alternatively, the donor base station is also referred to as a donor node, a donor node, or an IAB donor (referred to as an IAB donor below for ease of description) in this application. In addition, the IAB network system may include one or more intermediate IAB nodes (referred to as IAB nodes below for ease of description), for example, an IAB node 120 and an IAB node 130.

The IAB donor may be an access network element having a complete base station function, or may be a form in which a CU and a DU are separated, that is, the IAB donor includes an IAB donor central unit and an IAB donor distributed unit. In this specification, the IAB donor central unit is also referred to as an IAB donor CU (which may also be referred to as a donor CU or directly referred to as a CU, and is collectively referred to as an IAB donor CU in the following for ease of description). The IAB donor distributed unit is also referred to as an IAB donor DU (which may also be referred to as a donor DU, and is collectively referred to as an IAB donor DU in the following for ease of description).

The IAB donor includes two parts: the IAB donor CU and the IAB donor DU. Similar to the foregoing base station, the IAB donor may include one IAB donor CU and one or more IAB donor DUs. The IAB donor CU has functions similar to those of the CU of the foregoing base station, and mainly implement functions of the PDCP layer, the SDAP layer, and the RRC layer. The IAB donor DU has functions similar to those of the DU of the foregoing base station, and mainly implement functions of L1 and L2 protocol stacks, including functions of the PHY layer, the MAC layer, and the RLC layer. Details are not described herein again.

For example, the IAB donor CU may alternatively be a form in which a control plane (control plane, CP) (which is collectively referred to as an IAB donor CU-CP in the following for ease of description) and a user plane (user plane, UP) (which is collectively referred to as an IAB donor CU-UP in the following for ease of description) are separated. For example, the CU may include one CU-CP and one or more CU-UPs.

In embodiments of this application and the accompanying drawings, an example in which the IAB donor includes the IAB donor CU and the IAB donor DU is used to illustrate the method provided in embodiments of this application.

To facilitate understanding of embodiments of this application, concepts in embodiments of this application are first briefly described. It should be understood that the basic concepts described in the following are briefly described by using a basic concept specified in an NR protocol as an example, but embodiments of this application are not limited to being applied to only an NR system. Therefore, standard names appearing when the NR system is used as an example for description are all functional descriptions, and specific names are not limited, and may be correspondingly extended to another system, for example, a 2G, 3G, 4G, or future communication system.

1. Basic Concepts.

Link: The link indicates a path between two neighboring nodes on a path.

Access link: The access link is a link between a terminal device and a base station, between the terminal device and an IAB node, between the terminal device and an IAB donor, or between the terminal device and an IAB donor DU. Alternatively, the access link includes a wireless link used when an IAB node serves as a common terminal device role to communicate with a parent node of the IAB node. When serving as the common terminal device, the IAB node does not provide a backhaul service for any child node. The access link includes an uplink access link and a downlink access link. In this application, the access link of the terminal device is a wireless link. Therefore, the access link may also be referred to as a wireless access link.

Backhaul link: The backhaul link is a link between an IAB node and a parent node when the IAB node serves as a wireless backhaul node. When serving as the wireless backhaul node, the IAB node provides a wireless backhaul service for a child node. The backhaul link includes an uplink backhaul link and a downlink backhaul link. In this application, the backhaul link between the IAB node and the parent node is a wireless link. Therefore, the backhaul link may also be referred to as a wireless backhaul link.

Parent node and child node: Each IAB node considers a neighboring node that provides a wireless access service and/or a wireless backhaul service for the IAB node as a parent node (parent node). Correspondingly, each IAB node may be considered as a child node (child node) of the parent node of the IAB node.

Alternatively, the child node may also be referred to as a lower-level node, and the parent node may also be referred to as an upper-level node.

Previous-hop node of a node: The previous-hop node is a node that is on a path including the node and that finally receives data (or referred to as a data packet) before the node. It may be understood that the previous-hop node of the node may include a previous-hop node of the node in uplink transmission and a previous-hop node of the node in downlink transmission.

Next-hop node of a node: The next-hop node is the Pt node that is on a path including the node and that first receives data after the node. It may be understood that the next-hop node of the node may include a next-hop node of the node in uplink transmission and a next-hop node of the node in downlink transmission.

Ingress (ingress) link of a node: The ingress link is a link between the node and a previous-hop node of the node, and may also be referred to as a previous-hop link of the node. It may be understood that the ingress link of the node may include an ingress link of the node in uplink transmission and an ingress link of the node in downlink transmission.

Egress (egress) link of a node: The egress node is a link between the node and a next-hop node of the node, and may also be referred to as a next-hop link of the node. It may be understood that the egress link of the node may include an egress link of the node in uplink transmission and an egress link of the node in downlink transmission.

For example, a link in the ingress link and the egress link may be referred to as a wireless backhaul radio link control channel (backhaul radio link control channel, BH RLC CH), and is referred to as a BH RLC CH in the following for ease of description.

Access IAB node: The access IAB node is an IAB node accessed by a terminal device, or an IAB node that provides an access service for the terminal device.

Intermediate IAB node: The intermediate IAB node is an IAB node that provides a wireless backhaul service for another IAB node (for example, an IAB node on a path between an access IAB node and an IAB donor).

2. Components of the IAB Node.

The IAB node may include two parts: a mobile terminal (mobile terminal, MT) (which is collectively referred to as an IAB node MT in the following for ease of description) and a DU (which is collectively referred to as an IAB node DU in the following for ease of description). The IAB node MT may also be referred to as IAB node UE. This is not limited in this specification. The IAB node communicates with a parent node of the IAB node by using the IAB node MT, and communicates with a child node of the IAB node by using the IAB node DU (where the child node may be a terminal device or another IAB node). An IAB node may establish a backhaul connection to at least one parent node of the IAB node by using an IAB node MT. An IAB node DU of an IAB node may provide an access service for a terminal device or an IAB node MT of another IAB node. Descriptions are provided below by using an example with reference to FIG. 2.

Figure 2:
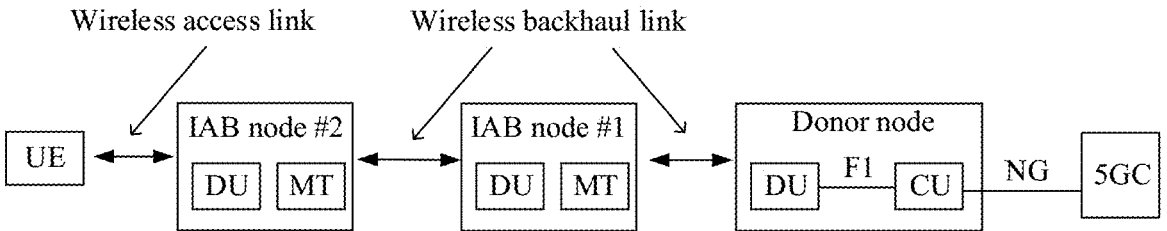
FIG. 2 is a scenario diagram of information backhaul.

FIG. 2 is a scenario diagram of information backhaul. FIG. 2 is a schematic diagram of composition of an IAB node. UE is connected to an IAB donor (a donor node shown in FIG. 2) via an IAB node #2 and an IAB node #1 (an IAB node #2 and an IAB node #1 shown in FIG. 2). The IAB node #2 includes an IAB node#2 DU and an IAB node#2 MT, and the IAB node #1 includes an IAB node#1 DU and an IAB node#1 MT.

The IAB node#2 DU provides an access service for the UE. The IAB node#1 DU provides an access service for the IAB node#2 MT part. The IAB donor DU provides an access service for the IAB node#1 MT.

For example, the IAB donor CU is connected to a 5G core network (5G core, 5GC) through a communication interface (an NG interface shown in FIG. 2), and the IAB donor DU and the IAB donor CU are connected through a communication interface (an F1 interface shown in FIG. 2). It should be understood that a name of a communication interface is not limited in embodiments of this application.

For ease of understanding, a protocol stack of an IAB network further needs to be described. The protocol stack of the IAB network includes a user plane protocol stack and a control plane protocol stack.

3. Protocol Stack Architectures of an Access IAB Node, Intermediate IAB Node, IAB Donor DU, IAB Donor CU, and Terminal Device.

The intermediate IAB node has a same protocol stack on a user plane and a control plane. (a) and (b) in FIG. 3 are examples of the protocol stack architecture of the intermediate IAB node. An IAB node MT and an IAB node DU of the intermediate IAB node may not share a backhaul adaptation protocol (backhaul adaptation protocol, BAP) layer, as shown in (a) in FIG. 3. The IAB node MT and the IAB node DU of the intermediate IAB node may alternatively share the BAP layer, as shown in (b) in FIG. 3.

Protocol stacks of the access IAB node on the user plane and control plane are different, and may be shown in FIG. 4 and FIG. 5 respectively.

FIG. 4 is an example of a user plane protocol stack architecture of a multi-hop IAB network. As shown in FIG. 4, in the protocol architecture shown in FIG. 4, meanings of protocol layers are: a service data adaptation protocol (service data adaptation protocol, SDAP) layer, a packet data convergence protocol (packet data convergence protocol, PDCP) layer, a general packet radio service tunneling protocol user plane (general packet radio service tunneling protocol user plane, GTP-U) layer, a user datagram protocol (user datagram protocol, UDP) layer, an internet protocol (internet protocol, IP) layer, an L2 layer (layer 2), an L1 layer (layer 1), a radio link control (radio link control, RLC) layer, a media access control (medium access control, MAC) layer, a physical (physical, PHY) layer, a radio resource control (radio resource control, RRC) layer, an F1 application protocol (F1 application protocol, F1AP) layer, and a stream control transmission protocol (stream control transmission protocol, SCTP) layer.

The L2 layer is a link layer. For example, the L2 layer may be a data link layer in an open systems interconnection (open systems interconnection, OSI) reference model.

The L1 layer may be a physical layer. For example, the L1 layer may be a physical layer in the OSI reference model.

To meet service quality requirements of different types of services of a terminal device, one or more radio bearers (radio bearers, RBs) are used in a wireless network. The radio bearers include a data radio bearer (data radio bearer, DRB) and a signaling radio bearer (signaling radio bearer, SRB), and are configured to perform transmission of different types of service data (including control plane signaling and user plane data) between UE and a base station. In the IAB network, the RB may be considered as a logical channel for data transmission between the UE and an IAB donor.

Specifically, in FIG. 4, a radio access link between the UE and an IAB node #2 may be referred to as a DRB, and a wireless backhaul link between the IAB node #2 and an IAB node #1 and a wireless backhaul link between the IAB node #1 and an IAB donor DU of the IAB donor may be BH RLC CHs.

A corresponding protocol layer entity, such as a PDCP entity, an RLC entity, and a MAC entity, is configured for each protocol layer. In uplink transmission, after corresponding processing is performed on data (for example, an IP data packet, data for short below) of the UE at the PDCP layer, the data is sent to a PHY layer of an access backhaul node (for example, the IAB node #2 shown in FIG. 4) through the RLC layer, the MAC layer, and the PHY layer in sequence.

As described above, in the IAB network, an IAB node may include an IAB node DU and an IAB node MT. When the IAB node is used as a wireless backhaul node, the IAB node MT of the IAB node performs data forwarding on a backhaul link without requiring a complete protocol stack of a terminal device on a wireless access link.

For example, in FIG. 4, the IAB node #2 is a child node of the IAB node #1. When the IAB node #2 sends the data from the UE to the IAB node #1, the IAB node#2 MT of the IAB node #2 does not require the PDCP layer, and the data is forwarded below the BAP layer. Therefore, in FIG. 4, when the IAB node serves as a wireless backhaul node to send data to a parent node of the IAB node, only a protocol layer below the BAP layer is involved. This is applicable to all IAB nodes. Details are not described.

When the IAB node serves as a wireless terminal, a protocol stack of a communication link between the IAB node and a parent node is the same as a protocol stack of a radio access link between the UE and the access IAB node, and a protocol stack between the IAB node and the donor CU is the same as a protocol stack between the UE and the donor CU.

In addition, FIG. 4 further shows a user plane protocol stack (F1-U shown in FIG. 4) of an F1 interface between the IAB donor CU and the access IAB node (the IAB node #2 in FIG. 4). GTP-U tunnels established over the F1 interface by using the GTP-U protocol layer are in a one-to-one correspondence with data radio bearers DRBs of the UE. That is, each data radio bearer of the UE is corresponding to one GTP tunnel.

FIG. 5 is an example of a control plane protocol stack architecture of a multi-hop IAB network. If an IAB donor adopts a CP-UP split architecture, an F1-C interface is established between an IAB node#2 DU and an IAB donor CU-CP. An RRC message of UE is encapsulated in an F1AP message of the F1-C interface for transmission.

The descriptions of the protocol layers in FIG. 4 are also applicable in FIG. 5, but there are some differences. For example, an F1 interface between an access IAB node and an IAB donor CU in FIG. 5 uses an F1 control plane (F1-C) protocol stack.

It should be noted that FIG. 4 and FIG. 5 each show an example of end-to-end user plane and control plane protocol stack architectures for transmission of a data service of the UE in the IAB network. Optionally, there may be another possibility for the protocol stack architecture. For example, if a protocol layer for security protection is used on the F1 interface between the IAB node #2 and the IAB donor CU, the protocol stack architecture changes.

In addition, if the IAB donor is an entity with a complete function, the IAB donor retains a protocol stack for an interface between the IAB donor DU and an external node and for an interface between the IAB donor CU and the external node. A protocol layer on an internal interface between the IAB donor DU and the IAB donor CU is not mandatory. Similarly, externally, the IAB node DU and the IAB node MT may not be distinguished in the protocol stack of the IAB node, and only the protocol stack for the interface of the external node is displayed in a unified manner.

In addition, regardless of the control plane protocol stack architecture or the user plane protocol stack architecture, when the IAB donor CU is an agent node of the F1 interface between the IAB donor DU and the IAB node, the user plane protocol stack architecture oriented to the access IAB node in the IAB donor DU may include, above the IP layer, a UDP layer and a GTP-U layer that are respectively peered to a UDP layer and a GTP-U layer in a protocol stack architecture of the IAB node DU of the access IAB node, and may further include an IPsec layer that is peered to the IAB node DU of the access IAB node. The control plane protocol stack architecture oriented to the access IAB node in the IAB donor DU may include, above an IP layer, an SCTP layer and an SCTP layer that are respectively peered to an SCTP layer and an F1AP layer in the protocol stack architecture of the IAB node DU of the access IAB node, and may further include an IPsec layer or a DTLS layer peered to an IAB node DU of the access IAB node.

In addition, the F1 interface is further used in FIG. 4 and FIG. 5.

4. F1 Interface and Protocol Layer of the F1 Interface

The F1 interface is a logical interface between an IAB node DU of an IAB node and an IAB donor (or an IAB donor CU or an IAB donor DU). The F1 interface may also be referred to as an F1* interface, and supports a user plane and a control plane. A protocol layer of the F1 interface refers to a communication protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IP Security, IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (datagram transport layer security, DTLS) layer.

FIG. 6 is a schematic diagram of a mapping relationship among RLC channels, logical channels, and protocol entities. As shown in FIG. 6, the RLC channel (RLC channel) is a channel between an RLC layer and an upper protocol layer. Configurations of radio bearers correspond to a configuration of a higher layer (for example, a PDCP layer) part and a configuration of a lower layer (for example, an RLC layer and a MAC layer).

A configuration of an RLC bearer refers to a configuration corresponding to an RB at the RLC layer, and specifically includes configurations of an RLC layer entity and a logical channel. In this specification, an RLC bearer of the IAB node on a backhaul link includes the RLC layer and the logical channel part. The RLC channel on the backhaul link is the channel between the RLC layer and the upper protocol layer. For example, if an upper layer of the RLC layer is the PDCP layer, the RLC channel on the backhaul link is a channel between the RLC layer and the PDCP layer. For another example, if the upper layer of the RLC layer is a BAP layer, the RLC channel on the backhaul link is a channel between the RLC layer and the BAP layer. Therefore, a definition of the RLC channel specifically depends on the upper protocol layer of the RLC layer. The RLC channels of the IAB node on the backhaul link are in a one-to-one correspondence with RLC entities and RLC bearers.

For a relationship between a BAP entity and the RLC entities, as shown in (a) in FIG. 6, one BAP entity may correspond to a plurality of RLC entities, or as shown in (b) in FIG. 6, one BAP entity may correspond to one RLC entity. This is not limited in this application.

In addition, the BAP layer has one or more of the following capabilities: adding routing information (routing information) that can be identified by a wireless backhaul node (the IAB node) to data, performing routing selection based on the routing information that can be identified by the wireless backhaul node, adding identification information that are related to a quality of service (quality of service, QoS) requirement and that can be identified by the wireless backhaul node to the data, performing QoS mapping on a plurality of links including the wireless backhaul node for data, adding a data type indication information to the data, and sending flow control feedback information to a node having a flow control capability.

The routing information that can be identified by the IAB node may be one or more of an identifier of a terminal, an identifier of an IAB node accessed by the terminal, an identifier of an IAB donor, an identifier of an IAB donor DU, an identifier of an IAB donor CU, an identifier of a transmission path, and other information.

The QoS mapping on the plurality of links may be: performing, on the wireless backhaul link, mapping from an RB of the terminal to the RLC bearer, the RLC channel, or the logical channel on the wireless backhaul link based on an identifier that is of the RB of the terminal and that is carried in the data; or performing, based on a correspondence between any two or more of RBs, RLC bearers, RLC channels, and logical channels of an ingress link and an egress link, mapping from the RB, RLC bearer, RLC channel, or logical channel of the ingress link to the RB, RLC bearer, RLC channel, or logical channel of the egress link.

The identification information related to the QoS requirement may be, for example, one or more of a QoS flow identifier (QoS flow identifier, QFI) of the terminal, the identifier of the RB of the terminal, a differentiated services code point (differentiated services code point, DSCP), and a flow label (flow label) in a header of IP data of an internet protocol version 6 (Internet protocol version 6, IPv6).

It should be noted that a name of the protocol layer having these capabilities is not necessarily the BAP layer, and may also be another name. A person skilled in the art may understand that any protocol layer having these capabilities may be understood as the BAP layer in embodiments of this application.

In addition, this application further relates to the routing selection and bearer mapping.

Routing selection: This is used to select a next-hop node for information (including data and/or signaling).

The bearer mapping may also be referred to as QoS mapping. The bearer mapping is used to select an RLC bearer, an RLC channel, or a logical channel for sending the information (including the data and/or the signaling).

It should be understood that in the integrated access and backhaul system shown in FIG. 1, one IAB node is connected to one upper-level node. However, in a future relay system, to improve reliability of a wireless backhaul link, one IAB node (for example, 120 shown in FIG. 1) may have a plurality of upper-level nodes that simultaneously provide services for the IAB node. The IAB node #130 in FIG. 1 may also be connected to the IAB node #120 through the backhaul link 134. That is, both the IAB node #110 and the IAB node #120 are considered as upper-level nodes of the IAB node #130. Names of the IAB node #110, the IAB node #120, and the IAB node #130 are not limited to a scenario or a network in which the IAB node #110, the IAB node #120, and the IAB node #130 are deployed, and may be any other name such as a relay or an RN. In this application, the IAB node may usually refer to any node or device having a relay function. It should be understood that use of the IAB node and use of the relay node in this application have a same meaning. The IAB node is used in this application only for ease of description.

In FIG. 1, wireless links 102, 112, 122, 132, 113, 123, 133, and 134 may be bidirectional links, including uplink and downlink transmission links. Specifically, the wireless backhaul links 113, 123, 133, and 134 may be used by upper-level nodes to provide services for lower-level nodes. For example, the upper-level node 100 provides a wireless backhaul service for the lower-level node 110. It should be understood that the uplink and the downlink of the backhaul link may be separated. To be specific, the uplink and the downlink are not transmitted via a same node. The downlink transmission means that the upper-level node such as the node 100 transmits information or data to the lower-level node such as the node 110. The uplink transmission means that the lower-level node such as the node 110 transmits information or data to the upper-level node such as the node 100. The node is not limited to a network node or a terminal device. For example, in a D2D scenario, a terminal device may be used as a relay node to serve another terminal device. In some scenarios, the wireless backhaul link may also be an access link. For example, when the node 110 serves as a common terminal device, the backhaul link 123 may also be considered as an access link for the node 110. When the node 100 serves as a common terminal device, the backhaul link 113 is also an access link of the node 100. It should be understood that the upper-level node may be a base station or a relay node, and the lower-level node may be a relay node or a terminal device having a relay function. For example, in the D2D scenario, the lower-level node may also be a terminal device.

In an information transmission method, nodes (including the IAB donor DU and all IAB nodes) on a path between the IAB donor CU and the UE that are shown in FIG. 2 are all controlled by the IAB donor CU.

Transmission of an F1-U service and an F1-C service between the IAB donor and the IAB node #2 is respectively described. The F1-U service includes data transmitted over an F1-U interface between the IAB node#2 DU of the IAB node #2 and the IAB donor CU. The F1-C service includes signaling transmitted over an F1-C interface between the IAB node#2 DU and the IAB donor CU.

The downlink transmission of the F1-U service between the IAB donor and the IAB node #2 includes the following steps.

(1) Transmission on a Path from the IAB Donor CU to the IAB Donor DU:

As shown in FIG. 4, the IAB donor CU encapsulates a PDCP PDU of the UE into a corresponding GTP tunnel, and processes the PDCP PDU at the IP layer to generate an IP packet. The processing at the IP layer includes adding a corresponding DSCP or flow label value to the PDCP PDU, adding the DSCP or flow label value to an IP header field, and including, in the IP header, a target IP address (an IP address of the IAB node#2 DU) for sending the PDCP PDU. The IAB donor CU sends the IP packet to the IAB donor DU.

(2) Transmission on a Path from the IAB Donor DU to the IAB Node#1 MT:

After receiving the IP packet, the IAB donor DU extracts the target IP address from the IP packet, extracts the DSCP or flow label value from the IP packet, and performs routing mapping and bearer mapping operations on the IP packet based on the mapping relationship obtained from the IAB donor CU.

In the routing mapping, the IAB donor DU determines a routing identifier of the IP packet based on the mapping relationship (for example, a mapping relationship between the target IP address and the routing identifier (Routing ID) and a mapping relationship between the DSCP or flow label and the routing ID) obtained from the IAB donor CU. Then, based on a routing table (for example, a mapping relationship between the routing ID and a BAP address of a next-hop node) obtained from the IAB donor CU, a next-hop node (where the BAP address may uniquely identify an IAB node under the IAB donor CU) to which the IP needs to be routed is determined.

In the bearer mapping, the IAB donor DU determines, based on a mapping relationship (for example, a mapping relationship between the target IP address and a BH RLC CH ID and a mapping relationship between the DSCP or flow label and the BH RLC CH ID) obtained from the IAB donor CU, a transmission channel (a BH RLC CH) to which the IP packet is mapped, where the IP packet is sent to the next-hop node determined based on routing.

After determining the routing and bearer mappings, the IAB donor DU includes the determined routing ID in the IP packet at the BAP layer, and sends the IP packet to the next-hop node (the IAB node#1 MT).

(3) Transmission on a path from the IAB node#1 DU to the IAB node#2 MT:

After receiving the IP packet from a transmission channel (referred to as an ingress BH RLC CH) between the IAB node#1 MT and the IAB donor DU, the IAB node#1 MT extracts the routing ID from the BAP layer. The IAB node#1 MT sends the IP packet (or referred to as a BAP SDU) and the obtained routing ID to the IAB node#1 DU through an internal interface. The IAB node#1 DU performs routing and bearer mapping operations on the IP packet based on the mapping relationship previously obtained from the IAB donor CU.

In the routing mapping, the IAB node#1 DU determines, based on the routing table (for example, the mapping relationship between the routing ID and the BAP address of the next-hop node) obtained from the IAB donor CU, the next-hop node to which the IP packet needs to be routed.

In the bearer mapping, the IAB node#1 DU determines, based on a mapping relationship (for example, a mapping relationship between the ingress BH RLC CH ID and an egress BH RLC CH ID) obtained from the IAB donor CU, a transmission channel (an egress BH RLC CH) to which the IP packet is mapped, where the IP packet is sent to the next-hop node determined based on the routing.

Similar to the operations of the IAB node#1 MT, after receiving the IP packet from the transmission channel (the ingress BH RLC CH) between the IAB node#2 MT and the IAB node#1 DU, the IAB node#2 MT sends the IP packet to the IAB node#2 DU through an internal interface.

The IAB node#2 DU sends the received IP packet to the GTP layer for processing, and extracts the PDCP PDU of the UE from the corresponding GTP tunnel.

The downlink transmission of the F1-C service between the IAB donor and the IAB node #2 includes the following steps.

As shown in FIG. 5, the IAB donor CU generates an F1AP message (including a UE-associated F1AP message and a non-UE-associated F1AP message, where an RRC message of the UE is encapsulated in the UE-associated F1AP message for transmission), and processes the F1AP message at the IP layer to generate an IP packet. The processing at the IP layer includes adding a corresponding DSCP or flow label value to the F1AP message, including the DSCP or flow label value in an IP header field, and including a target IP address (an IP address of an IAB-DU) for sending the F1AP message in the IP header. The IAB donor CU sends the IP packet to the IAB donor DU.

Similar to the F1-U service, routing and bearer mapping manners of the F1-C service on each path is the same as operations of the foregoing F1-U service. Details are not described. The IAB node#2 DU of the IAB node#2 sends the received IP packet to the F1AP layer for processing. If the RRC message of the UE is carried in the F1AP message for transmission, the IAB node#2 DU further extracts the RRC message of the UE from the F1AP message.

For the downlink transmission, the routing mapping and bearer mapping operations are performed only on the BAP layers of the IAB donor DU and the IAB node#1 DU.

The uplink transmission of the F1-U service between the IAB donor and the IAB node #2 includes the following steps.

As shown in FIG. 4, the IAB node #2 receives, from a DRB, a PDCP PDU sent by the UE, encapsulates the PDCP PDU in a corresponding GTP tunnel, and processes the PDCP PDU at the IP layer to generate an IP packet. The IAB node #2 sends the IP packet to the IAB node#2 MT through an internal interface.

(1) Transmission on a Path from the IAB Node#2 MT to the IAB Node#1 DU:

In a routing mapping, the IAB node#2 MT determines a routing identifier of the IP packet based on a mapping relationship (for example, a mapping relationship between a GTP F-TEID and a routing ID) obtained from the IAB donor CU. Then, the IAB node#2 MT determines, based on a routing table (for example, a mapping relationship between the routing ID and a BAP address of a next-hop node) obtained from the IAB donor CU, a next-hop node to which the IP packet needs to be routed. The GTP F-TEID includes a GTP TED and an IP address.

In a bearer mapping, the IAB node#2 MT determines, based on a mapping relationship (for example, a mapping relationship between the GTP F-TEID and a BH RLC CH ID) obtained from the IAB donor CU, a transmission channel (a BH RLC CH) to which the IP packet is mapped, where the IP packet is sent to the next-hop node determined based on the routing.

After determining the routing and bearer mappings, the IAB node#2 MT includes the determined routing ID in the IP packet at the BAP layer, and sends the IP packet to the next-hop node (the IAB node#1 DU).

(2) Transmission on a Path from the IAB Node#1 MT to the IAB Donor DU:

Uplink routing mapping and bearer mapping operations performed by the IAB node#1 MT may continue to be used in uplink routing mapping and bearer mapping operations performed by the IAB node#1 DU. Details are not described.

The uplink transmission of the F1-C service between the IAB donor and the IAB node #2 includes the following steps.

As shown in FIG. 5, the IAB node#2 DU generates an F1AP message, and processes the F1AP message at the IP layer to generate an IP packet. The IAB node #2 DU sends the IP packet to the IAB node#2 MT through an internal interface.

(1) Transmission on a Path from the IAB Node#2 MT to the IAB Node#1 DU:

In a routing mapping, the IAB node#2 MT determines a routing identifier of the IP packet based on a mapping relationship (for example, a mapping relationship between a CP type and a routing ID) obtained from the IAB donor CU. Then, the IAB node#2 MT determines, based on a routing table (for example, a mapping relationship between the routing ID and a BAP address of a next-hop node) obtained from the IAB donor CU, a next-hop node to which the IP packet needs to be routed. The CP type indicates a UE-associated F1AP message and a non-UE associated F1AP message.

In a bearer mapping, the IAB node#2 MT determines, based on a mapping relationship (for example, a mapping relationship between the CP type and a BH RLC CH ID) obtained from the IAB donor CU, a transmission channel (a BH RLC CH) to which the IP packet is mapped, where the IP packet is sent to the next-hop node determined based on the routing.

After determining the routing and bearer mappings, the IAB node#2 MT includes the determined routing ID in the IP packet at the BAP layer, and sends the IP packet to the next-hop node (the IAB node#1 DU).

(2) Transmission on a Path from the IAB Node#1 MT to the IAB Donor DU:

Routing and bearer mapping operations of the uplink F1-C service on the path are the same as those of the uplink F1-U service on the path. Details are not described herein.

A difference between the routing and bearer mappings in the uplink transmission and the routing and bearer mappings in the downlink transmission lies in different operations of the access IAB node and the IAB donor DU:

For the uplink transmission, the routing and bearer mapping operations are performed only on the BAP layers of the IAB-MT2 and the IAB-MT1.

In conclusion, for the F1-U service:

In a UL direction, the access IAB node (the IAB node#2 MT) determines the next-hop node of the routing based on the mapping relationship between the GTP F-TEID and the routing ID and the mapping relationship between the routing ID and the BAP address of the next-hop node, and determines, based on the mapping relationship between the GTP F-TEID and the BH RLC CH ID, the transmission channel for sending.

In a DL direction, the IAB donor DU determines the next-hop node of the routing based on the target IP address, the mapping relationship between the DSCP or flow label and the routing ID, and the mapping relationship between the routing ID and the BAP address of the next-hop node, and determines, based on the target IP address and the mapping relationship between the DSCP or flow label and the BH RLC CH ID, the transmission channel for sending.

For the F1-C service:

In the UL direction, the access IAB node (the IAB node#2 MT) determines the next-hop node of the routing based on the mapping relationship between the CP type and the routing ID and the mapping relationship between the routing ID and the BAP address of the next-hop node, and determines, based on the mapping relationship between the CP type and the BH RLC CH ID, the transmission channel for sending.

In the DL direction, the IAB donor DU determines the next-hop node of the routing based on the mapping relationship between the target IP address and the routing identifier (Routing ID), the mapping relationship between the DSCP or flow label and the routing identifier (Routing ID), and the mapping relationship between the routing ID and the BAP address of the next-hop node, and determines, based on the mapping relationship between the DSCP or flow label and the BH RLC CH ID and the mapping relationship between the target IP address and the BH RLC CH ID, the transmission channel for sending.

It may be learned from the foregoing descriptions that the IAB donor DU and all the IAB nodes on the path between the UE and the IAB donor CU are all managed by the IAB donor CU, and the IAB donor CU uniformly controls the routing mapping and bearer mapping on the entire path. To be specific, data and/or signaling (collectively referred to as information) is not communicated across network topologies. With development of the IAB technology, the IAB node may migrate between IAB donor CUs due to movement, link quality, or the like. As a result, the IAB donor DU and all the IAB nodes on the path between the UE and the IAB donor CU may be managed by two different IAB donor CUs separately. Consequently, the routing and bearer mappings on the entire path are controlled by the two different IAB donor CUs separately. However, transmission in an inter-network topology scenario cannot be implemented by using an existing technology.

According to the information transmission method provided in embodiments of this application, routing and bearer mappings of data/signaling in a network topology scenario are established to ensure normal transmission of the data/signaling in an inter-network topology scenario, to improve transmission performance during inter-network topology transmission of the data/signaling.

The following describes in detail the information transmission method provided in embodiments of this application.

Scenarios related to the information transmission method provided in embodiments of this application are first described with reference to (a) and (b) in FIG. 7.

(a) in FIG. 7 is a scenario in which migration occurs between IAB donor CUs.

As shown in (a) in FIG. 7, a boundary node migrates. For example, an IAB node#1 MT migrates (where the IAB node#1 MT migrates from a source IAB donor DU to a target IAB donor DU). The source IAB donor DU is connected to a source IAB donor CU, and the target IAB donor DU is connected to a target IAB donor CU.

Once the IAB node #1 MT successfully migrates to the target IAB donor DU, a transmission path of information sent by the source IAB donor CU to UE may be: Source IAB donor CU—target IAB donor DU—IAB node#1 MT—IAB node#1 DU—IAB node#2 MT—IAB node#2 DU—UE.

Because the IAB node#1 MT migrates, the IAB node#1 MT is managed by the target IAB donor CU. Because the IAB node#1 DU maintains an F1 connection to the source IAB donor CU, the IAB node#1 DU is managed by the source IAB donor CU. The IAB node#2 MT, the IAB node#2 DU, and the UE are managed by the source IAB donor CU. Therefore, an entire transmission path includes two network topologies. A path of target IAB donor DU—IAB node#1 MT is controlled by the target IAB donor CU (which may be understood that a network topology managed by the target IAB donor CU includes nodes: the target IAB donor DU and the IAB node#1 MT). A path of IAB node#1 DU—IAB node#2 MT—IAB node#2 DU is controlled by the source IAB donor CU (which may be understood that a network topology managed by the source IAB donor CU includes nodes: the IAB node#1 DU, the IAB node#2 MT, and the IAB node#2 DU).

(b) in FIG. 7 is a scenario in which an IAB donor CU supports dual connectivity (dual connectivity, DC).

As shown in (b) in FIG. 7, different from the migration scenario shown in (a) in FIG. 7, in the DC scenario, a boundary IAB node is connected to two parent nodes. For example, an IAB node#1 MT works in a DC mode. The IAB node#1 MT is connected to both a source IAB donor DU and a target IAB donor DU. The source IAB donor DU is connected to a source IAB donor CU. The target IAB donor DU is connected to a target IAB donor CU.

In this scenario, information transmission across network topologies also exists. For example, a transmission path for sending information by the source IAB donor CU to the UE may be: Source IAB donor CU—target IAB donor DU— IAB node#1 MT—IAB node#1 DU—IAB node#2 MT— IAB node#2 DU—UE.

For ease of distinguishing the scenario shown in (b) in FIG. 7, the source IAB donor CU may also be referred to as a primary IAB donor CU, and the target IAB donor CU may also be referred to as a secondary IAB donor CU. For ease of description, no distinction is made in the following embodiments. Both the source IAB donor CU and the primary IAB donor CU are referred to as a first IAB donor CU, and both the target IAB donor CU and the secondary IAB donor CU are referred to as a second IAB donor CU.

For example, the network topologies shown in (a) and (b) in FIG. 7 include the network topology managed by the target IAB donor CU and the network topology managed by the source IAB donor CU. The network topology managed by the target IAB donor CU includes nodes: the target IAB donor DU and the IAB node#1 MT. The network topology managed by the source IAB donor CU includes the nodes: the source IAB donor CU, the IAB node#1 DU, the IAB node#2 MT, and the IAB node#2 DU.

It should be understood that (a) and (b) in FIG. 7 are merely examples for describing possible inter-network topology scenarios, and do not constitute any limitation on a protection scope of this application. In another IAB network, an IAB donor DU and all IAB nodes on a path between UE and an IAB donor CU are managed by a plurality of different IAB donor CUs. This is also within the protection scope of this application.

For example, there may be at least one other IAB node between the IAB node#1 MT and the source IAB donor DU in (a) and (b) in FIG. 7. There is at least one other IAB node between the IAB node#1 MT and the target IAB donor DU. There is at least one other IAB node between the IAB node#2 DU and the UE.

A specific structure of an execution body of the method provided in embodiments of this application is not particularly limited in the following embodiments of this application, provided that a program that records code of the method provided in embodiments of this application can be run to perform communication according to the method provided in embodiments of this application. For example, the execution body of the method provided in embodiments of this application may be an IAB node or an IAB donor, or may be a functional module that is in the IAB node or the IAB donor and that can invoke the program and execute the program.

To facilitate understanding of embodiments in this application, the following points are described.

First, in this application, "indicate" may be understood as "enable", and "enable" may include directly enable and indirectly enable. When one piece of information is described to enable A, it may include that the information directly enables A or indirectly enables A, but it does not necessarily mean that the information carries A.

Information enabled by the information is referred to as to-be-enabled information. In a specific implementation process, there are a plurality of manners of enabling the to-be-enabled information. For example, but not limited to, the to-be-enabled information, for example, the to-be-enabled information or an index of the to-be-enabled information, may be directly enabled. Alternatively, the to-be-enabled information may be indirectly enabled by enabling other information, and there is an association relationship between the other information and the to-be-enabled information. Alternatively, only a part of the to-be-enabled information may be enabled, and the other part of the to-be-enabled information is known or pre-agreed on. For example, specific information may alternatively be enabled by using an arrangement sequence of a plurality of pieces of information that is pre-agreed on (for example, stipulated in a protocol), to reduce enabling overheads to some extent. In addition, a common part of all the pieces of information may further be identified and enabled in a unified manner, to reduce enabling overheads caused by separately enabling same information.

Second, first, second, and various numeric numbers (for example, "#1" and "#2") shown in this application are merely for ease of description, and are used to distinguish between objects, but are not intended to limit the scope of embodiments of this application. For example, the terms are used to distinguish between different indication information rather than describe a specific order or sequence. It should be understood that the objects described in this way are interchangeable in an appropriate circumstance, to describe a solution other than embodiments of this application.

Third, in this application, "preset" may include predefine, for example, define in a protocol. "Pre-define" may be implemented by storing a corresponding code or table in a device (for example, including an IAB node or an IAB donor) or in another manner used to indicate related information. A specific implementation thereof is not limited in this application.

Fourth, "store" in embodiments of this application may mean being stored in one or more memories. The one or more memories may be separately disposed, or may be integrated into an encoder or a decoder, a processor, or a communication apparatus. Alternatively, a part of the one or more memories may be separately disposed, and a part of the one or more memories are integrated into a decoder, a processor, or a communication apparatus. A type of the memory may be a storage medium in any form. This is not limited in this application.

Fifth, a "protocol" in embodiments of this application may be a standard protocol in the communication field, for example, may include an 5G protocol, a new radio (new radio, NR) protocol, and a related protocol applied to a future communication system. This is not limited in this application.

The information transmission method provided in embodiments of this application may be used in the communication system shown in FIG. 1. It should be understood that the information transmission method provided in embodiments of this application may also be used in another communication system. Details are not described herein.

The method is used in a communication system. For a step performed by a receive end, refer to the following IAB node. For a step performed by a transmit end, refer to the following donor node. Transmission between the transmit end and the receive end may be performed by using a radio wave, or may be performed by using a transmission medium such as visible light, a laser, infrared, or an optical fiber. Details are not described below.

Without loss of generality, the following uses interaction between the IAB node and the IAB donor as an example to describe in detail the information transmission method provided in embodiments of this application.

Data transmission is used as an example for description. Signaling transmission has the following same problem. In a current IAB network, because a transmission path of data is in a network topology controlled by an IAB donor CU, after any intermediate IAB node receives a BAP SDU sent by a parent node or a child node, a routing table is queried based on a routing ID carried in a BAP layer to determine a next node for sending. In an entire air interface transmission process, the routing ID carried in the BAP layer remains unchanged.

However, during inter-network topology transmission, a transmission path of data/signaling is controlled by different IAB donor CUs. In different network topologies, routing of the data is controlled by the IAB donor CUs to which the network topologies belong. A boundary IAB node (namely, boundary IAB node) belongs to an overlap of two different network topologies. Therefore, the boundary IAB node needs to perform routing conversion operations in the different network topologies for transmission of the data.

Similarly, in the current IAB network, because the transmission path of the data is in the network topology controlled by the IAB donor CU, a BH RLC CH channel that is on the path and to which the data is mapped is also controlled by the IAB donor CU. After receiving the BAP SDU sent by the parent node or child node from an ingress BH RLC CH, the intermediate IAB node sends the data to the next node based on a bearer mapping relationship (a mapping relationship between the ingress BH RLC CH and an egress BH RLC CH) configured by the IAB donor CU and through the corresponding egress BH RLC CH.

However, during the inter-network topology transmission, the transmission path of the data is controlled by the different IAB donor CUs. In the different network topologies, a BH RLC CH to which the data is mapped for transmission is controlled by the IAB donor CUs to which the network topologies belong. Because the boundary IAB node belongs to the overlap of the two different network topologies, an ingress BH RLC CH and an egress BH RLC CH are separately managed and/or controlled by different IAB donor CUs. The boundary IAB node needs to perform bearer mapping conversion operations in the different network topologies for transmission of the data.

It may be learned from the foregoing descriptions that transmission of information (including data and signaling) between UE and an IAB donor CU is uniformly controlled by the IAB donor CU. With development of the IAB technology, the IAB node may migrate between IAB donor CUs due to movement, link quality, or the like. Alternatively, the IAB node implements load balancing by using dual connectivity. As a result, the IAB donor DU and all the IAB nodes on the path between the UE and the IAB donor CU are managed by different IAB donor CUs separately. Consequently, the routing and bearer mappings on the entire path are controlled by the different IAB donor CUs separately. However, the existing technology cannot implement information transmission in an inter-network topology scenario. As a result, information transmission performance in the scenario is affected (for example, a long information interruption delay and unbalanced network load). Therefore, how to implement the information transmission in the inter-network topology scenario and improve the information transmission performance in the scenario becomes an urgent problem to be resolved. The information transmission method provided in embodiments of this application can implement information transmission in a network topology scenario, and improve information transmission performance in the scenario.

FIG. 8 is a schematic flowchart of an information transmission method according to an embodiment of this application.

For example, the embodiment shown in FIG. 8 includes the following several possibilities.

S810: A first IAB donor CU determines first QoS information and/or a signaling type of signaling.

Specifically, S810 includes the following several possibilities.

Possibility 1: When to-be-transmitted information is data, the first IAB donor CU determines the first QoS information.

Specifically, that the first IAB donor CU determines the first QoS information of the data includes: The first IAB donor CU determines second QoS information and the first QoS information based on QoS (which may be referred to as overall QoS) corresponding to the data. The first QoS information is used to determine transmission of the data in a second network topology managed by a second IAB donor CU. The second QoS information is used to determine transmission of the data in a first network topology managed by the first IAB donor CU.

For example, the first network topology includes a first node and a second node (for example, an IAB node #1 and an IAB node #2 shown in (a) and (b) in FIG. 7). The first node is a boundary node (which may also be referred to as a boundary node), and the second node is an access node (which may also be referred to as an access IAB node). The access node provides an access function for a terminal device, and the boundary node performs routing conversion operations in different network topologies for transmission of the data.

In a possible implementation, the second node may be a child node of the first node. That is, there is no other IAB node between the access node and the boundary node in the first network topology.

In another possible implementation, the second node is a node (directly or indirectly) connected to a child node of the first node. That is, there is at least one other node between the access node and the boundary node in the first network topology. In this implementation, the first network topology further includes the child node of the first node.

The second network topology includes the first node and a third node (for example, the IAB node#1 and a target IAB donor DU shown in (a) and (b) in FIG. 7). The third node is a second IAB donor DU.

In a possible implementation, the third node is a parent node of the first node. That is, there is no other IAB node between the second IAB donor DU and the boundary node in the second network topology.

In another possible implementation, the third node is a node (directly or indirectly) connected to a parent node of the first node. That is, there is at least one other node between the second IAB donor DU and the boundary node in the second network topology. In this implementation, the first network topology further includes the parent node of the first node.

For example, the first IAB donor CU obtains QoS information corresponding to the data from a core network device. The core network device in this embodiment of this application may be an access and mobility management function (access and mobility management function, AMF) entity in a core network. The AMF entity may be responsible for access management and mobility management of the terminal device. For ease of description, the AMF entity may be referred to as an AMF, an AMF network element, or the like for short.

For example, for ease of differentiation, in the following descriptions, the second QoS information may be referred to as QoS_S information for short, and the first QoS information may be referred to as QoS_T information for short.

For example, FIG. 9 is a schematic diagram of QoS information division according to an embodiment of this application.

It may be learned from FIG. 9 that the first IAB donor CU divides the QoS information corresponding to the data into two parts: QoS_S information (which is also referred to as the second QoS information, source QoS information, or primary QoS information, where the QoS_S information is used for QoS guarantee for transmission of the data within the network topology managed by the first IAB donor CU) and QoS_T information (which is also referred to as the first QoS information, target QoS information, or secondary QoS information, where the QoS_T information is used for QoS guarantee for transmission of the data in the network topology managed by the second IAB donor CU).

For example, the QoS information corresponding to the data, the second QoS information, and the first QoS information include at least one of the following information: a packet loss rate (packet error rate), a packet delay budget (packet delay budget), a guaranteed bit rate (guaranteed bit rate, GBR), or an aggregate maximum bit rate (aggregate maximum bit rate, AMBR).

For example, when the QoS information corresponding to the data is a total packet delay budget, the second QoS information is a first packet delay budget, and the first QoS information is a second packet delay budget, a sum of the first packet delay budget and the second packet delay budget cannot exceed the total packet delay budget. To be specific, when dividing the QoS information, the source IAB donor CU may determine, based on the first packet delay budget for transmission of a data packet in the network topology managed by the first IAB donor CU, the second packet delay budget for transmission of the data packet in the network topology managed by the second AB donor CU. For example, the total packet delay budget is 10 ms, and a packet delay for transmission of a data packet in the network topology managed by the first IAB donor CU is 6 ms. In this case, the first QoS information obtained through division by the source IAB donor CU may not exceed 4 ms.

For another example, when the QoS information is a total packet loss rate, the second QoS information is a first packet loss rate, and the first QoS information is a second packet loss rate, a sum of the first packet loss rate and the second packet loss rate may not exceed the total packet loss rate.

It should be understood that the foregoing manner of dividing the QoS information corresponding to the data into the second QoS information and the first QoS information is merely an example, and is not intended to limit the protection scope of this application. In this embodiment of this application, the second QoS information can be used for QoS guarantee for transmission of a data packet in the network topology managed by the first IAB donor CU, and the first QoS information can be used for QoS guarantee for transmission of the data packet in the network topology managed by the second IAB donor CU. Specific division manners are not described by using examples one by one.

During inter-network topology transmission, an IAB node MT and an IAB node DU of an IAB node are separately controlled by different IAB donor CUs. In this embodiment of this application, the IAB node is referred to as a boundary IAB node (boundary IAB node). As shown in FIG. 9, after an IAB node#1 MT migrates, the IAB node#1 MT is controlled by a target IAB donor CU, and an IAB node#1 DU is still controlled by a source IAB donor CU. Therefore, an IAB node #1 is a boundary IAB node.

Possibility 2: When to-be-transmitted information is signaling, the first IAB donor CU determines a signaling type of the to-be-transmitted signaling.

The signaling type is used to determine transmission of the signaling in the first network topology. The signaling type is further used to determine transmission of the signaling in the second network topology.

For example, the following signaling types are included: a terminal device-associated (UE-associated) F1 application layer protocol (F1 application layer protocol, F1AP) message and a non-terminal device associated (non-UE associated) F1AP message.

Optionally, signaling plane transmission may further include the signaling type: a non-F1 message (non-F1). Possibility 3: When to-be-transmitted information includes data and signaling, the first IAB donor CU determines the first QoS information and the signaling type.

In this embodiment of this application, to implement information transmission in an inter-network topology scenario of data, the first IAB donor CU needs to send the first QoS information and/or the signaling type of the signaling to the second IAB donor CU. A method procedure shown in FIG. 8 further includes: S820: The first IAB donor CU sends a first message to the second IAB donor CU. The first message includes the first QoS information and/or indication information of the signaling type.

In correspondence to the possibility 1 to the possibility 3, S820 includes the following three possibilities.

Possibility 1: The first IAB donor CU sends the first message to the second IAB donor CU. The first message includes the first QoS information.

Possibility 2: The first IAB donor CU sends the first message to the second IAB donor CU. The first message includes the indication information of the signaling type.

Possibility 3: The first IAB donor CU sends the first message to the second IAB donor CU. The first message includes the first QoS information and/or the indication information of the signaling type.

Further, transmission modes of the data and/or the signaling in the first network topology and the second network topology need to be determined in the following manners. Manner 1:

Specifically, the first IAB donor CU determines transmission of the data in the first network topology based on the second QoS information; and/or the first IAB donor CU determines transmission of the signaling in the first network topology based on the signaling type.

Transmission of the data and/or the signaling in the first network topology includes a routing (a routing path identified by a routing identifier) and a bearer mapping (a transmission channel that is identified by a BH RLC CH and that is of the bearer mapping).

The first message further includes a first routing identifier and/or a first BH RLC CH identifier. The first routing identifier identifies a first path for transmission of the data between the first node and the second node. The first BH RLC CH identifier identifies a first BH RLC CH for transmission of the data between the first node and a child node of the first node.

In the manner 1, the first IAB donor CU determines the first routing identifier and/or first BH RLC CH information based on the second QoS information. The first BH RLC CH information includes the first BH RLC CH identifier.

Optionally, the first BH RLC CH information further includes QoS information of a first BH RLC CH. That is, the first message may further include the QoS information of the first BH RLC CH. The QoS information of the first BH RLC CH may be at least one type of the following information: the GBR, a 5G quality of service identifier (5G quality of service identifier, 5QI), or the packet delay budget (packet delay budget, PDB).

Optionally, the first message further includes GTP tunnel information. The GTP tunnel information identifies the data. The GTP tunnel information may be a GTP F-TEID (where for example, the GTP F-TEID includes a GTP TEID and an IP address), or the GTP tunnel information may be the GTP TEID.

Optionally, the first message further includes first indication information. The first indication information indicates that the first path and/or the first BH RLC CH are/is used for uplink transmission or downlink transmission. Alternatively, the first indication information indicates that the path identified by the first routing identifier and/or the BH RLC CH identified by the first BH RLC CH identifier are/is used for uplink transmission or downlink transmission. Alternatively, the first indication information indicates that the first routing identifier and/or the first BH RLC CH identifier each are/is an uplink transmission identifier or a downlink transmission identifier.

In the manner 1, the first IAB donor CU receives a second message from the second IAB donor CU. The second message includes a second routing identifier corresponding to the first routing identifier and/or a second BH RLC CH identifier corresponding to the first BH RLC CH identifier. The second routing identifier identifies a second path for transmission of the data and/or the signaling between the first node and the third node, and the second BH RLC CH identifier identifies a second BH RLC CH for transmission of the data and/or the signaling between the first node and a parent node of the first node.

Alternatively, it is understood that the first IAB donor CU receives the second message from the second IAB donor CU. The second message includes a first mapping relationship, and the first mapping relationship indicates that the second routing identifier corresponds to the first routing identifier; and/or the second message includes a second mapping relationship, and the second mapping relationship indicates that the second BH RLC CH identifier corresponds to the first BH RLC CH identifier.

Optionally, the second message may further include the first routing identifier, or identification information of the first routing identifier (for example, an index of the first routing identifier).

Optionally, the second message may further include the first BH RLC CH identifier, or identification information of the first BH RLC CH identifier (for example, an index of the first BH RLC CH identifier).

Optionally, the second message may further include second indication information, used to indicate that the second path and/or the second BH RLC CH are/is used for uplink transmission or downlink transmission. Alternatively, the second indication information indicates that the path identified by the second routing identifier and/or the BH RLC CH identified by the second BH RLC CH identifier are/is used for uplink transmission or downlink transmission. Alternatively, the second indication information indicates that the first mapping relationship and/or the second mapping relationship correspond/corresponds to uplink transmission or downlink transmission.

Manner 2:

The first IAB donor CU receives a second message from the second IAB donor CU. The second message includes a second routing identifier and/or a second BH RLC CH identifier.

Optionally, the second message further includes second indication information. The second indication information indicates that a second path and/or a second BH RLC CH are/is used for uplink transmission or downlink transmission. Alternatively, the second indication information indicates that the path identified by the second routing identifier and/or the BH RLC CH identified by the second BH RLC CH identifier are/is used for uplink transmission or downlink transmission. Alternatively, the second indication information indicates that the second routing identifier and/or the second BH RLC CH identifier each are/is an uplink transmission identifier or a downlink transmission identifier.

In a possible implementation, in the manner 2, the first IAB donor CU determines, based on the second QoS information and/or the signaling type and the received second routing identifier, a first routing identifier corresponding to the second routing identifier; and/or in the manner 2, the first IAB donor CU determines, based on the second QoS information and/or the signaling type and the received second BH RLC CH identifier, a first BH RLC CH identifier corresponding to the second BH RLC CH identifier.

In another possible implementation, in the manner 2, the first IAB donor CU determines, based on the second QoS information and/or the signaling type, a first routing identifier corresponding to the second routing identifier; and/or in the manner 2, the first IAB donor CU determines, based on the second QoS information and/or the signaling type, a first BH RLC CH identifier corresponding to the second BH RLC CH identifier.

It may be learned from the foregoing descriptions that, in the manner 1 and/or manner 2, the first IAB donor CU can learn of a first mapping relationship between the second routing identifier and the first routing identifier, and/or a second mapping relationship between the second BH RLC CH identifier and the first BH RLC CH identifier.

For example, the first IAB donor CU may notify the first node of the first mapping relationship and/or the second mapping relationship.

For example, the first IAB donor CU sends a third message to the first node. The third message includes the first routing identifier and the second routing identifier, and/or the first BH RLC CH identifier and the second BH RLC CH identifier.

Optionally, the third message further includes third indication information. The third indication information indicates that the first path and the second path are used for uplink transmission or downlink transmission, and/or indicates that the first BH RLC CH and the second BH RLC CH are used for uplink transmission or downlink transmission.

Alternatively, the third indication information indicates that the first mapping relationship and/or the second mapping relationship correspond/corresponds to uplink transmission or downlink transmission.

For example, after receiving the third message, the first node can determine, based on the first routing identifier and the second routing identifier, routing conversion between the transmission of the data/signaling in the first network topology managed by the first IAB donor CU and the transmission of the data/signaling in the second network topology managed by the second IAB donor CU; and/or can determine, based on the first BH RLC CH identifier and the second BH RLC CH identifier, bearer mapping conversion between the transmission of the data/signaling in the first network topology and the transmission of the data/signaling in the second network topology, to implement inter-network topology transmission of the data and/or the signaling.

For ease of understanding, user plane data transmission and signaling plane signaling transmission are separately described below with reference to specific embodiments.

1: The User Plane Data Transmission Includes the Following Possibilities.

Possibility 1: A second IAB donor CU determines a routing and/or bearer mapping in a data transmission process.

For example, FIG. 10 is a schematic flowchart of determining a routing mapping according to this application. The following steps are included.

S1010: A first IAB donor CU determines QoS_S information and QoS_T information based on QoS information.

Refer to the descriptions of determining the second QoS information and the first QoS information in S810. Details are not described herein again.

In the embodiment shown in FIG. 10, after the first IAB donor CU determines the QoS_S information and the QoS_T information, the first IAB donor CU may determine a first routing identifier based on the QoS_S information. A method procedure shown in FIG. 10 further includes the following step.

S1020: The first IAB donor CU determines the first routing identifier based on the QoS_S information.

Specifically, the first routing identifier identifies a first path for transmission of data between a first node and a second node.

For ease of differentiation, the first routing identifier may be referred to as Routing ID_S in the following descriptions.

In the embodiment shown in FIG. 10, the first IAB donor CU determines, based on the QoS_S information, a transmission path of the data between a boundary IAB node and an access IAB node, and determines the corresponding routing identifier Routing ID_S.

Routing ID_S is allocated by the first IAB donor CU, and may identify a transmission path between the boundary IAB node and the access IAB node.

Further, the first IAB donor CU may send a first message to the second IAB donor CU. The first message includes the QoS_T information and at least one of the following information: GTP tunnel information, Routing ID_S, or first indication information.

The method procedure shown in FIG. 10 further includes the following step.

S1030: The first IAB donor CU sends the first message to the second IAB donor CU.

Mutual reference may be made to content in S820.

In the embodiment shown in FIG. 10, the first message further includes Routing ID_S, or includes indication information of Routing ID_S (for example, an index of Routing ID_S).

For example, the first message further includes the GTP tunnel information. The GTP tunnel information may be a GTP F-TEID (where for example, the GTP F-TEID includes a GTP TEID and an IP address), or the GTP tunnel information may be the GTP TEID. The GTP tunnel information identifies the data.

For example, the first message further includes the first indication information. The first indication information indicates whether the path identified by Routing ID_S is used for UL routing or DL routing. In other words, the first indication information indicates whether Routing ID_S is an identifier of the UL routing or DL routing.

In a possible implementation, the first indication information explicitly indicates whether the path identified by Routing ID_S is used for UL routing or DL routing. For example, the first indication information is an indication of UL or DL. When the first indication information is UL, it indicates that the path identified by Routing ID_S is used for UL routing. When first indication information is DL, the path identified by Routing ID_S is used for DL routing.

In another possible implementation, the first indication information implicitly indicates whether the path identified by Routing ID_S is used for UL routing or DL routing. For example, the first indication information is an identifier or address information of a previous-hop node (for UL) or a next-hop node (for DL). In the embodiment shown in FIG. 10, after receiving the first message, the second IAB donor CU can determine, based on information carried in the first message, a second routing identifier corresponding to the first routing identifier. The embodiment shown in FIG. 10 further includes the following step.

S1040: The second IAB donor CU determines the second routing identifier corresponding to the first routing identifier.

The second IAB donor CU determines, based on the QoS_T information received from the first IAB donor CU, a transmission path of the data between a second IAB donor DU and the boundary IAB node, and determines a routing identifier Routing ID_T corresponding to Routing ID_S.

Routing ID_T is allocated by the second IAB donor CU, and may identify a transmission path between the second IAB donor DU and the boundary IAB node.

Optionally, values of Routing ID_T and Routing ID_S may be the same or different.

Further, the second IAB donor CU sends Routing ID_T corresponding to Routing ID_S to the first IAB donor CU. The embodiment shown in FIG. 10 further includes the following step.

S1050: The second IAB donor CU sends a second message to the first IAB donor CU.

The second message includes the second routing identifier corresponding to the first routing identifier.

For example, that the second IAB donor CU sends the second routing identifier corresponding to the first routing identifier to the first IAB donor CU may be understood as that the second IAB donor CU sends the second routing identifier and indication information of the first routing identifier to the first IAB donor CU, may be understood that the second IAB donor CU sends the first routing identifier and the second routing identifier to the first IAB donor CU, or may be understood that the second IAB donor CU sends a first mapping relationship to the first IAB donor CU. The first mapping relationship includes a mapping relationship between the first routing identifier and the second routing identifier. The second routing identifier corresponding to the first routing identifier can be determined based on the first mapping relationship.

Optionally, the second message further includes second indication information. The second indication information indicates whether a second path identified by Routing ID_T is used for UL or DL, or the second indication information indicates whether the first mapping relationship is used for UL or DL.

In a possible implementation, the second IAB donor CU may generate the following relationship table based on information (for example, the GTP tunnel information, the QoS_T information, or Routing ID_S) included in the first message sent by the first IAB donor CU. An example in which the QoS information is a delay is used for description, as shown in Table 1.

| GTP tunnel information (for example, GTP TEID) | QoS_T | Routing ID_S | Routing ID_T |
|---|---|---|---|
| 01 | 5 ms | 001 | 00a |
| 02 | 5 ms | 002 | 00a/00b |
| 03 | 2 ms | 001 | 00c |

That is, the second IAB donor CU may perform the following operations based on the QoS_T information and Routing ID_S that are received from the first IAB donor CU:

For different Routing ID_S and same QoS_T information, the second IAB donor CU allocates different Routing ID_T. To be specific, Routing ID_S and Routing ID_T are in a one-to-one mapping relationship. For example, Routing ID_S1 corresponds to Routing ID_T1, and Routing ID_S2 corresponds to Routing ID_T2.

For different Routing ID_S but same QoS_T information, the second IAB donor CU allocates same Routing ID_T. To be specific, Routing ID_S and Routing ID_T are in a many-to-one mapping relationship. For example, Routing ID_S1 corresponds to Routing ID_T1, and Routing ID_S2 corresponds to Routing ID_T1.

For same Routing ID_S but different QoS_T information, the second IAB donor CU allocates different Routing ID_T. To be specific, Routing ID_S and Routing ID_T are in a one-to-many mapping relationship. For example, Routing ID_S1 corresponds to Routing ID_T1, and Routing ID_S1 corresponds to Routing ID_T2.

Specifically, after the first IAB donor CU receives information carried in the second message, the first IAB donor CU may send the mapping relationship between Routing ID_S and Routing ID_T to the boundary IAB node, so that the boundary IAB node performs routing conversion processing between different network topologies based on the mapping relationship. The embodiment shown in FIG. 10 further includes the following step.

S1060: The first IAB donor CU sends a third message to the first node.

The third message includes the first routing identifier and the second routing identifier. Alternatively, the third message includes the first mapping relationship between the first routing identifier and the second routing identifier, and the first routing identifier and the second routing identifier can be determined based on the first mapping relationship.

Optionally, the third message further includes third indication information. The third indication information indicates that the first path and the second path are used for uplink transmission or downlink transmission, or the third indication information indicates whether the first mapping relationship is used for UL or DL.

Subsequently, an IAB node MT or IAB node DU of the boundary IAB node may determine, based on a correspondence between Routing ID_S and Routing ID_T, routing conversion between transmission of the data in the different network topologies.

In a possible implementation, steps S1050 and S1060 may not be performed, but the following operation is performed: The second IAB donor CU sends the first routing identifier and the second routing identifier to an MT of the first node by using an RRC message. Optionally, the MT of the first node may further send the first routing identifier and the second routing identifier to a DU of the first node in only one step.

FIG. 10 shows the procedure of determining the routing mapping. It should be understood that a bearer mapping further needs to be determined for determining transmission of data. Descriptions are provided below with reference to FIG. 11.

For example, FIG. 11 is a schematic flowchart of determining a bearer mapping according to this application. The following steps are included.

S1110: A first IAB donor CU determines QoS_S information and QoS_T information based on QoS information.

Refer to the descriptions of determining the second QoS information and the first QoS information in S810. Details are not described herein again.

In the embodiment shown in FIG. 11, after determining the QoS_S information and the QoS_T information, the first IAB donor CU may determine first BH RLC CH information based on the QoS_S information. A method procedure shown in FIG. 11 further includes the following step.

S1120: The first IAB donor CU determines the first BH RLC CH information based on the QoS_S information.

The first BH RLC CH information includes a first BH RLC CH identifier. Optionally, the first BH RLC CH information may further include QoS information of a first BH RLC CH.

The QoS information of the first BH RLC CH may be at least one type of the following information: a GBR, a 5G quality of service identifier (5G quality of service identifier, 5QI), or a packet delay budget (packet delay budget, PDB).

The first BH RLC CH identifier indicates a first BH RLC CH between a first node and a child node of the first node, and the first BH RLC CH is used for transmission of data between the first node and the child node of the first node. For DL transmission, the first BH RLC CH may be referred to as a first egress BH RLC CH. For UL transmission, the first BH RLC CH may be referred to as a first ingress BH RLC CH.

In the embodiment shown in FIG. 11, the first IAB donor CU determines, based on the QoS_S information, that the data is mapped to a first BH RLC CH between a boundary IAB node and a child node (for example, the IAB node#2 MT in FIG. 9) of the boundary IAB node for transmission.

Specifically, for DL, the first IAB donor CU determines that the boundary IAB node maps the data to the first egress BH RLC CH, to send the data to the child node of the boundary IAB node. For UL, the first IAB donor CU determines that the child node of the boundary IAB node maps the data to the first ingress BH RLC CH, to send the data to the boundary IAB node.

Further, the first IAB donor CU may send a first message to the second IAB donor CU. The first message includes the QoS_T information and at least one of the following information: GTP tunnel information, the first BH RLC CH identifier, or first indication information.

The method procedure shown in FIG. 11 further includes the following step.

S1130: The first IAB donor CU sends the first message to the second IAB donor CU.

Mutual reference may be made to content in S820.

In the embodiment shown in FIG. 11, the first message further includes the first BH RLC CH identifier, or includes indication information of the first BH RLC CH identifier (for example, an index of the first BH RLC CH identifier).

For example, the first message further includes the QoS information of the first BH RLC CH.

For example, the first message further includes the GTP tunnel information.

For example, the first message further includes the first indication information. The first indication information indicates whether the first BH RLC CH is used for a UL bearer mapping or a DL bearer mapping, or the first indication information indicates whether the first BH RLC CH identifier corresponds to the UL bearer mapping or the DL bearer mapping.

In a possible implementation, the first indication information explicitly indicates whether the first BH RLC CH is used for the UL bearer mapping or the DL bearer mapping. For example, the first indication information is an indication of UL or DL. If the first indication information is set to UL, the first BH RLC CH is the first ingress BH RLC CH. If the first indication information is set to DL, the first BH RLC CH is the first egress BH RLC CH.

In another possible implementation, the first indication information implicitly indicates whether the first BH RLC CH is used for the UL bearer mapping or the DL bearer mapping. For example, the first indication information is an identifier or address information of a previous-hop node (for UL) or a next-hop node (for DL).

In this embodiment, after receiving the first message, the second IAB donor CU can determine, based on information carried in the first message, a second BH RLC CH identifier corresponding to the first BH RLC CH identifier. The embodiment shown in FIG. 11 further includes the following step.

S1140: The second IAB donor CU determines the second BH RLC CH identifier corresponding to the first BH RLC CH identifier.

The second IAB donor CU determines, based on the QoS_T information received from the first IAB donor CU, that the data is mapped to a second BH RLC CH between the boundary IAB node and a parent node of the boundary IAB node for transmission.

Specifically, for DL, the second IAB donor CU determines that the parent node of the boundary IAB node maps the data to a second ingress BH RLC CH, to send the data to the boundary node. For UL, the second IAB donor CU determines that the boundary IAB node maps the data to a second egress BH RLC CH, to send the data to the parent node of the boundary IAB node.

It may be understood that the second IAB donor CU determines that a first egress BH RLC CH ID received from the first IAB donor CU corresponds to a second ingress BH RLC CH ID (for DL), and/or determines that a first ingress BH RLC CH ID received from the first IAB donor CU corresponds to a second egress BH RLC CH ID (for UL).

Optionally, values of the first egress BH RLC CH ID and the second ingress BH RLC CH ID may be the same or different.

Optionally, values of the first ingress BH RLC CH ID and the second egress BH RLC CH ID may be the same or different.

The second BH RLC CH identifier is allocated by the second IAB donor CU, and may identify a channel between the parent node of the boundary IAB node and the boundary IAB node.

Further, the second IAB donor CU sends the second BH RLC CH identifier corresponding to the first BH RLC CH identifier to the first IAB donor CU. The embodiment shown in FIG. 11 further includes the following step.

S1150: The second IAB donor CU sends a second message to the first IAB donor CU.

The second message includes the second BH RLC CH identifier corresponding to the first BH RLC CH identifier.

For example, the second IAB donor CU sends the determined ingress BH RLC CH ID and egress BH RLC CH ID to the first IAB donor CU. In this way, the first IAB donor CU sends the ingress BH RLC CH ID and the egress BH RLC CH ID to the boundary IAB node, so that the boundary IAB node performs bearer mapping conversion processing between different network topologies based on the mapping relationship.

For example, that the second IAB donor CU sends the second BH RLC CH identifier corresponding to the first BH RLC CH identifier to the first IAB donor CU may be understood as that the second IAB donor CU sends the second BH RLC CH identifier and indication information of the first BH RLC CH identifier to the first IAB donor CU, may be understood that the second IAB donor CU sends the first BH RLC CH identifier and the second BH RLC CH identifier to the first IAB donor CU, or may be understood that the second IAB donor CU sends a second mapping relationship to the first IAB donor CU. The second mapping relationship includes a mapping relationship between the first BH RLC CH identifier and the second BH RLC CH identifier. The second BH RLC CH identifier corresponding to the first BH RLC CH identifier can be determined based on the second mapping relationship.

Optionally, the second message further includes second indication information. The second indication information indicates that the second BH RLC CH (or the second mapping relationship) is used for an uplink bearer mapping or a downlink bearer mapping.

In a possible implementation, the second IAB donor CU may generate the following relationship table based on information (for example, the GTP tunnel information, the QoS_T information, or the first BH RLC CH information) included in the first message sent by the first IAB donor CU. An example in which the QoS information is a delay is used for description, as shown in Table 2.

| GTP tunnel information (for example, GTP TEID) | QoS_T | First BH RLC CH identifier | Second BH RLC CH identifier |
|---|---|---|---|
| 01 | 5 ms | 001 | 00a |
| 02 | 5 ms | 002 | 00a/00b |
| 03 | 2 ms | 001 | 00c |

That is, the second IAB donor CU may perform the following operations based on the QoS_T information and the first BH RLC CH information that are received from the first IAB donor CU:

For different first BH RLC CH identifiers and same QoS_T information, the second IAB donor CU allocates different second BH RLC CH identifiers. To be specific, the first BH RLC CH identifier and the second BH RLC CH identifier are in a one-to-one mapping relationship. For example, a first BH RLC CH identifier #1 corresponds to a second BH RLC CH identifier #1, and a first BH RLC CH identifier #2 corresponds to a second BH RLC CH identifier #2.

For different first BH RLC CH identifiers but same QoS_T information, the second IAB donor CU allocates a same second BH RLC CH identifier. To be specific, the first BH RLC CH identifier and the second BH RLC CH identifier are in a many-to-one mapping relationship. For example, a first BH RLC CH identifier #1 corresponds to a second BH RLC CH identifier #1, and a first BH RLC CH identifier #2 corresponds to the second BH RLC CH identifier #1.

For a same first BH RLC CH identifier but different QoS_T information, the second IAB donor CU allocates different second BH RLC CH identifiers. To be specific, the first BH RLC CH identifier and the second BH RLC CH identifier are in a one-to-many mapping relationship. For example, a first BH RLC CH identifier #1 corresponds to a second BH RLC CH identifier #1, and the first BH RLC CH identifier #1 corresponds to a second BH RLC CH identifier #2.

Specifically, after the first IAB donor CU receives information carried in the second message, the first IAB donor CU may send the mapping relationship between the first BH RLC CH identifier and the second BH RLC CH identifier to the boundary IAB node, so that the boundary IAB node performs bearer conversion processing between the different network topologies based on the mapping relationship. The embodiment shown in FIG. 11 further includes the following step.

S1160: The first IAB donor CU sends a third message to the first node.

The third message includes the first BH RLC CH identifier and the second BH RLC CH identifier.

Alternatively, the third message includes the second mapping relationship between the first BH RLC CH identifier and the second BH RLC CH identifier, and the first BH RLC CH identifier and the second BH RLC CH identifier can be determined based on the second mapping relationship.

Optionally, the third message further includes third indication information. The third indication information indicates that the first BH RLC CH identifier and the second BH RLC CH identifier (or the second mapping relationship) are used for the uplink bearer mapping or the downlink bearer mapping.

Subsequently, an IAB node MT or IAB node DU of the boundary IAB node may determine, based on a correspondence between the first BH RLC CH identifier and the second BH RLC CH identifier, bearer mapping conversion between transmission of the data in the different network topologies.

In a possible implementation, steps S1150 and S1160 may not be performed, but the following operation is performed: The second IAB donor CU sends the first BH RLC CH identifier and the second BH RLC CH identifier to an MT of the first node by using an RRC message. Optionally, the MT of the first node may further send the first BH RLC CH identifier and the second BH RLC CH identifier to a DU of the first node.

Possibility 2: A first IAB donor CU determines a routing and/or bearer mapping on a data transmission path.

For example, FIG. 12 is another schematic flowchart of determining a routing mapping according to this application. The following steps are included.

S1210: A first IAB donor CU determines QoS_S information and QoS_T information based on QoS information.

Refer to the descriptions of determining the second QoS information and the first QoS information in S810. Details are not described herein again.

In the embodiment shown in FIG. 12, after determining the QoS_S information and the QoS_T information, the first IAB donor CU may send a first message to a second IAB donor CU. The first message includes the QoS_T information.

A method procedure shown in FIG. 12 further includes the following step.

S1220: The first IAB donor CU sends the first message to the second IAB donor CU.

Mutual reference may be made to descriptions in S820.

In the embodiment shown in FIG. 12, the first message further includes GTP tunnel information.

In this embodiment, after receiving the first message, the second IAB donor CU can determine a second routing identifier based on information carried in the first message. The embodiment shown in FIG. 12 further includes the following step.

S1230: The second IAB donor CU determines the second routing identifier.

The second IAB donor CU determines, based on the QoS_T information received from the first IAB donor CU, a transmission path of data between a second IAB donor DU and a boundary IAB node, and determines a routing identifier Routing ID_T.

Routing ID_T is allocated by the second IAB donor CU, and may identify a transmission path between the second IAB donor DU and the boundary IAB node.

Further, the second IAB donor CU sends Routing ID_T to the first IAB donor CU. The embodiment shown in FIG. 12 further includes the following step.

S1240: The second IAB donor CU sends a second message to the first IAB donor CU.

The second message includes the second routing identifier.

For example, the second message further includes second indication information. The second indication information indicates whether the path identified by Routing ID_S is used for UL routing or DL routing, or the second indication information indicates whether Routing ID_S is an identifier of the UL routing or DL routing.

In a possible implementation, the second indication information explicitly indicates whether the path identified by Routing ID_T is used for the UL routing or the DL routing. For example, the second indication information is an indication of UL or DL.

In another possible implementation, the second indication information implicitly indicates whether the path identified by Routing ID_T is used for the UL routing or the DL routing. For example, the second indication information is an identifier or address information of a previous-hop node (for UL) or a next-hop node (for DL).

Further, after receiving the second message, the first IAB donor CU can determine, based on second QoS information, a first routing identifier corresponding to the second routing identifier. The embodiment shown in FIG. 12 further includes the following step.

S1250: The first IAB donor CU determines the first routing identifier corresponding to the second routing identifier.

In this solution, the first IAB donor CU determines, based on the QoS_S information and the second routing identifier, a transmission path of the data between the boundary IAB node and an access IAB node, and determines a routing identifier Routing ID_S corresponding to Routing ID_T.

Routing ID_S is allocated by the first IAB donor CU, and may identify a transmission path between the boundary IAB node and the access IAB node.

Alternatively, in this solution, the first IAB donor CU determines, based on the QoS_S information, the transmission path of the data between the boundary IAB node and the access IAB node, that is, determines the routing identifier Routing ID_S. Then, the routing identifier Routing ID_S corresponding to Routing ID_T is determined based on the second routing identifier. Routing ID_S is allocated by the first IAB donor CU, and may identify a transmission path between the boundary IAB node and the access IAB node. That the first IAB donor CU determines the routing identifier Routing ID_S based on the QoS_S information may be performed in S1210, or may be performed in S1250. This is not limited in this embodiment.

Optionally, values of Routing ID_T and Routing ID_S may be the same or different.

In a possible implementation, the first IAB donor CU may generate the following relationship table based on information (for example, Routing ID_T) included in the second message sent by the second IAB donor CU. An example in which the QoS information is a delay is used for description, as shown in Table 3.

| GTP tunnel information (for example, GTP TEID) | QoS_S | Routing ID_S | Routing ID_T |
|---|---|---|---|
| 01 | 5 ms | 00a | 001 |
| 02 | 5 ms | 00a/00b | 002 |
| 03 | 2 ms | 00c | 001 |

That is, the first IAB donor CU may perform the following operations based on Routing ID_T received from the second IAB donor CU.

For different Routing ID_T and same QoS_S information, the first IAB donor CU allocates different Routing ID_S. To be specific, Routing ID_T and Routing ID_S are in a one-to-one mapping relationship. For example, Routing ID_T#1 corresponds to Routing ID_S#1, and Routing ID_T#2 corresponds to Routing ID_S#2.

For different Routing ID_T but same QoS_S information, the first IAB donor CU allocates same Routing ID_S. To be specific, Routing ID_T and Routing ID_S are in a many-to-one mapping relationship. For example, Routing ID_T#1 corresponds to Routing ID_S#1, and Routing ID_T#2 corresponds to Routing ID_S#1.

For same Routing ID_T but different QoS_S information, the first IAB donor CU allocates different Routing ID_S. To be specific, Routing ID_T and Routing ID_S are in a one-to-many mapping relationship. For example, Routing ID_T#1 corresponds to Routing ID_S#1, and Routing ID_T#1 corresponds to Routing ID_S#2.

Specifically, after the first IAB donor CU generates the first routing identifier corresponding to the second routing identifier, the first IAB donor CU may send the mapping relationship between Routing ID_S and Routing ID_T to the boundary IAB node, so that the boundary IAB node performs routing conversion processing between different network topologies based on the mapping relationship. The embodiment shown in FIG. 12 further includes the following step.

S1260: The first IAB donor CU sends a third message to a first node.

Mutual reference may be made to content in S1060.

Subsequently, an IAB node MT of the boundary IAB node may determine, based on a correspondence between Routing ID_S and Routing ID_T, routing conversion between transmission of the data in the different network topologies.

For example, FIG. 13 is another schematic flowchart of determining a bearer mapping according to this application. The following steps are included.

S1310: A first IAB donor CU determines QoS_S information and QoS_T information based on QoS information.

Refer to the descriptions of determining the second QoS information and the first QoS information in S810. Details are not described herein again. Mutual reference may be made between S1310 and S810.

In the embodiment shown in FIG. 13, after determining the QoS_S information and the QoS_T information, the first IAB donor CU may send a first message to a second IAB donor CU. The first message includes the QoS_T information.

A method procedure shown in FIG. 13 further includes the following step.

S1320: The first IAB donor CU sends the first message to the second IAB donor CU.

Mutual reference may be made to content in S1220. Details are not described herein again.

In the embodiment shown in FIG. 13, after receiving the first message, the second IAB donor CU can determine second BH RLC CH information based on information carried in the first message. The embodiment shown in FIG. 13 further includes the following step.

S1330: The second IAB donor CU determines the second BH RLC CH information.

The second BH RLC CH information may include a second BH RLC CH identifier, or may include the second BH RLC CH ID and QoS information of a second BH RLC CH.

The QoS information of the second BH RLC CH may be at least one type of information: a GBR, a 5QI, or a PDB.

The second IAB donor CU determines, based on the QoS_T information received from the first IAB donor CU, that data is mapped to a second BH RLC CH between a boundary IAB node and a parent node of the boundary IAB node for transmission.

Specifically, for DL, the second IAB donor CU determines that the parent node of the boundary IAB node maps the data to a second ingress BH RLC CH, to send the data to the boundary node. For UL, the second IAB donor CU determines that the boundary IAB node maps the data to a second egress BH RLC CH, to send the data to the parent node of the boundary IAB node.

The second BH RLC CH identifier is allocated by the second IAB donor CU, and may identify a channel between the parent node of the boundary IAB node and the boundary IAB node.

Further, the second IAB donor CU sends the second BH RLC CH information to the first IAB donor CU. The embodiment shown in FIG. 13 further includes the following step.

S1340: The second IAB donor CU sends a second message to the first IAB donor CU.

The second message includes the second BH RLC CH identifier, and the second BH RLC CH identifier corresponds to GTP tunnel information.

Optionally, the second message may further include the QoS information of the second BH RLC CH.

Optionally, the second message further includes second indication information. The second indication information indicates that the second BH RLC CH information corresponds to an uplink bearer mapping or a downlink bearer mapping.

In a possible implementation, the second indication information explicitly indicates whether the second BH RLC CH information is used for the UL bearer mapping or the DL bearer mapping. For example, the second indication information is an indication of UL or DL. If the second indication information is set to UL, the first BH RLC CH is a first ingress BH RLC CH. If the second indication information is set to DL, the first BH RLC CH is a first egress BH RLC CH.

In another possible implementation, the second indication information implicitly indicates whether the second BH RLC CH information is used for the UL bearer mapping or the DL bearer mapping. For example, the second indication information is an identifier or address information of a previous-hop node (for UL) or a next-hop node (for DL).

Further, after receiving the second message, the first IAB donor CU can determine, based on second QoS information and the second BH RLC CH identifier, a first BH RLC CH identifier corresponding to the second BH RLC CH identifier. Alternatively, after receiving the second message, the first IAB donor CU can determine, based on the second QoS information, the first BH RLC CH identifier corresponding to the second BH RLC CH identifier. The embodiment shown in FIG. 13 further includes the following step.

S1350: The first IAB donor CU determines the first BH RLC CH identifier corresponding to the second BH RLC CH identifier.

In the embodiment shown in FIG. 13, the first IAB donor CU determines, based on QoS_S information of a UE service, that the data is mapped to a first BH RLC CH between the boundary IAB node and a child node (for example, the IAB node#2 MT in FIG. 9) of the boundary IAB node for transmission.

Specifically, for DL, the first IAB donor CU determines that the boundary IAB node maps the data to the first egress BH RLC CH, to send the data to the child node of the boundary IAB node. For UL, the first IAB donor CU determines that the child node of the boundary IAB node maps the data to the first ingress BH RLC CH, to send the data to the boundary IAB node.

It may be understood that the first IAB donor CU determines that a second ingress BH RLC CH ID received from the second IAB donor CU corresponds to a first egress BH RLC CH ID (for DL), and/or determines that the first egress BH RLC CH ID received from the second IAB donor CU corresponds to the second ingress BH RLC CH ID (for UL).

Optionally, values of the first egress BH RLC CH ID and the second ingress BH RLC CH ID may be the same or different.

Optionally, values of the first ingress BH RLC CH ID and the second egress BH RLC CH ID may be the same or different.

A first BH RLC CH is allocated by the first IAB donor CU, and may identify a transmission path between the child node of the boundary IAB node and the boundary IAB node.

In a possible implementation, the first IAB donor CU may generate the following relationship table based on information (for example, the second BH RLC CH identifier) included in the second message sent by the second IAB donor CU. An example in which the QoS information is a delay is used for description, as shown in Table 4.

| GTP tunnel information (for example, GTP TEID) | QoS_T | First BH RLC CH identifier | Second BH RLC CH identifier |
|---|---|---|---|
| 01 | 5 ms | 00a | 001 |
| 02 | 5 ms | 00a/00b | 002 |
| 03 | 2 ms | 00c | 001 |

That is, the first IAB donor CU may perform the following operations based on the second BH RLC CH information received from the second IAB donor CU.

For different second BH RLC CH identifiers and same QoS_S information, the first IAB donor CU allocates different first BH RLC CH identifiers. To be specific, the second BH RLC CH identifier and the first BH RLC CH identifier are in a one-to-one mapping relationship. For example, a second BH RLC CH identifier #1 corresponds to a first BH RLC CH identifier #1, and a second BH RLC CH identifier #2 corresponds to a first BH RLC CH identifier #2.

For different second BH RLC CH identifiers but same QoS_S information, the first IAB donor CU allocates a same first BH RLC CH identifier. To be specific, the second BH RLC CH identifier and the first BH RLC CH identifier are in a many-to-one mapping relationship. For example, a second BH RLC CH identifier #1 corresponds to a first BH RLC CH identifier #1, and a second BH RLC CH identifier #2 corresponds to the first BH RLC CH identifier #1.

For a same second BH RLC CH identifier but different QoS_S information, the first IAB donor CU allocates different first BH RLC CH identifiers. To be specific, the second BH RLC CH identifier and the first BH RLC CH identifier are in a one-to-many mapping relationship. For example, a second BH RLC CH identifier #1 corresponds to a first BH RLC CH identifier #1, and the second BH RLC CH identifier #1 corresponds to a first BH RLC CH identifier #2.

Specifically, after the first IAB donor CU generates the first BH RLC CH identifier corresponding to the second BH RLC CH identifier, the first IAB donor CU may send the mapping relationship between the first BH RLC CH identifier and the second BH RLC CH identifier to the boundary IAB node, so that the boundary IAB node performs channel conversion processing between different network topologies based on the mapping relationship. The embodiment shown in FIG. 13 further includes the following step.

S1360: The first IAB donor CU sends a third message to a first node.

Mutual reference may be made between descriptions in S1360 and S1160. Details are not described herein again.

Subsequently, an IAB node MT or IAB node DU of the boundary IAB node may determine, based on a correspondence between the first BH RLC CH identifier and the second BH RLC CH identifier, bearer mapping conversion between transmission of the data in the different network topologies.

2. Signaling Transmission on the Signaling Plane.

Different from the user plane transmission, signaling plane transmission includes the following signaling types: a terminal device—associated (UE-associated) F1 application layer protocol (F1 application layer protocol, F1AP) message and a non-terminal device associated (non-UE associated) F1AP message. Optionally, the signaling plane transmission may further include a signaling type: a non-F1 message (non-F1).

The signaling transmission on the signaling plane includes the following several possibilities.

Possibility 1: A second IAB donor CU determines a routing and/or bearer mapping on a signaling transmission path.

For example, FIG. 14 is still another schematic flowchart of determining a routing mapping according to this application. The following steps are included.

S1410: A first IAB donor CU determines a first routing identifier based on a signaling type.

Specifically, the first routing identifier identifies a first path for transmission of signaling between a first node and a second node.

For example, the first routing identifier may be referred to as Routing ID_S.

In the embodiment shown in FIG. 14, the first IAB donor CU determines, based on the signaling type, a transmission path of the signaling between a boundary IAB node and an access IAB node, and determines a corresponding routing identifier Routing ID_S. Routing ID_S is allocated by the first IAB donor CU, and may identify a transmission path between the boundary IAB node and the access IAB node.

Further, the first IAB donor CU may send a first message to a second IAB donor CU. The first message includes indication information of the signaling type and at least one of the following information: Routing ID_S or first indication information.

The indication information of the signaling type indicates a type of the signaling, and Routing ID_S is a routing identifier corresponding to the transmission of the signaling in a network topology managed by the first IAB donor CU. A method procedure shown in FIG. 14 further includes the following step.

S1420: The first IAB donor CU sends the first message to the second IAB donor CU.

Mutual reference may be made between S1420 and S820.

In the embodiment shown in FIG. 14, the first message further includes Routing ID_S, or includes indication information of Routing ID_S (for example, an index of Routing ID_S).

For example, in this embodiment, the first message further includes first indication information. The first indication information indicates whether Routing ID_S is used for UL routing or DL routing.

In a possible implementation, the first indication information explicitly indicates whether the path identified by Routing ID_S is used for the UL routing or the DL routing. For example, the first indication information is an indication of UL or DL. When the first indication information is UL, it indicates that the path identified by Routing ID_S is used for the UL routing. When first indication information is DL, the path identified by Routing ID_S is used for the DL routing.

In another possible implementation, the first indication information implicitly indicates whether the path identified by Routing ID_S is used for the UL routing or the DL routing. For example, the first indication information is an identifier or address information of a previous-hop node (for UL) or a next-hop node (for DL).

In this embodiment, after receiving the first message, the second IAB donor CU can determine, based on information carried in the first message, a second routing identifier corresponding to the first routing identifier. The embodiment shown in FIG. 14 further includes the following step.

S1430: The second IAB donor CU determines the second routing identifier corresponding to the first routing identifier.

The second IAB donor CU determines, based on the indication information of the signaling type received from the first IAB donor CU, a transmission path of the signaling between a second IAB donor DU and the boundary IAB node, and determines a routing identifier Routing ID_T corresponding to Routing ID_S.

Alternatively, the second IAB donor CU determines, based on the indication information of the signaling type and Routing ID_S that are received from the first IAB donor CU, a transmission path of the signaling between a second IAB donor DU and the boundary IAB node, and determines a routing identifier Routing ID_T corresponding to Routing ID_S.

Routing ID_T is allocated by the second IAB donor CU, and may identify a transmission path between the second IAB donor DU and the boundary IAB node.

Optionally, values of Routing ID_T and Routing ID_S may be the same or different.

Further, the second IAB donor CU sends Routing ID_T corresponding to Routing ID_S to the first IAB donor CU. The embodiment shown in FIG. 14 further includes the following step.

S1440: The second IAB donor CU sends a second message to the first IAB donor CU.

Mutual reference may be made between content in S1440 and S1040. Details are not described herein again.

In a possible implementation, the second IAB donor CU may perform the following operations based on the indication information of the signaling type and Routing ID_S that are received from the first IAB donor CU.

For different Routing ID_S and a same signaling type, the second IAB donor CU allocates different Routing ID_T. To be specific, Routing ID_S and Routing ID_T are in a one-to-one mapping relationship. For example, Routing ID_S#1 corresponds to Routing ID_T#1, and Routing ID_S#2 corresponds to Routing ID_T#2.

For different Routing ID_S but a same signaling type, the second IAB donor CU allocates same Routing ID_T. To be specific, Routing ID_S and Routing ID_T are in a many-to-one mapping relationship. For example, Routing ID_S#1 corresponds to Routing ID_T#1, and Routing ID_S#2 corresponds to Routing ID_T#1.

For same Routing ID_S but different signaling types, the second IAB donor CU allocates different Routing ID_T. To be specific, Routing ID_S and Routing ID_T are in a one-to-many mapping relationship. For example, Routing ID_S#1 corresponds to Routing ID_T#1, and Routing ID_S#1 corresponds to Routing ID_T#2.

Specifically, after the first IAB donor CU receives information carried in the second message, the first IAB donor CU may send the mapping relationship between Routing ID_S and Routing ID_T to the boundary IAB node, so that the boundary IAB node performs routing conversion processing between different network topologies based on the mapping relationship. The embodiment shown in FIG. 14 further includes the following step.

S1450: The first IAB donor CU sends a third message to the first node.

Mutual reference may be made to content in S1060. Details are not described herein again.

Subsequently, an IAB node MT of the boundary IAB node may determine, based on a correspondence between Routing ID_S and Routing ID_T, routing conversion between transmission of the signaling in the different network topologies.

In a possible implementation, steps S1440 and S1450 may not be performed, but the following operation is performed: The second IAB donor CU sends the first routing identifier and the second routing identifier to an MT of the first node by using an RRC message. Optionally, the MT of the first node may further send the first routing identifier and the second routing identifier to a DU of the first node.

FIG. 14 shows the procedure of determining the routing mapping. It should be understood that a bearer mapping further needs to be determined for determining transmission of signaling. Descriptions are provided below with reference to FIG. 15.

For example, FIG. 15 is still another schematic flowchart of determining a bearer mapping according to this application. The following steps are included.

S1510: A first IAB donor determines first BH RLC CH information based on a signaling type.

The first BH RLC CH information includes a first BH RLC CH identifier. Optionally, the first BH RLC CH information may further include QoS information of a first BH RLC CH.

The first BH RLC CH identifier indicates a first BH RLC CH between a first node and a child node of the first node, and the first BH RLC CH is used for transmission of service signaling of a terminal device between the first node and the child node of the first node. For DL transmission, the first BH RLC CH may be referred to as a first egress BH RLC CH. For UL transmission, the first BH RLC CH may be referred to as a first ingress BH RLC CH.

In the embodiment shown in FIG. 15, the first IAB donor CU determines, based on the signaling type, that the signaling is mapped to a first BH RLC CH between a boundary IAB node and a child node (for example, the IAB node#2 MT in FIG. 9) of the boundary IAB node for transmission.

Specifically, for DL, the first IAB donor CU determines that the boundary IAB node maps the signaling to the first egress BH RLC CH, to send the signaling to the child node of the boundary IAB node. For UL, the first IAB donor CU determines that the child node of the boundary IAB node maps the signaling to the first ingress BH RLC CH, to send the signaling to the boundary IAB node.

Further, the first IAB donor CU may send a first message to the second IAB donor CU. The first message includes indication information of the signaling type and at least one of the following information: the first BH RLC CH information or second indication information.

A method procedure shown in FIG. 15 further includes the following step.

S1520: The first IAB donor CU sends the first message to the second IAB donor CU.

Mutual reference may be made to content in S820.

In the embodiment shown in FIG. 15, the first message further includes the first BH RLC CH identifier, or includes indication information of the first BH RLC CH identifier (for example, an index of the first BH RLC CH identifier).

For example, the first message further includes the QoS information of the first BH RLC CH.

For example, the first message further includes first indication information. The first indication information indicates whether the first BH RLC CH is used for a UL bearer mapping or a DL bearer mapping, or the first indication information indicates whether the first BH RLC CH information corresponds to the UL bearer mapping or the DL bearer mapping.

In a possible implementation, the first indication information explicitly indicates whether the first BH RLC CH is used for the UL bearer mapping or the DL bearer mapping. For example, the first indication information is an indication of UL or DL. If the first indication information is set to UL, the first BH RLC CH is the first ingress BH RLC CH. If the first indication information is set to DL, the first BH RLC CH is the first egress BH RLC CH.

In another possible implementation, the first indication information implicitly indicates whether Routing ID_S is used for the UL bearer mapping or the DL bearer mapping. For example, the first indication information is an identifier or address information of a previous-hop node (for UL) or a next-hop node (for DL).

In this embodiment, after receiving the first message, the second IAB donor CU can determine, based on information carried in the first message, a second BH RLC CH identifier corresponding to the first BH RLC CH identifier. The embodiment shown in FIG. 15 further includes the following step.

S1530: The second IAB donor CU determines the second BH RLC CH identifier corresponding to the first BH RLC CH identifier.

The second IAB donor CU determines, based on the indication information of the signaling type received from the first IAB donor CU, that the signaling is mapped to a second BH RLC CH between the boundary IAB node and a parent node of the boundary IAB node for transmission.

Specifically, for DL, the second IAB donor CU determines that the parent node of the boundary IAB node maps the signaling to a second ingress BH RLC CH, to send the signaling to the boundary node. For UL, the second IAB donor CU determines that the boundary IAB node maps the signaling to a second egress BH RLC CH, to send the signaling to the parent node of the boundary IAB node.

It may be understood that the second IAB donor CU determines that the first egress BH RLC CH ID received from the first IAB donor CU corresponds to the second ingress BH RLC CH ID (for DL), and/or determines that the first ingress BH RLC CH ID received from the first IAB donor CU corresponds to the second egress BH RLC CH ID (for UL).

Optionally, values of the first egress BH RLC CH ID and the second ingress BH RLC CH ID may be the same or different.

Optionally, values of the first ingress BH RLC CH ID and the second egress BH RLC CH ID may be the same or different.

The second BH RLC CH is allocated by the second IAB donor CU, and may identify a transmission path between the parent node of the boundary IAB node and the boundary IAB node.

Further, the second IAB donor CU sends second BH RLC CH information corresponding to the first BH RLC CH information to the first IAB donor CU. The embodiment shown in FIG. 15 further includes the following step.

S1540: The second IAB donor CU sends a second message to the first IAB donor CU.

Mutual reference may be made to content in S1150. Details are not described herein again.

In a possible implementation, the second IAB donor CU may perform the following operations based on the indication information of the signaling type and the first BH RLC CH information that are received from the first IAB donor CU.

For different first BH RLC CH identifier and a same signaling type, the second IAB donor CU allocates different second BH RLC CH identifiers. To be specific, the first BH RLC CH identifier and the second BH RLC CH identifier are in a one-to-one mapping relationship. For example, a first BH RLC CH identifier #1 corresponds to a second BH RLC CH identifier #1, and a first BH RLC CH identifier #2 corresponds to a second BH RLC CH identifier #2.

For different first BH RLC CH identifier but a same signaling type, the second IAB donor CU allocates a same second BH RLC CH identifier. To be specific, the first BH RLC CH identifier and the second BH RLC CH identifier are in a many-to-one mapping relationship. For example, a first BH RLC CH identifier #1 corresponds to a second BH RLC CH identifier #1, and a first BH RLC CH identifier #2 corresponds to the second BH RLC CH identifier #1.

For a same first BH RLC CH identifier but different signaling types, the second IAB donor CU allocates different second BH RLC CH identifiers. To be specific, the first BH RLC CH identifier and the second BH RLC CH identifier are in a one-to-many mapping relationship. For example, a first BH RLC CH identifier #1 corresponds to a second BH RLC CH identifier #1, and the first BH RLC CH identifier #1 corresponds to a second BH RLC CH identifier #2.

Specifically, after the first IAB donor CU receives an identifier carried in the second message, the first IAB donor CU may send the mapping relationship between the first BH RLC CH identifier and the second BH RLC CH identifier to the boundary IAB node, so that the boundary IAB node performs routing conversion processing between the different network topologies based on the mapping relationship. The embodiment shown in FIG. 15 further includes the following step.

S1550: The first IAB donor CU sends a third message to the first node.

Mutual reference may be made to content in S1160. Details are not described herein again.

Subsequently, an IAB node MT or IAB node DU of the boundary IAB node may determine, based on a correspondence between the first BH RLC CH identifier and the second BH RLC CH identifier, bearer mapping conversion between transmission of the signaling in the different network topologies.

In a possible implementation, steps S1540 and S1550 may not be performed, but the following operation is performed: The second IAB donor CU sends the second BH RLC CH identifier corresponding to the first BH RLC CH identifier to an MT of the first node by using an RRC message. Optionally, the MT of the first node may further send the second BH RLC CH identifier corresponding to the first BH RLC CH identifier to a DU of the first node.

Possibility 2: A first IAB donor CU determines a routing and/or bearer mapping on a signaling transmission path.

For example, FIG. 16 is still another schematic flowchart of determining a routing mapping according to this application. The following steps are included.

S1610: A first IAB donor CU sends a first message to a second IAB donor CU.

Mutual reference may be made to content in S820.

The first message includes indication information of a signaling type.

In this embodiment, after receiving the first message, the second IAB donor CU can determine a second routing identifier based on information carried in the first message. The embodiment shown in FIG. 16 further includes the following step.

S1620: The second IAB donor CU determines the second routing identifier.

The second IAB donor CU determines, based on the indication information of the signaling type received from the first IAB donor CU, a transmission path of signaling between a second IAB donor DU and a boundary IAB node, and determines a routing identifier Routing ID_T.

Routing ID_T is allocated by the second IAB donor CU, and may identify a transmission path between the second IAB donor DU and the boundary IAB node.

Further, the second IAB donor CU sends Routing ID_T to the first IAB donor CU. The embodiment shown in FIG. 16 further includes the following step.

S1630: The second IAB donor CU sends a second message to the first IAB donor CU.

Mutual reference may be made to content in S1240. Details are not described herein again.

Further, after receiving the second message, the first IAB donor CU can determine, based on the signaling type, a first routing identifier corresponding to the second routing identifier, or can determine, based on the signaling type and the second routing identifier, the first routing identifier corresponding to the second routing identifier. The embodiment shown in FIG. 16 further includes the following step.

S1640: The first IAB donor CU determines the first routing identifier corresponding to the second routing identifier.

In this solution, the first IAB donor CU determines, based on the indication information of the signaling type, a transmission path of the signaling between the boundary IAB node and an access IAB node, and determines a routing identifier Routing ID_S corresponding to Routing ID_T. Routing ID_S is allocated by the first IAB donor CU, and may identify a transmission path between the boundary IAB node and the access IAB node.

Alternatively, in this solution, the first IAB donor CU determines, based on the indication information of the signaling type, a transmission path of the signaling between the boundary IAB node and an access IAB node, that is, determine Routing ID_S.

Then, the routing identifier Routing ID_S corresponding to Routing ID_T is determined based on the second routing identifier. Routing ID_S is allocated by the first IAB donor CU, and may identify a transmission path between the boundary IAB node and the access IAB node.

Optionally, values of Routing ID_T and Routing ID_S may be the same or different.

In a possible implementation, the first IAB donor CU may perform the following operations based on Routing ID_T received from the second IAB donor CU.

For different Routing ID_T and a same signaling type, the first IAB donor CU allocates different Routing ID_S. To be specific, Routing ID_T and Routing ID_S are in a one-to-one mapping relationship. For example, Routing ID_T#1 corresponds to Routing ID_S#1, and Routing ID_T#2 corresponds to Routing ID_S#2.

For different Routing ID_T but a same signaling type, the first IAB donor CU allocates same Routing ID_S. To be specific, Routing ID_T and Routing ID_S are in a many-to-one mapping relationship. For example, Routing ID_T#1 corresponds to Routing ID_S#1, and Routing ID_T#2 corresponds to Routing ID_S#1.

For same Routing ID_T but different signaling types, the first IAB donor CU allocates different Routing ID_S. To be specific, Routing ID_T and Routing ID_S are in a one-to-many mapping relationship. For example, Routing ID_T#1 corresponds to Routing ID_S#1, and Routing ID_T#1 corresponds to Routing ID_S#2.

Specifically, after the first IAB donor CU generates the first routing identifier corresponding to the second routing identifier, the first IAB donor CU may send the mapping relationship between Routing ID_S and Routing ID_T to the boundary IAB node, so that the boundary IAB node performs routing conversion processing between different network topologies based on the mapping relationship. The embodiment shown in FIG. 16 further includes the following step.

S1650: The first IAB donor CU sends a third message to a first node.

Mutual reference may be made to content in S1060. Details are not described herein again.

Subsequently, an IAB node MT or IAB node DU of the boundary IAB node may determine, based on a correspondence between Routing ID_S and Routing ID_T, routing conversion between transmission of the signaling in the different network topologies.

FIG. 16 shows the procedure of determining the routing mapping. It should be understood that a bearer mapping further needs to be determined for determining transmission of signaling. Descriptions are provided below with reference to FIG. 17.

For example, FIG. 17 is still another schematic flowchart of determining a bearer mapping according to this application. The following steps are included.

S1710: A first IAB donor CU sends a first message to a second IAB donor CU.

Mutual reference may be made to content in S1610. Details are not described herein again.

In this embodiment, after receiving the first message, the second IAB donor CU can determine second BH RLC CH information based on information carried in the first message. The embodiment shown in FIG. 17 further includes the following step.

S1720: The second IAB donor CU determines the second BH RLC CH information.

The second BH RLC CH information may include a second BH RLC CH identifier, or may include the second BH RLC CH ID and QoS information of a second BH RLC CH.

The QoS information of the second BH RLC CH may be at least one type of information: a GBR, a 5QI, or a PDB.

The second IAB donor CU determines, based on indication information of a signaling type received from the first IAB donor CU, that signaling is mapped to a second BH RLC CH between a boundary IAB node and a parent node of the boundary IAB node for transmission.

Specifically, for DL, the second IAB donor CU determines that the parent node of the boundary IAB node maps the signaling to a second ingress BH RLC CH, to send the signaling to the boundary node. For UL, the second IAB donor CU determines that the boundary IAB node maps the signaling to a second egress BH RLC CH, to send the signaling to the parent node of the boundary IAB node.

The second BH RLC CH is allocated by the second IAB donor CU, and may identify a transmission channel between the parent node of the boundary IAB node and the boundary IAB node.

Further, the second IAB donor CU sends the second BH RLC CH information to the first IAB donor CU. The embodiment shown in FIG. 17 further includes the following step.

S1730: The second IAB donor CU sends a second message to the first IAB donor CU.

The second message includes the second BH RLC CH information.

The second BH RLC CH information may include the second BH RLC CH ID, or may include the second BH RLC CH ID and the QoS of the second BH RLC CH (for example, at least one type of information: the GBR, the 5QI, or the PDB).

Optionally, the second message further includes second indication information. The second indication information indicates that the second BH RLC CH information corresponds to an uplink bearer mapping or a downlink bearer mapping.

In a possible implementation, the second indication information explicitly indicates whether the second BH RLC CH is used for the UL bearer mapping or the DL bearer mapping. For example, the second indication information is an indication of UL or DL. If the second indication information is set to UL, the first BH RLC CH is a first ingress BH RLC CH. If the second indication information is set to DL, the first BH RLC CH is a first egress BH RLC CH.

In another possible implementation, the second indication information implicitly indicates whether the second BH RLC CH information is used for the UL bearer mapping or the DL bearer mapping. For example, the second indication information is an identifier or address information of a previous-hop node (for UL) or a next-hop node (for DL).

Further, after receiving the second message, the first IAB donor CU can determine, based on the signaling type, a first BH RLC CH identifier corresponding to the second BH RLC CH identifier, or can determine, based on the signaling type and the second BH RLC CH identifier, the first BH RLC CH identifier corresponding to the second BH RLC CH identifier. The embodiment shown in FIG. 17 further includes the following step.

S1740: The first IAB donor CU determines the first BH RLC CH identifier corresponding to the second BH RLC CH identifier.

In this solution, the first IAB donor CU determines, based on the indication information of the signaling type, that the signaling is mapped to a first BH RLC CH between the boundary IAB node and a child node (for example, the IAB node#2 MT in FIG. 9) of the boundary IAB node for transmission.

Specifically, for DL, the first IAB donor CU determines that the boundary IAB node maps the signaling to the first egress BH RLC CH, to send the signaling to the child node of the boundary IAB node. For UL, the first IAB donor CU determines that the child node of the boundary IAB node maps the signaling to the first ingress BH RLC CH, to send the signaling to the boundary IAB node.

It may be understood that the first IAB donor CU determines that a second ingress BH RLC CH ID received from the second IAB donor CU corresponds to a first egress BH RLC CH ID (for DL), and/or determines that the first egress BH RLC CH ID received from the second IAB donor CU corresponds to the second ingress BH RLC CH ID (for UL).

Optionally, values of the first egress BH RLC CH ID and the second ingress BH RLC CH ID may be the same or different.

Optionally, values of the first ingress BH RLC CH ID and the second egress BH RLC CH ID may be the same or different.

The first BH RLC CH is allocated by the first IAB donor CU, and may identify a transmission path between the child node of the boundary IAB node and the boundary IAB node.

In a possible implementation, the first IAB donor CU may perform the following operations based on the second BH RLC CH information received from the second IAB donor CU.

For different second BH RLC CH identifiers and a same signaling type, the first IAB donor CU allocates different first BH RLC CH identifiers. To be specific, the second BH RLC CH identifier and the first BH RLC CH identifier are in a one-to-one mapping relationship. For example, a second BH RLC CH identifier #1 corresponds to a first BH RLC CH identifier #1, and a second BH RLC CH identifier #2 corresponds to a first BH RLC CH identifier #2.

For different second BH RLC CH identifiers but a same signaling type, the first IAB donor CU allocates a same first BH RLC CH identifier. To be specific, the second BH RLC CH identifier and the first BH RLC CH identifier are in a many-to-one mapping relationship. For example, a second BH RLC CH identifier #1 corresponds to a first BH RLC CH identifier #1, and a second BH RLC CH identifier #2 corresponds to the first BH RLC CH identifier #1.

For a same second BH RLC CH identifier but different signaling types, the first IAB donor CU allocates different first BH RLC CH identifiers. To be specific, the second BH RLC CH identifier and the first BH RLC CH identifier are in a one-to-many mapping relationship. For example, a second BH RLC CH identifier #1 corresponds to a first BH RLC CH identifier #1, and the second BH RLC CH identifier #1 corresponds to a first BH RLC CH identifier #2.

Specifically, after the first IAB donor CU generates the first BH RLC CH identifier corresponding to the second BH RLC CH identifier, the first IAB donor CU may send the mapping relationship between the first BH RLC CH identifier and the second BH RLC CH identifier to the boundary IAB node, so that the boundary IAB node performs channel conversion processing between different network topologies based on the mapping relationship. The embodiment shown in FIG. 17 further includes the following step.

S1750: The first IAB donor CU sends a third message to a first node.

Mutual reference may be made to content in S1160. Details are not described herein again.

Subsequently, an IAB node MT or IAB node DU of the boundary IAB node may determine, based on a correspondence between the first BH RLC CH identifier and the second BH RLC CH identifier, bearer mapping conversion between transmission of the signaling in the different network topologies.

In the foregoing embodiment, signaling interaction between nodes may reuse existing signaling or not reuse the existing signaling.

For example, corresponding to the scenario shown in (a) in FIG. 7, the first message sent by the first IAB donor CU to the second IAB donor CU may be a migration request message.

In correspondence to the scenario shown in (b) in FIG. 7, the first message sent by the first IAB donor CU to the second IAB donor CU may be signaling related to addition and/or modification of a secondary base station between the first IAB donor CU and the second IAB donor CU. For example, the first message may be a secondary station addition request message or a secondary station addition response message. For another example, the first message may be a secondary station modification request message or a secondary station modification response message.

Alternatively, the foregoing information sent by the first IAB donor CU to the second IAB donor CU may be carried in a message newly added between the first IAB donor CU and the second IAB donor CU.

How the first IAB donor CU sends the foregoing information to the second IAB donor CU is not limited in embodiments of this application.

For another example, corresponding to the scenario shown in (a) in FIG. 7, the second message sent by the second IAB donor CU to the first IAB donor CU may be a migration request response message.

In correspondence to the scenario shown in (b) in FIG. 7, the second message sent by the second IAB donor CU to the first IAB donor CU may be signaling related to addition and/or modification of a secondary base station between the first IAB donor CU and the second IAB donor CU. For example, the second message may be a secondary station addition request message or a secondary station addition response message. For another example, the second message may be a secondary station modification request message or a secondary station modification response message.

This embodiment mainly resolves a routing and bearer mapping mechanism for transmission on the user plane and signaling plane in the inter-network topology scenario, to ensure normal transmission on the user plane and signaling plane in the inter-network topology scenario. In addition, a QoS characteristic (for example, the foregoing first QoS information, second QoS information, QoS information of the first BH RLC CH, and QoS information of the second BH RLC CH) is considered to select a most appropriate path and channel to ensure QoS during transmission.

This application further provides another information transmission method. An uplink F1-C transmission path is indicated by using indication information, so that an uplink F1-C can be sent through a secondary cell group (secondary cell group, SCG) path, to improve flexibility of the uplink F1-C transmission path.

The following describes the information transmission method with reference to the accompanying drawings.

It may be learned from the foregoing descriptions that an IAB donor may use a CP-UP split architecture. For example, two CP-UP split scenarios shown in FIG. 18 are included.

(a) and (b) in FIG. 18 are schematic diagrams of CP-UP split scenarios of an IAB donor according to an embodiment of this application.

It may be learned from (a) in FIG. 18 that transmission of F1-C is performed by a master base station (a non-IAB donor) over an NR access link, and transmission of F1-U is performed by a secondary base station (an IAB donor) over a backhaul link. F1-C is signaling communicated between an IAB node2 DU and an S-donor CU. F1-U is data communicated between the IAB node2 DU and the S-donor CU.

It may be learned from (b) in FIG. 18 that transmission of F1-C is performed by a secondary base station (a non-IAB donor) over an NR access link, and transmission of F1-U is performed by a master base station (an IAB donor) over a backhaul link. F1-C is signaling communicated between an IAB node2 DU and an M-donor CU. F1-U is data communicated between the IAB node2 DU and the M-donor CU.

For the scenario shown in (a) in FIG. 18, a transmission mechanism of F1-C (F1-C over LTE) in LTE in a current related technology may be used.

For example, for downlink transmission:

Step 1:

A CU part (the S-donor CU shown in (a) in FIG. 18) of the secondary base station generates F1-C, and includes F1-C in a fourth message (for example, an XnAP message) and sends the fourth message to the master base station (the M-gNB shown in (a) in FIG. 18).

Step 2:

After extracting F1-C from the fourth message, the master base station encapsulates F1-C in a fifth message (for example, an NR RRC message) and sends the fifth message to an IAB node (for example, the IAB node#2 shown in (a) in FIG. 18) by using a signaling radio bearer (signal radio bearer2, SRB2).

An uplink transmission mechanism in the scenario shown in (a) in FIG. 18 is similar to a downlink transmission mechanism, except that a transmission direction changes. Details are not described herein.

For the scenario shown in (b) in FIG. 18, there are two solutions for transmission of F1-C on the SCG.

Solution 1:

Transmission is performed by using an SRB3.

Solution 2:

Transmission is performed by using a split (split) SRB. The split SRB includes a split SRB1 or a split SRB2.

For an uplink, if the split SRB is used for transmission of F1-C, based on a current dual connectivity DC transmission mechanism, an IAB node (the IAB node #2 shown in (b) in FIG. 18) can transmit uplink F1-C on only a master cell group (master cell group, MCG) path, but cannot perform transmission on the SCG path.

The MCG path includes: The IAB node #2 sends uplink F1-C to the M-donor CU via an IAB node #1 and the M-donor DU. The SCG path includes: The IAB node #2 sends uplink F1-C to the M-donor CU via the S-gNB.

To implement the scenario shown in (b) in FIG. 18, when the split SRB is used to send uplink F1-C on the SCG path, the following modifications need to be made:

The M-donor CU indicates an uplink F1-C transmission path of the IAB node#2, for example, the MCG path or the SCG path. If it is indicated that the uplink F1-C transmission path is the SCG, and the IAB node#2 is indicated to transmit uplink F1-C by using the split SRB1 or the split SRB2, the IAB node #2 changes a primary path corresponding to a PDCP entity of the split SRB from the MCG to the SCG, so that the IAB node #2 transmits uplink F1-C on the SCG path.

In the scenario shown in (b) in FIG. 18, because F1-C is encapsulated in an NR RRC message for transmission by using the split SRB, once uplink F1-C is communicated through the SCG path, all NR RRC messages are also communicated through the SCG path. Consequently, the NR RRC messages cannot be communicated through the MCG path.

If the NR RRC message encapsulated with uplink F1-C needs to be communicated through the SCG path, and the other NR RRC messages need to be communicated through the MCG path, an RRC layer of the IAB node #2 needs to send one piece of indication information to a bottom layer (for example, a PDCP layer of the IAB node #2), to indicate a transmission path of the NR RRC message, for example, the MCG path or the SCG path. Alternatively, the indication information indicates whether the NR RRC message carries F1-C. If the NR RRC message carries F1-C, the NR RRC message is communicated through the SCG path. If the NR RRC message does not carry F1-C, the NR RRC message is communicated through the MCG path. That is, the bottom layer (for example, the PDCP layer) of the IAB node may flexibly adjust, based on the indication information received from an upper layer (for example, the RRC layer), a transmission path for sending the NR RRC message.

In the foregoing method embodiments, the sequence numbers of the foregoing processes do not mean execution sequences. The execution sequences of the processes should be determined based on functions and internal logic of the processes, and should not be construed as any limitation on the implementation processes of embodiments of this application. In addition, it is possible that not all operations in the foregoing method embodiments need to be performed.

It should be understood that the IAB node and/or the donor node in the foregoing method embodiments may perform some or all of the steps in the embodiments. These steps or operations are merely examples. Other operations or variations of various operations may further be included in embodiments of this application.

It may be understood that in the foregoing method embodiments, the method implemented by the IAB node may alternatively be implemented by a component (for example, a chip or a circuit) that can be used in the IAB node, and the method implemented by the donor node may alternatively be implemented by a component that can be used in the donor node.

It should be further understood that in embodiments of this application, unless otherwise stated or there is a logic conflict, terms and/or descriptions between different embodiments are consistent and may be mutually referenced, and technical features in different embodiments may be combined based on an internal logical relationship thereof, to obtain a new embodiment.

The foregoing describes in detail the information transmission method in embodiments of this application with reference to FIG. 8 to FIG. 17, and the following describes in detail an apparatus provided in embodiments of this application with reference to FIG. 19 to FIG. 24.

FIG. 19 is a schematic diagram of an information transmission apparatus 1800 according to this application. As shown in FIG. 19, the apparatus 1800 includes a processing unit 1810 and a sending unit 1820.

The processing unit 1810 is configured to determine first quality of service QoS information of data and/or a signaling type of signaling, where the first QoS information is used to determine transmission of the data in a second network topology managed by a second IAB donor CU, and the signaling type is used to determine transmission of the signaling in the second network topology; and the sending unit 1820 is configured to send a first message to the second IAB donor CU, where the first message includes the first QoS information and/or indication information of the signaling type, where the data and/or the signaling are/is communicated across the second network topology and a first network topology managed by the first IAB donor CU.

For example, that the processing unit determines the first quality of service QoS information of the data includes:

the processing unit determines second QoS information and the first QoS information based on QoS corresponding to the data; and the processing unit is further configured to: determine, based on the second QoS information, transmission of the data in the first network topology; and/or determine, based on the signaling type, transmission of the signaling in the first network topology.

For example, the apparatus further includes:

a receiving unit 1830, configured to receive a second message from the second IAB donor CU, where the second message includes a second routing identifier corresponding to a first routing identifier, and/or a second BH RLC CH identifier corresponding to a first BH RLC CH identifier; and the sending unit is further configured to send a third message to a first node, where the third message includes the first routing identifier and the second routing identifier, and/or the first BH RLC CH identifier and the second BH RLC CH identifier, where the second routing identifier identifies a second path for transmission of the data and/or the signaling between the first node and a third node, the second BH RLC CH identifier identifies a second BH RLC CH for transmission of the data and/or the signaling between the first node and a parent node of the first node, and the third node is a second donor DU.

For example, the apparatus further includes:

a receiving unit, configured to receive a second message from the second IAB donor CU, where the second message includes a second routing identifier and/or a second BH RLC CH identifier, where the second routing identifier identifies a path for trans-
mission of the data and/or the signaling between a first
node and a third node, and the second BH RLC CH
identifier identifies a BH RLC CH for transmission of
the data and/or the signaling between the first node and
a parent node of the first node.

The apparatus 1800 completely corresponds to the first
IAB donor CU in the method embodiments, and the appa-
ratus 1800 may be the first IAB donor CU in the method
embodiments. Alternatively, the apparatus 1800 may be a
chip or a functional module inside the first IAB donor CU.
A corresponding unit of the apparatus 1800 is configured to
perform corresponding steps performed by the first IAB
donor CU in the method embodiments shown in FIG. 8 to
FIG. 17.

The processing unit 1810 of the apparatus 1800 performs
steps implemented or processed inside the apparatus in the
method embodiments. The sending unit 1820 performs a
sending step in the method embodiments. The apparatus
1800 may further include a receiving unit 1830, configured
to perform a receiving step. The sending unit 1820 and the
receiving unit 1830 may form a transceiver unit, having both
receiving and sending functions. The sending unit 1820 may
be a transmitter, and the receiving unit 1830 may be a
receiver. The receiver and the transmitter may be integrated
together to form a transceiver.

FIG. 20 is a schematic diagram of a structure of a first IAB
donor CU applicable to an embodiment of this application.
For ease of description, FIG. 20 shows only main compo-
nents of the first IAB donor CU. As shown in FIG. 20, the
first IAB donor CU includes a processor 1910, a memory
1920, and a transceiver 1930. The processor is configured to
control the transceiver to send and receive information, the
memory is configured to store a computer program, and the
processor is configured to invoke and run the computer
program from the memory, to perform a corresponding
procedure and/or operation performed by the first IAB donor
CU in this application. Details are not described herein
again.

A person skilled in the art may understand that, for ease
of description, FIG. 20 shows only one memory and only
one processor. There may be a plurality of processors and
memories in an actual system. The memory may also be
referred to as a storage medium, a storage device, or the like.
This is not limited in embodiments of this application.

FIG. 21 is a schematic diagram of an information trans-
mission apparatus 2000 according to this application. As
shown in FIG. 21, the apparatus 2000 includes a processing
unit 2010 and a receiving unit 2020.

The receiving unit 2020 is configured to receive a first
message from a first IAB donor CU, where the first message
includes first quality of service QoS information and/or
indication information of a signaling type; and the processing unit 2010 is configured to: determine,
based on the first QoS information, transmission of data
in a second network topology managed by a second
IAB donor CU; and/or
determine, based on the signaling type, transmission of
signaling in the second network topology.

For example, the apparatus further includes:
a sending unit 2030, configured to send a second message
to the first IAB donor CU, where the second message
includes a second routing identifier corresponding to a
first routing identifier, and/or a second BH RLC CH
identifier corresponding to a first BH RLC CH identi-
fier, where the second routing identifier identifies a second path for
transmission of the data and/or the signaling between a
first node and a third node, and the second BH RLC CH
identifier identifies a second BH RLC CH for trans-
mission of the data and/or the signaling between the
first node and a parent node of the first node.

For example, the apparatus further includes:
a sending unit 2030, configured to send a second message
to the first IAB donor CU, where the second message
includes a second routing identifier and/or a second BH
RLC CH identifier, where
the second routing identifier identifies a path for trans-
mission of the data and/or the signaling between a first
node and a third node, and the second BH RLC CH
identifier identifies a BH RLC CH for transmission of
the data and/or the signaling between the first node and
a parent node of the first node.

The apparatus 2000 completely corresponds to the second
IAB donor CU in the method embodiments, and the appa-
ratus 2000 may be the second IAB donor CU in the method
embodiments. Alternatively, the apparatus 2000 may be a
chip or a functional module inside the second IAB donor
CU. A corresponding unit of the apparatus 2000 is config-
ured to perform corresponding steps performed by the
second IAB donor CU in the method embodiments shown in
FIG. 8 to FIG. 17.

The processing unit 2010 of the apparatus 2000 performs
steps implemented or processed inside the apparatus in the
method embodiments. The receiving unit 2020 performs a
receiving step in the method embodiments. The apparatus
2000 may further include a sending unit 2030, configured to
perform a sending step. The sending unit 2030 and the
receiving unit 2020 may form a transceiver unit, having both
receiving and sending functions. The sending unit 2030 may
be a transmitter, and the receiving unit 2020 may be a
receiver. The receiver and the transmitter may be integrated
together to obtain a transceiver.

FIG. 22 is a schematic diagram of a structure of a second
IAB donor CU applicable to an embodiment of this appli-
cation. For ease of description, FIG. 22 shows only main
components of the second IAB donor CU. As shown in FIG.
22, the second IAB donor CU includes a processor 2110, a
memory 2120, and a transceiver 2130. The processor is
configured to control the transceiver to send and receive
information, the memory is configured to store a computer
program, and the processor is configured to invoke and run
the computer program from the memory, to perform a
corresponding procedure and/or operation performed by the
second IAB donor CU in this application. Details are not
described herein again.

A person skilled in the art may understand that, for ease
of description, FIG. 22 shows only one memory and only
one processor. There may be a plurality of processors and
memories in an actual system. The memory may also be
referred to as a storage medium, a storage device, or the like.
This is not limited in embodiments of this application.

FIG. 23 is a schematic diagram of an information trans-
mission apparatus 2200 according to this application. As
shown in FIG. 23, the apparatus 2200 includes a processing
unit 2210 and a receiving unit 2220.

The receiving unit 2220 is configured to receive a third
message from a first IAB donor CU, where the third message
includes a first routing identifier and a second routing
identifier, and/or a first BH RLC CH identifier and a second
BH RLC CH identifier.

The processing unit 2210 is configured to determine,
based on the first routing identifier and the second routing identifier, routing conversion between transmission of data and/or signaling in a first network topology managed by the first IAB donor CU and transmission of the data and/or the signaling in a second network topology managed by a second IAB donor CU.

The processing unit is further configured to determine, based on the first BH RLC CH identifier and the second BH RLC CH identifier, bearer mapping conversion between the transmission of the data and/or the signaling in the first network topology and the transmission of the data and/or the signaling in the second network topology.

The first network topology includes the apparatus and a second node, the first routing identifier identifies a first path for transmission of the data and/or the signaling between the apparatus and the second node, the first BH RLC CH identifier identifies a first BH RLC CH for transmission of the data and/or the signaling between the apparatus and a child node of the first node, the apparatus is a boundary node, and the second node is an access node of a terminal device.

The second network topology includes the apparatus and a third node, the second routing identifier identifies a second path for transmission of the data and/or the signaling between the apparatus and the third node, the second BH RLC CH identifier identifies a second BH RLC CH for transmission of the data and/or the signaling between the apparatus and a parent node of the first node, and the third node is a second IAB donor DU.

The apparatus 2200 completely corresponds to the first node in the method embodiments, and the apparatus 2200 may be the first node in the method embodiments. Alternatively, the apparatus 2200 may be a chip or a functional module inside the first node. A corresponding unit of the apparatus 2200 is configured to perform corresponding steps performed by the first node in the method embodiments shown in FIG. 8 to FIG. 17.

The processing unit 2210 of the apparatus 2200 performs steps implemented or processed inside the apparatus in the method embodiments. The receiving unit 2220 performs a receiving step in the method embodiments. The apparatus 2200 may further include a sending unit, configured to perform a sending step. The sending unit and the receiving unit 2220 may form a transceiver unit, having both receiving and sending functions. The sending unit may be a transmitter, and the receiving unit 2222 may be a receiver. The receiver and the transmitter may be integrated together to obtain a transceiver.

FIG. 24 is a schematic diagram of a structure of a first node applicable to an embodiment of this application. For ease of description, FIG. 24 shows only main components of the first node. As shown in FIG. 24, the first node includes a processor 2310, a memory 2320, and a transceiver 2330. The processor is configured to control the transceiver to send and receive information. The memory is configured to store a computer program. The processor is configured to invoke the computer program from the memory and run the computer program, to perform a corresponding procedure and/or operation performed by the first node in this application. Details are not described herein again.

A person skilled in the art may understand that, for ease of description, FIG. 24 shows only one memory and only one processor. There may be a plurality of processors and memories in an actual system. The memory may also be referred to as a storage medium, a storage device, or the like. This is not limited in embodiments of this application.

In addition, this application further provides a communication system, including one or more of the first node, the first IAB donor CU, and the second IAB donor CU in the method embodiments.

This application provides a computer-readable storage medium. The computer-readable storage medium stores computer instructions. When the computer instructions are run on a computer, the computer is enabled to perform a corresponding operation and/or processing performed by the first node in any one of the method embodiments.

This application provides a computer-readable storage medium. The computer-readable storage medium stores computer instructions. When the computer instructions are run on a computer, the computer is enabled to perform a corresponding operation and/or processing performed by the first IAB donor CU in any one of the method embodiments.

This application provides a computer-readable storage medium. The computer-readable storage medium stores computer instructions. When the computer instructions are run on a computer, the computer is enabled to perform a corresponding operation and/or processing performed by the second IAB donor CU in any one of the method embodiments.

This application further provides a computer program product. The computer program product includes computer program code. When the computer program code is run on a computer, the computer is enabled to perform a corresponding operation and/or processing performed by the first node in any one of the method embodiments of this application.

This application further provides a computer program product. The computer program product includes computer program code. When the computer program code is run on a computer, the computer is enabled to perform a corresponding operation and/or processing performed by the first IAB donor CU in any one of the method embodiments of this application.

This application further provides a computer program product. The computer program product includes computer program code. When the computer program code is run on a computer, the computer is enabled to perform a corresponding operation and/or processing performed by the second IAB donor CU in any one of the method embodiments of this application.

This application further provides a chip, including a processor. The processor is configured to invoke and run a computer program stored in a memory, to perform a corresponding operation and/or processing performed by the first node in any one of the method embodiments of this application.

Optionally, the chip further includes a memory, and the memory is connected to the processor. The processor is configured to read and execute a computer program in the memory.

Further optionally, the chip further includes a communication interface, and the processor is connected to the communication interface. The communication interface is configured to receive a to-be-processed signal and/or data. The processor obtains the to-be-processed signal and/or data from the communication interface, and processes the to-be-processed signal and/or data.

This application further provides a chip, including a processor. The processor is configured to invoke and run a computer program stored in a memory, to perform a corresponding operation and/or processing performed by the first IAB donor CU in any one of the method embodiments of this application.

Optionally, the chip further includes a memory, and the memory is connected to the processor. The processor is configured to read and execute a computer program in the memory.

Further optionally, the chip further includes a communication interface, and the processor is connected to the communication interface. The communication interface is configured to receive a to-be-processed signal and/or data. The processor obtains the to-be-processed signal and/or data from the communication interface, and processes the to-be-processed signal and/or data.

This application further provides a chip, including a processor. The processor is configured to invoke and run a computer program stored in a memory, to perform a corresponding operation and/or processing performed by the second IAB donor CU in any one of the method embodiments of this application.

Optionally, the chip further includes the memory, and the memory is connected to the processor. The processor is configured to read and execute the computer program in the memory.

Optionally, the chip further includes a communication interface, and the processor is connected to the communication interface. The communication interface is configured to receive a to-be-processed signal and/or data. The processor obtains the to-be-processed signal and/or data from the communication interface, and processes the to-be-processed signal and/or data.

Optionally, the communication interface may be an input/output interface, and may specifically include an input interface and an output interface. Alternatively, the communication interface may be an input/output circuit, and may specifically include an input interface circuit and an output interface circuit.

The memory and the processor in the foregoing embodiments may be physically independent units, or the memory and the processor may be integrated together.

In the foregoing embodiments, the processor may be central processing unit (central processing unit, CPU), a microprocessor, an application-specific integrated circuit (application-specific integrated circuit, ASIC), or one or more integrated circuits configured to control program execution of the technical solutions of this application. For example, the processor may be a digital signal processor device, a microprocessor device, an analog-to-digital converter, a digital-to-analog converter, or the like. The processor may allocate control and signal processing functions of a terminal device or a network device to the devices based on respective functions of the devices. In addition, the processor may have a function of operating one or more software programs, and the software program may be stored in the memory. The function of the processor may be implemented by hardware, or may be implemented by hardware executing corresponding software. The hardware or the software includes one or more modules corresponding to the function.

The memory may be a read-only memory (read-only memory, ROM), another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, any other medium that can be used to carry or store expected program code in a form of an instruction or a data structure and that can be accessed by a computer, or the like.

In embodiments of this application, "and/or" describes an association relationship between associated objects, and indicates that three relationships may exist. For example, A and/or B may indicate the following three cases: Only A exists, both A and B exist, and only B exists. A and B may be singular or plural.

A person of ordinary skill in the art may be aware that, in combination with the examples described in embodiments disclosed in this specification, units may be implemented by electronic hardware or a combination of computer software and the electronic hardware. Whether the functions are performed by hardware or software depends on particular applications and design constraint conditions of the technical solutions. A person skilled in the art may use different methods for each specific application to implement the described functions.

In the several embodiments provided in this application, it should be understood that the disclosed systems, apparatuses and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and components displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to an existing technology, or all or some of the technical solutions may be implemented in the form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus comprising:
at least one processor configured to perform operations comprising:
determining at least one of first quality of service (QoS) information of data or a signaling type of signaling, wherein the first QoS information comprises QoS parameters for controlling transmission of the data in a second network topology managed by a second integrated access and backhaul donor central unit (IAB donor CU), and the signaling type comprises a type indicator for controlling transmission of the signaling in the second network topology;
sending a first message to the second IAB donor CU, wherein the first message comprises the at least one of the first QoS information or indication information of the signaling type, wherein
the data or the signaling is communicated across the second network topology and a first network topology managed by the apparatus; and
wherein the first message further comprises a first routing identifier, and wherein
the first network topology comprises a first node and a second node, the first routing identifier identifies a first path for transmission of at least one of the data or the signaling between the first node and the second node, the first node is a boundary node, and the second node is an access node of a terminal device.

2. The apparatus according to claim 1, wherein the determining first QoS information of data comprises:
determining second QoS information and the first QoS information based on QoS corresponding to the data; and
wherein the operations further comprise at least one of:
determining transmission of the data in the first network topology based on the second QoS information; or
determining transmission of the signaling in the first network topology based on the signaling type.

3. The apparatus according to claim 1, wherein the first message further comprises a first backhaul radio link control channel (BH RLC CH) identifier, wherein
the first BH RLC CH identifier identifies a first BH RLC CH for transmission of at least one of the data or the signaling between the first node and a child node of the first node.

4. The apparatus according to claim 1, wherein the first network topology comprises a first node and a second node, the first message further comprises first indication information, and the first indication information indicates that a first path for transmission of at least one of the data or the signaling between a first node and a second node is used for uplink transmission or downlink transmission, or a first backhaul radio link control channel (BH RLC CH) indicated by the first message is used for uplink transmission or downlink transmission.

5. The apparatus according to claim 3, wherein the operations further comprise:
receiving a second message from the second IAB donor CU, wherein the second message comprises at least one of a second routing identifier corresponding to the first routing identifier, or a second BH RLC CH identifier corresponding to the first BH RLC CH identifier.

6. The apparatus according to claim 3, wherein the operations further comprise:
receiving a second message from the second IAB donor CU, wherein the second message comprises second indication information, and the second indication information indicates that a second path corresponding to a second routing identifier comprised in the second message is used for uplink transmission or downlink transmission, or a second BH RLC CH corresponding to a second BH RLC CH identifier comprised in the second message is used for uplink transmission or downlink transmission.

7. The apparatus according to claim 5, wherein the operations further comprise:
sending a third message to the first node, wherein the third message comprises the first routing identifier and the second routing identifier, or the first BH RLC CH identifier and the second BH RLC CH identifier, wherein
the second network topology comprises the first node and a third node, the second routing identifier identifies a second path for transmission of at least one of the data or the signaling between the first node and the third node, the second BH RLC CH identifier identifies the second BH RLC CH for transmission of at least one of the data or the signaling between the first node and a parent node of the first node, and the third node is a second IAB donor DU.

8. The apparatus according to claim 1, wherein the operations further comprise:
receiving a second message from the second IAB donor CU, wherein the second message comprises at least one of a second routing identifier or a second BH RLC CH identifier, wherein
the second network topology comprises a first node and a third node, the second routing identifier identifies a second path for transmission of at least one of the data or the signaling between the first node and the third node, the second BH RLC CH identifier identifies a second BH RLC CH for transmission of at least one of the data or the signaling between the first node and a parent node of the first node, the first node is a boundary node, and the third node is a second IAB donor DU.

9. The apparatus according to claim 8, wherein the second message further comprises second indication information, and the second indication information indicates that the second path or the second BH RLC CH is used for uplink transmission or downlink transmission.

10. The apparatus according to claim 8, wherein the first network topology comprises the first node and a second node, and the operations further comprise:
determining a first routing identifier corresponding to the second routing identifier, or a first BH RLC CH identifier corresponding to the second BH RLC CH identifier.

11. The apparatus according to claim 8, wherein the operations further comprise:
sending a third message to the first node, wherein the third message comprises the first routing identifier and the second routing identifier, or a first BH RLC CH identifier and the second BH RLC CH identifier, wherein
the first network topology comprises the first node and the second node, the first routing identifier identifies a first path for transmission of at least one of the data or the signaling between the first node and the second node, the first BH RLC CH identifier identifies a first BH RLC CH for transmission of at least one of the data or the signaling between the first node and a child node of the first node, and the second node is an access node of a terminal device.

12. A communication apparatus comprising:

at least one processor configured to perform operations comprising:

receiving a first message from a first integrated access and backhaul donor central unit (IAB donor CU), wherein the first message comprises at least one of first quality of service (QoS) information or indication information of a signaling type;

determining, at least one of the following:

transmission of data in a second network topology managed by the apparatus based on the first QoS information; or transmission of signaling in the second network topology based on the signaling type; and wherein the first message further comprises a first routing identifier, and wherein a first network topology managed by the first IAB donor CU comprises a first node and a second node, the first routing identifier identifies a first path for transmission of at least one of the data or the signaling between the first node and the second node, the first node is a boundary node, and the second node is an access node of a terminal device.

13. The apparatus according to claim 12, wherein the first message further comprises a first backhaul radio link control channel (BH RLC CH) identifier, wherein the first BH RLC CH identifier identifies a first BH RLC CH for transmission of at least one of the data or the signaling between the first node and a child node of the first node.

14. The apparatus according to claim 12, wherein a first network topology managed by the first IAB donor CU comprises a first node and a second node, the first message further comprises first indication information, and the first indication information indicates that a first path for transmission of at least one of the data or the signaling between a first node and a second node is used for uplink transmission or downlink transmission, or a first backhaul radio link control channel (BH RLC CH) indicated by the first message is used for uplink transmission or downlink transmission.

15. The apparatus according to claim 13, wherein the first message further comprises QoS of the first BH RLC CH identifier.

16. The apparatus according to claim 13, wherein the operations further comprise:

sending a second message to the first IAB donor CU, wherein the second message comprises at least one of a second routing identifier corresponding to the first routing identifier, or a second BH RLC CH identifier corresponding to the first BH RLC CH identifier, wherein the second network topology comprises the first node and a third node, the second routing identifier identifies a second path for transmission of at least one of the data or the signaling between the first node and the third node, the second BH RLC CH identifier identifies a second BH RLC CH for transmission of at least one of the data or the signaling between the first node and a parent node of the first node, and the third node is a second IAB donor DU.

17. The apparatus according to claim 12, wherein the operations further comprise:

sending a second message to the first IAB donor CU, wherein the second message comprises at least one of a second routing identifier or a second BH RLC CH identifier, wherein the second network topology comprises a first node and a third node, the second routing identifier identifies a second path for transmission of at least one of the data or the signaling between the first node and the third node, the second BH RLC CH identifier identifies a second BH RLC CH for transmission of at least one of the data or the signaling between the first node and a parent node of the first node, the first node is a boundary node, and the third node is a second IAB donor DU.

18. The apparatus according to claim 16, wherein the second message further comprises second indication information, and the second indication information indicates that the second path or the second BH RLC CH is used for uplink transmission or downlink transmission.

19. A communication apparatus comprising:

at least one processor configured to perform operations comprising:

receiving a third message from a first integrated access and backhaul donor central unit (IAB donor CU), wherein the third message comprises a first routing identifier and a second routing identifier, or a first backhaul radio link control channel (BH RLC CH) identifier and a second BH RLC CH identifier;

determining, based on the first routing identifier and the second routing identifier, routing conversion between transmission of at least one of data or signaling in a first network topology managed by the first IAB donor CU and transmission of at least one of the data or the signaling in a second network topology managed by a second IAB donor CU; and determining, based on the first BH RLC CH identifier and the second BH RLC CH identifier, bearer mapping conversion between the transmission of at least one of the data or the signaling in the first network topology and the transmission of at least one of the data or the signaling in the second network topology, wherein the first network topology comprises a first node and a second node, the first routing identifier identifies a first path for transmission of at least one of the data or the signaling between the first node and the second node, the first BH RLC CH identifier identifies a first BH RLC CH for transmission of at least one of the data or the signaling between the first node and a child node of the first node, the first node is a boundary node, and the second node is an access node of a terminal device; and the second network topology comprises the first node and a third node, the second routing identifier identifies a second path for transmission of at least one of the data or the signaling between the first node and the third node, the second BH RLC CH identifier identifies a second BH RLC CH for transmission of at least one of the data or the signaling between the first node and a parent node of the first node, and the third node is a second IAB donor DU.

20. The apparatus according to claim 19, wherein the third message further comprises third indication information, and the third indication information indicates at least one of:

that the first path and the second path are used for uplink transmission or downlink transmission, or that the first BH RLC CH and the second BH RLC CH are used for uplink transmission or downlink transmission.

* * * * *